United States Patent [19]
Cain et al.

[11] Patent Number: 4,967,412
[45] Date of Patent: Oct. 30, 1990

[54] SERIAL DATA FRAME GENERATOR FOR TESTING TELECOMMUNICATIONS CIRCUITS

[75] Inventors: Christopher B. Cain; Robert E. McAuliffe; Lynn A. Schmidt; Elaine L. May, all of Loveland; John E. Siefers, Fort Collins, all of Colo.

[73] Assignee: Hewlett-Packard Company, Palo Alto, Calif.

[21] Appl. No.: 179,373

[22] Filed: Apr. 8, 1988

[51] Int. Cl.⁵ .................. G01R 31/28; G06F 11/00
[52] U.S. Cl. .................. 371/20.1; 371/20.4; 371/27
[58] Field of Search .......... 371/27, 22, 20.1, 20.4, 371/27; 364/200, 900; 375/10; 379/1

[56] References Cited

U.S. PATENT DOCUMENTS

| | | | |
|---|---|---|---|
| 4,450,560 | 5/1984 | Conner | 371/27 |
| 4,451,918 | 5/1984 | Gillette | 371/27 |
| 4,507,576 | 3/1985 | McCracken et al. | 371/27 |
| 4,517,661 | 5/1985 | Graf et al. | 371/27 |
| 4,555,663 | 11/1985 | Shimizu | 371/27 |

OTHER PUBLICATIONS

Siemens, Telecommunications, Data Book 1987, pp. 5-2 through 5-10 and 4-148 through 4-151, Apr. 1987.
CCITT, The International Telegraph and Telephone, Consultative Committee, Digital Networks-Transmission Systems and Multiplexing Equipment, 1985, pp. 85-94.
Hewlett-Packard Journal, Oct. 1984, pp. 1-35.
Hewlett-Packard 3065X/L Board Test System Users' Manual, vol. 1: System Reference, HP part number 03065-90090, Aug. 1987, Chapters 7, pp. 7-1-7-17; 9, pp. 9-1-9-72; 23, pp. 23-1-23-40

Primary Examiner—Charles E. Atkinson
Attorney, Agent, or Firm—Christopher J. Byrne

[57] ABSTRACT

Disclosed is a serial frame generator which generates serial data which conforms to a user-selected telecommunication protocol. The serial frame generator can be used with a circuit board tester to create test vectors for telecommunications circuits which require serial data input. The serial frame generator is user-adaptable so that serial frame data can be produced for essentially any kind of serial frame protocol.

3 Claims, 10 Drawing Sheets

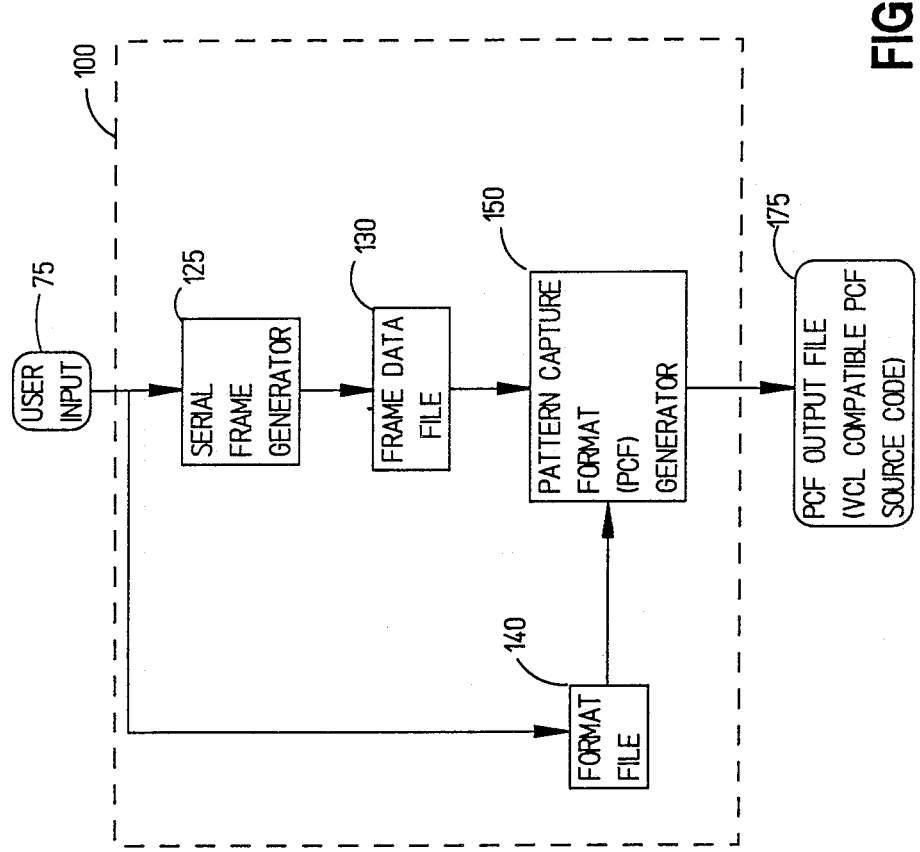

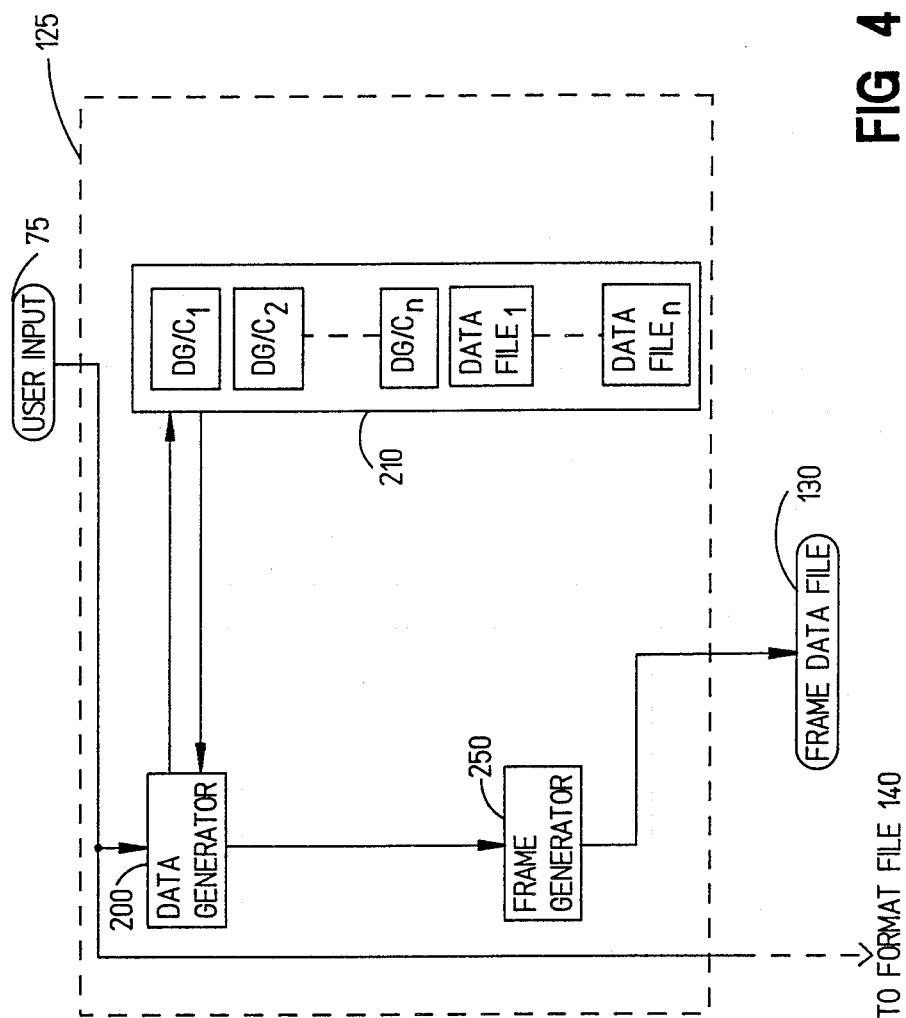

FIG 6

```
| Format file for D/A CODEC text
| The PCF order is:
|
|       +-> Valid_data
|       |+-> Data_bit
|       ||
|      "XX"          PCF vector contains two bits
|
| Following is a "Pcfgen" command-it specifies "d_a_data" as the
| frame data file to be read, "*" is the dummy character to replace
| in the PCF vectors
|###M "*" "d_a_data"
| Program Section (contains VCL and PCF statements)

pcf
        "1*"
    end pcf
    repeat 185 times
        execute Null_bit
    end repeat
```

130 Frame Data File : "d_a_data"

```
! Format file for D/A CODEC text
! The PCF order is:
!
!      +-> Valid_data
!      |+-> Data_bit
!      ||
!     "XX"           PCF vector contains two bits
!
!
! Following is a "Pcfgen" command-it specifies "d_a_data" as the
!   frame data file to be read; "*" is the dummy character to replace
!   in the PCF vectors
!
!##M "*" "d_a_data"
!
! Program Section (contains VCL and PCF statements)

pcf "11"
        "10"
        "10"
        "10"
        "11"
        "10"
        "10"
        "11"

end pcf repeat 185 times
        execute Null_bit
    end repeat pcf "10"
        "10"
        "10"
        "11"
        "10"
        "11"
        "11"
        "11"
    end pcf
    repeat 185 times
        execute Null_bit
```

FIG 6B

SERIAL DATA FRAME GENERATOR FOR TESTING TELECOMMUNICATIONS CIRCUITS

BACKGROUND OF THE INVENTION

The disclosed invention relates generally to the field of circuit board testing and more specifically to the art of testing telecommunications circuit boards. Generally, a given circuit board consists of numerous semiconductor chips, such as a microprocessor, memory chips, counter chips, control chips, etc., laid out according to some interactive design. Following design and layout of the circuit board, it is necessary to test the board to ensure that all the chips, as laid out, perform as expected. Testing will involve application of test-vectors to pins of a given chip (or cluster of chips) on the board. A test-vector for a given chip (or cluster of chips) generally consists of a binary word having an "input" portion and an "output" portion. The goal in testing is to determine if the application of the input portion of a test-vector produces an output matching the output portion of the test-vector. If there is a match, the test is successful (pass). Unsuccessful tests (failure) indicate defective board design, defective layout or defective chips. Test-vectors will be supplied by the designer of the circuit board (usually with the aid of a computer-aided-design (CAD) system). The test-vectors will be chosen so as to pinpoint problems on the board, if they exist.

Actual circuit board testing is performed with the aid of a circuit board testing machine. Circuit board testing machines are well known in the prior art. For example, a well known circuit board testing machine is the Hewlett-Packard Company model HP-3065 circuit board tester. The HP-3065, for instance, has 264 pins which can be simultaneously selectively connected to various pins of a given circuit board for application of test-vectors to the board and the monitoring of board output generated in response. The HP-3065 is fully described in the October 1984 issue of the *Hewlett-Packard Journal*. With the aid of a circuit board tester, whole sequences of test-vectors are applied to the board under test. In fact, it is not uncommon for test-vector listings to be thousands of test-vectors long where each test-vector is dozens of bits in width. Typically, such test-vectors are applied, sequentially one test vector at a time, in parallel to the circuit board under test.

Telecommunication circuit boards, however, present a special problem in circuit board testing: serial data protocols. Essentially all modern telecommunication schemes obey some sort of serial data protocol, such as the X.25 (HDLC) protocol for wide area networks, the Integrated Services Digital Network ISDN S-Bus protocol (CCITT I.430), the 24-channel U.S. T1 telephone protocol, and so forth. Common to all such protocols is the organization of information in the form of serial frames. The protocol defines the structure of the frame. Consider, for instance, the 24-channel U.S. T1 telephone protocol: analog voice signals are sampled and the samples are digitized; each digitized sample consists of one byte of information; samples are grouped in a 24-channel serial frame; each frame is 193 bits long consisting of a lead framing bit followed by 24 bytes, where each byte is a single sample from a given channel. Communication over the T1 systems occurs via transmission of T1 frames.

A typical T1 circuit which may require testing is a T1 coder-decoder (Codec), such as the National Semiconductor Company model TP 3064 Codec. A Codec is a T1 circuit which interfaces between the network and a telephone and serves to convert analog signals to digital (A/D) and digital signals to analog (D/A). In the digitizing process, the Codec samples the analog signal at the rate of 8 KHz. Thus, for instance, eight samples would be required to digitize a 1 KHz analog signal. These eight samples would be inserted in the same channel position of eight consecutive T1 frames. The general procedure for digitizing a given analog signal with a Codec is as follows: (1) generate the voltage sample of the sine wave for each sampling interval of time; (2) convert the voltage sample to the appropriate pulse code modulated (PCM) eight bit code, that is, digitize the sample; (3) insert the eight bit digitized sample value into the proper channel position of a 24-channel T1 frame; (4) repeat steps 1 through 3 for the next sample value. This procedure, however, becomes exceedingly tedious and time consuming, even for relatively "simple" signals like a sinusoidal frequency. For instance, sampling a 1010 Hz signal at a sampling rate of 8 KHz would require 800 samples before the samples would begin to repeat themselves. These 800 samples would be inserted in the same channel position of 800 consecutive T1 frames. This amounts to $800 \times 193 = 154,400$ bits of information which would be necessary to test a Codec to determine if it properly digitized a 1010 Hz signal. In addition, the PCM analog-to-digital conversion process may require application of a complex transfer function. (See the International Telegraph and Telephone Consultative Committee (CCITT) Red Book, Vol. III, Fascicle III.3, Tables 1a/G.711 & 1b/G.711 (A-law) and 2a/G.711 & 2b/G.711 (Mu-law).) Finally, this information must be converted (one bit at a time) to the corresponding test pattern language which the given circuit board tester requires.

It has been prior art practice to generate such data "manually", that is, a test programmer has had to calculate the necessary serial frame test data and transform it into test pattern language information which the given circuit board tester can accept. Thus, for a given serial device, the test programmer must generate the sample data, generate the serial frames from the sample data, and then generate the test data from the serial frames. Obviously, generating such large amounts of complex telecommunication serial frame test data is tedious and time consuming. (Generating such test data "manually" could very well consume weeks of an individual's time.) Moreover, ensuring the accuracy of the test data is very difficult and to the extent that there are doubts about the accuracy of the test data, the test results are suspect. The result has been that prior art testing of complex telecommunications circuits has been limited by the difficulty of generating sufficient amounts of accurate serial frame test data.

SUMMARY OF THE INVENTION

The present invention provides for quick and accurate generation of serial frame test data for telecommunications circuit boards. Through software, the present invention performs the major steps of (1) generating the data; (2) generating the serial frames from the data; and (3) generating the test data from the serial frames. Although the present invention could be easily adapted to work with essentially any modern circuit board tester, it has been implemented on the HP-3065 circuit board tester machine and it will therefore be described in connection with the HP-3065. The invention is implemented using a form of the BASIC programming language which has been adapted for use on board test machines and dubbed BT-BASIC. BT-BASIC is well known in the prior art and is fully explained in connection with the HP-3065 instruction manual.

The first major step of generating digital data is performed by a so-called Serial Frame Generator. The Serial Frame Generator includes: a Data Generator; a collection of Data Generation/Conversion (DG/C) routines and user-written Data Files; and a Frame Generator. The Data Generator produces the digital data which is representative of a given analog signal by either reading data from a user-written Data File or generating data by executing a given DG/C routine. The DG/C routines produce the digital data representative of single or multi-tone sine waves, pseudo-random bit sequences (such as a 511 bit error rate (BER) signal), CCITT G.711 reference and noise signals, and CCITT PCM A-law and Mu-law conversions. In addition, the Data Generator and DG/C routines are written in an open systems manner so that the user can customize an original DG/C to produce a particular kind of data.

The second major step of generating the serial frames from the digital data is also performed by the Serial Frame Generator. In addition to the Data Generator and DG/C routines, the Serial Frame Generator includes a Frame Generator. The Frame Generator converts the data produced by the Data Generator into serial frames which obey a user-selected telecommunications protocol. Among the framing options available to the user are 1-channel, 24-channel and 32-channel T1 frames, X.25 (HDLC) frames, ISDN frames, and various Siemens frames. (See the 1987 Siemens *Telecommunications Data Book.*) In addition, the Frame Generator is also written in an open systems manner so that the user can add framing options. Output from the Frame Generator is stored in a so-called Frame Data File.

The third and final major step of generating the circuit board test data from the serial frames is performed by a Pattern Capture Format (PCF) Generator. (PCF is explained in Chapter 7 of the HP-3065 X/L user's manual, Vol. III: *Advanced Technologies Testing—Reference and Syntax*) The PCF Generator has two input files: the Frame Data File and a so-called Format File. As noted, the Frame Data File is the output of the Frame Generator. The Format File is a user-written file containing executable VCL code together with instructions for merging the data in the Frame Data File with the executable VCL code to produce an executable PCF Output File. "VCL" stands for "Vector Control Language". VCL is a feature of the HP-3065 circuit board tester. VCL is a high-level language which is compiled, linked and executed by the HP-3065 computer. VCL allows a programmer to operate the HP-3065 with source-code-like programming instructions. (VCL is fully explained in chapter 23 of the HP-3065 X/L user's manual, Vol. I: *System Reference.*) The PCF Generator includes a Parser and a PCF Source Code Generator which generates VCL-compatible source code. The Format File is the input file to the Parser. The Frame Data File is the input file to the PCF Source Code Generator. The Parser processes the syntax information in the Format File and issues commands to the PCF Source Code Generator. The PCF Source Code Generator processes the Frame Data File together with the output of the Parser to produce the PCF Output File containing VCL-compatible PCF source code.

The VCL-compatible PCF source code, that is, the PCF Output File, may be compiled, linked and executed by the HP-3065. Thus, the present invention allows the HP-3065 user to quickly specify and generate serial data frames for the testing of telecommunications circuits. The invention allows for high programmer productivity as well as providing adaptability so that the programmer can write applications for his/her individualized needs. The prior art alternative to the present invention is "manual" coding, which would require significant programmer time in calculating complex serial frames and checking them for accuracy. The present invention, therefore, enables the circuit board testing programmer to produce large amounts of comprehensive and accurate serial frame test data which would simply be too tedious and/or time consuming to reasonably produce with prior art alternatives.

BRIEF DESCRIPTION OF THE DRAWINGS

FIG. 3 shows a schematic diagram of the present invention.

FIG. 4 shows a schematic diagram of Serial Frame Generator 125 of FIG. 3.

FIG. 6 shows an example of Format File 140.

FIG. 6A shows the contents of the d a data file of FIG. 6.

FIG. 6B shows an example of a PCF Output File 175 which has been derived from the Format File 140 of FIG. 6 and the Frame Data File 130 of FIG. 6A.

FIG. 7 shows pseudo code which shows how Parser 300 and PCF Source Code Generator of 350 process Format File 140 and Frame Data File 130, respectively, to produce PCF Output File 175.

DESCRIPTION OF THE PREFERRED EMBODIMENT

Figure 1:
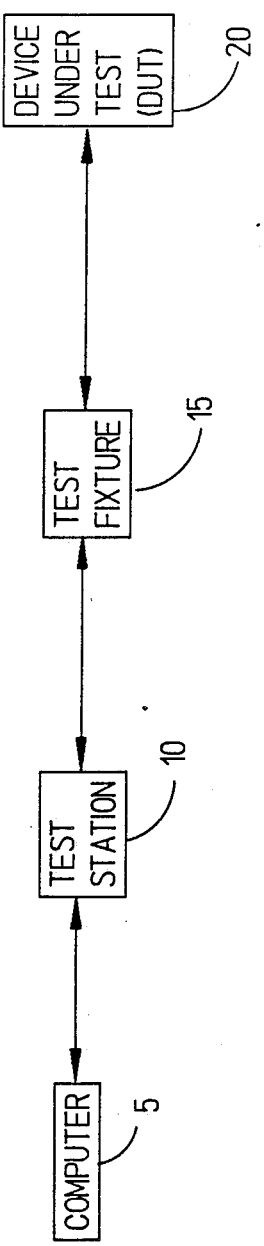
FIG. 1 shows a schematic diagram of a circuit board testing machine such as would be used with the present invention.

FIG. 1 shows a schematic diagram of a circuit board testing machine such as would be used with the present invention. Computer 5, Test Station 10 and Test Fixture 15 comprise the circuit board testing machine, such as the HP-3065 circuit board tester. The object of testing is the Device Under test (DUT) 20. DUT 20 is a circuit board, and in particular a telecommunications circuit board. Computer 5 controls the interaction of Test Station 10 and test Fixture 15 in the testing of the DUT 20.

Figure 2:
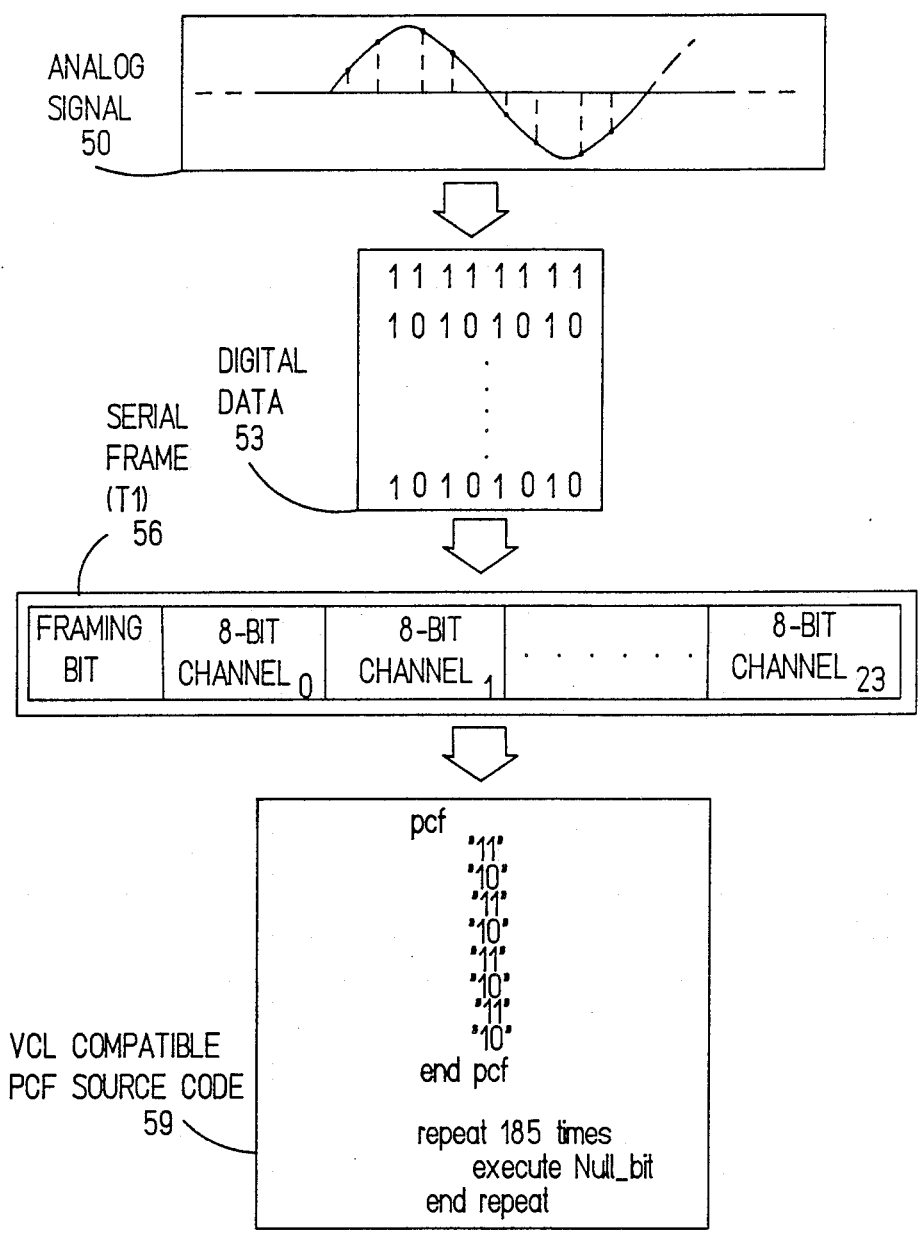
FIG. 2 shows a step-wise flow diagram of the present invention.

FIG. 2 shows a step-wise flow diagram of the present invention. Box 50 shows an analog signal which has been sampled at regular intervals Box 53 shows digital data conversions of such samples. Box 56 shows a serial frame protocol. The digitized samples from box 53 would be inserted into the serial frame format of box 56. The serial frame(s) of box 56 are then converted into VCL-compatible PCF source code, as shown in box 59. The code in box 59 would be directly executable by an HP-3065 circuit board tester. Note in box 59 that the serial frame data (which would be used as stimulus input to a telecommunications circuit board under test) is included directly within the PCF code. It should be noted that FIG. 2 is in fact schematic: the present invention does not actually sample and digitize an analog signal. Rather, the digital information, which is representative of digitized analog samples (as shown in box 53), is either read from a file or generated directly by the present invention. This digital data is then inserted into a user-selected serial frame protocol format, as shown in box 56. As shown in box 56, a given serial frame protocol format will have defined fields. Box 56 shows a 24-channel T1 frame having a lead framing bit followed by 24 8-bit data channel fields. (Typically, when testing a telecommunications circuit with serial frames, certain frame fields will remain constant from frame to frame while other fields, such as a given channel in a T1 frame such as channel$_0$, will vary with each frame. Thus, the generated digital data (as represented by box 53) will typically be inserted in the variable frame fields while the constant fields will simply be repeated from frame to frame.) The serial frames are then converted into VCL-compatible PCF source code as shown in box 59. The PCF source code, like VCL, can be compiled, linked and executed by the HP-3065.

FIG. 3 shows a schematic diagram of the present invention. The user will input a request on an HP-3065 for serial frame data with which to test a given telecommunications circuit board. User Input 75 is processed by Serial Frame Generator 125. User Input 75 will specify the type of data for which serial framing is required and the protocol to which the serial frame data must conform. Serial Frame Generator 125 generates the actual serial frames which conform to User Input 75. These serial frames will then be stored in Frame Data File 130. User Input 75 will also include a user-written Format File 140. The Format File 140 is a user-written file containing executable VCL code together with instructions for merging the data in the Frame Data File 130 with the executable VCL code to produce an executable PCF Output File 175. Frame Data File 130 and Format File 140 are input files to Pattern Capture Format (PCF) Generator 150. Obeying the merge instructions in Format File 140, PCF Generator 150 merges the serial frame data from Frame Data File 130 with the executable VCL code in Format File 140 to produce PCF Output File 175 containing VCL-compatible PCF source code which is executable by the HP-3065. An example of such a PCF Output File 175 is shown in box 59 of FIG. 2.

FIG. 4 shows a schematic diagram of Serial Frame Generator 125 of FIG. 3. Serial Frame generator 125 includes Data Generator 200, memory structure 210 containing DG/C routines and Data Files, and Frame Generator 250. As noted above, User Input 75 will specify the particular telecommunications protocol to which the desired serial frame data must conform. In the preferred embodiment of the present invention, eight widely followed protocol options are available as well as a general template option with which the user can tailor a protocol that is not among the eight options. Depending upon the protocol chosen (or tailored) by the user, serial frame data will either be generated with a given DG/C routine or read from a given Data File. The eight framing protocol options available in the preferred embodiment of the present invention are as follows: 1-channel, 24-channel and 30-channel T1 frames, Siemens IOM and SLD frames, serial RS232 frames and X.25 (HDLC) frames, and the ISDN S-Bus protocol conforming to the CCITT I.430 standard. Typically, data for the RS232, the X.25 and the ISDN S-Bus (CCITT I.430) protocols will reside in memory structure 210 in user written Data Files. Typically, data for the remaining protocols will be generated with a given DG/C routine. Given the user selected protocol and the appropriate data (either generated with a DG/C or read from a user-written Data File), Frame Generator 250 formats the data into serial frames conforming to the selected protocol. The serial frames are then stored in Frame Data File 130. As noted above, the present invention is implemented in software in the BT-BASIC programming language. The BT-BASIC implementation of Serial Frame Generator 125 is listed in Appendices A and B. Appendix A contains the BT-BASIC code for Data Generator 200 and Frame Generator 250. Appendix B contains the BT-BASIC code for the DG/C routines.

Figure 4A:
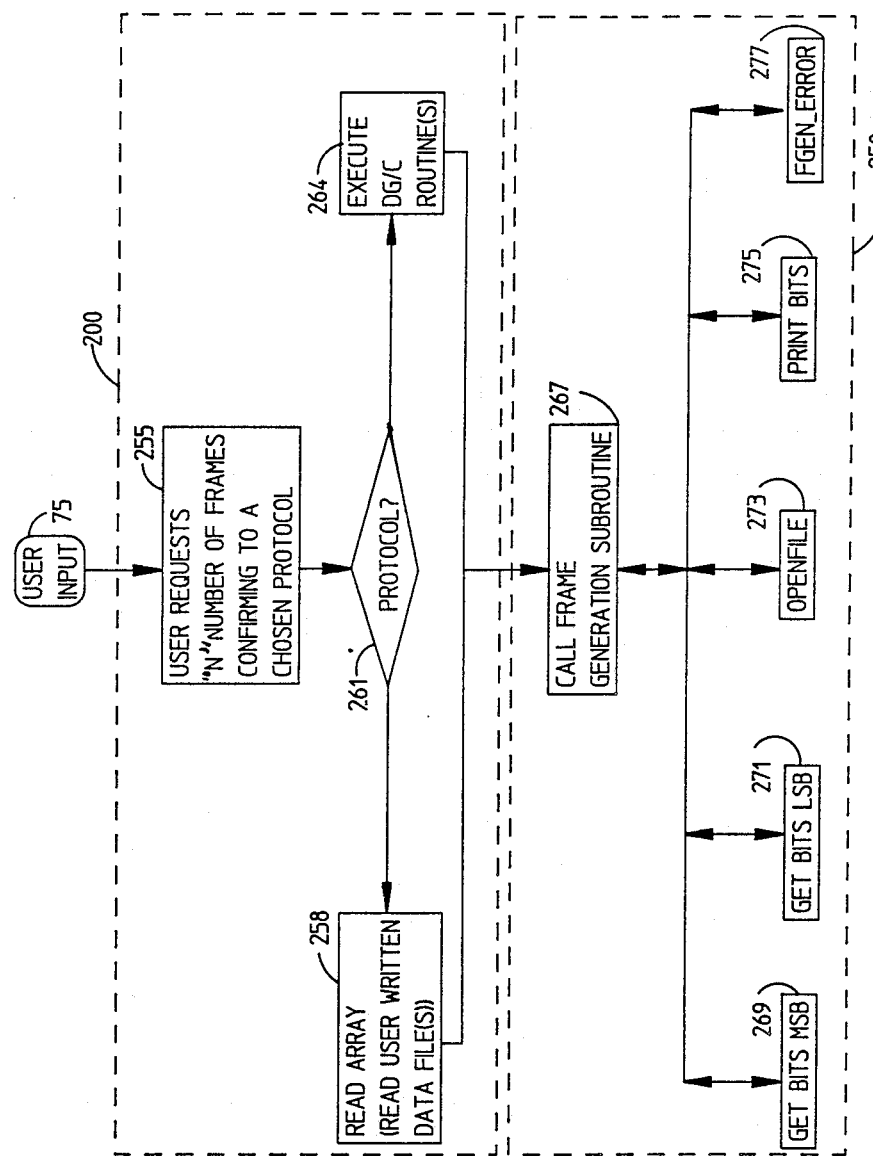
FIG. 4A shows a blow-up of Data Generator 200 of FIG. 4.

FIG. 4A shows a blow-up of Data Generator 200 of FIG. 4. As shown in box 255, Data Generator 200 receives input requesting "N" number of serial frames conforming to a given protocol. ("N" is an integer.) Depending upon the protocol, Data Generator 200 will obtain framing data either by reading data from the appropriate user-written Data File(s) and/or by executing the appropriate DG/C routine(s). (Recall that the user-written Data File(s) and the DG/C routine(s) reside in memory structure 210 of FIG. 4.) Typically, the protocols which will require user written Data Files are the following: X.25 (HDLC), RS232 and the ISDN S-Bus (CCITT I.430). Typically, the protocols which will have one or more DG/C routine are the following: 1-channel, 24-channel and 30-channel T1 protocols; and the Siemens IOM and SLD protocols. There is also a ninth option: the preferred embodiment of the present invention provides a template whereby the user can write his/her own protocol framing subroutine. Given "N", the user-requested number of serial frames, and the o user's choice of protocol for the frames, data is generated by Data Generator 200 and an appropriate protocol implementation program of Data Generator 200 and Frame Generator 250 is called. In the preferred embodiment of the present invention, the implementation programs are written in the BT-BASIC programming language, although essentially any programming language could be used. The BT-BASIC code implementation of Data Generator 200 and Frame Generator 250 for each protocol (including a user definable template) is listed in Appendix A. The implementations as listed in Appendix A are shown in Table 1. The implementations are quite self-explanatory. Note also that for each protocol, Frame Generator 250 will call a given Frame Generation Subroutine, as shown in box 267. Each Frame Generation Subroutine in turn will call the subroutines GetBitsMSB (box 269), GetBitsLSB (box 271), OpenFile (box 273), PrintBits (box 275) and possibly FGen$_{13}$ Error (box 277). The Frame Generation Subroutines corresponding to each protocol are listed Table 2 below. The subroutines called by the Frame Generation Subroutine of box 267 are also explained and defined in Appendix A as listed in Table 2.

TABLE 1

BT-BASIC Protocol Implementations
(Appendix A page numbers in parentheses)

| PROTOCOL | IMPLEMENTATION |
|---|---|
| 1. X.25 (HDLC) | FRAME_HDLC (30–44) |
| 2. RS232 | FRAME_RS232 (54–62) |
| 3. 1-channel T1 | FRAME_1CH (1–9) |
| 4. 24-channel T1 | FRAME_24CH (10–19) |
| 5. 30-channel T1 | FRAME_30CH (20–29) |

TABLE 1-continued

BT-BASIC Protocol Implementations
(Appendix A page numbers in parentheses)

| PROTOCOL | IMPLEMENTATION |
|---|---|
| 6. Siemens IOM | FRAME_IOM (44-53) |
| 7. Siemens SLD | FRAME_SLD (62-71) |
| 8. ISDN S-Bus (CCITT I.430) | FRAME_SBUS (83-94) |
| 9. user definable protocol template | FRAME_TEMPLATE (72-80) |

TABLE 2

Protocol Frame-Generation-Subroutines
(Appendix A page location in parentheses)

| PROTOCOL | SUBROUTINE |
|---|---|
| 1. X.25 (HDLC) | Generate_hdlc (32) |
| 2. RS232 | Generate_rs232 (55) |
| 3. 1-channel T1 | Generate_1ch (2) |
| 4. 24-channel T1 | Generate_24ch (12) |
| 5. 30-channel T1 | Generate_30ch (22) |
| 6. Siemens IOM | Generate_iom (46) |
| 7. Siemens SLD | Generate_sld (64) |
| 8. ISDN S-Bus (CCIT I.430) | Generate_sbus (83) |
| 9. user definable protocol template | Generate_frame (74) |

Figure 4B:
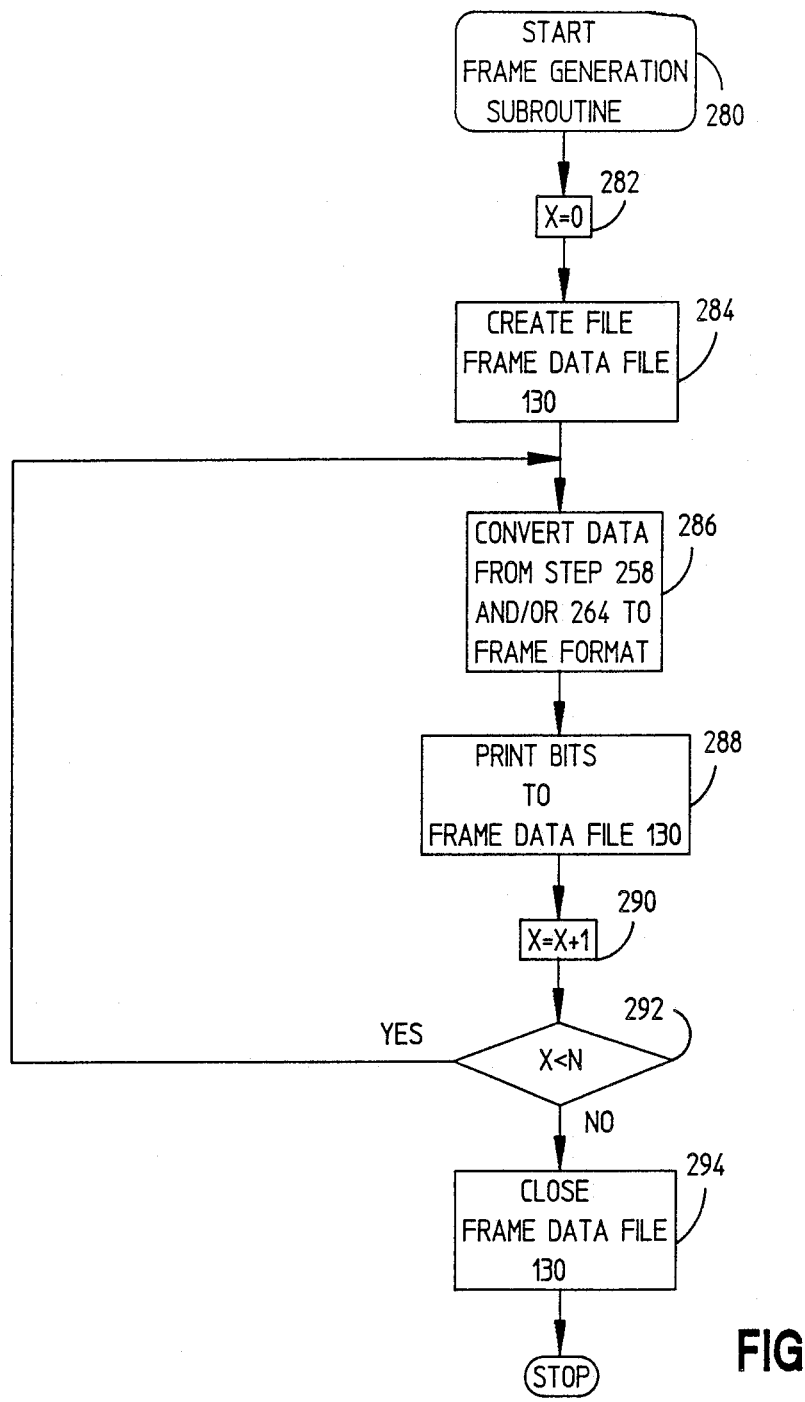
FIG. 4B is a blow-up of box 267 of FIG. 4A.

FIG. 4B is a blow-up of box 267 of FIG. 4A. A given Frame Generation Subroutine, such as Generate_24ch, is called in box 280. In box 282 a counter variable is initialized to zero. Frame Data File 130 is then created in box 284. The data to be formatted into a frame will have been produced by Data Generator 200, either by invocation of a DG/C and/or reading from a user-written Data File. In the preferred embodiment of the present invention, the data produced by Data Generator 200 will reside in a "temp-file" in main memory in computer 5. In box 286, the first line of such data is inserted into a given frame format as dictated by the user-chosen protocol. The frame information generated in box 286 is then written to Frame Data File 130. The counter variable is then incremented in box 290. A check is made in diamond 292 to see if the number of frames (N) requested by the user have been written. If not, the process loops back to box 286 and the next line of data in the "temp-file" is formatted into a frame. On the other hand, when the "N" frames requested by the user have been generated and written to Frame Data File 130, then Frame Data File 130 is closed.

As noted above, Data Generator 200 either reads data from a user written Data File or produces data by invoking DG/C routines. In the preferred embodiment of the present invention, the DG/C routines are also implemented in the BT-BASIC programming language. The DG/C routine BT-BASIC implementations are listed in Appendix B. The DG/C, routines are also described and explained in Chapter 9 of HP-3065 X/L user's Manual, Vol. III, Rev. C, sections 9.4.3 through 9.4.12.

Figure 5:
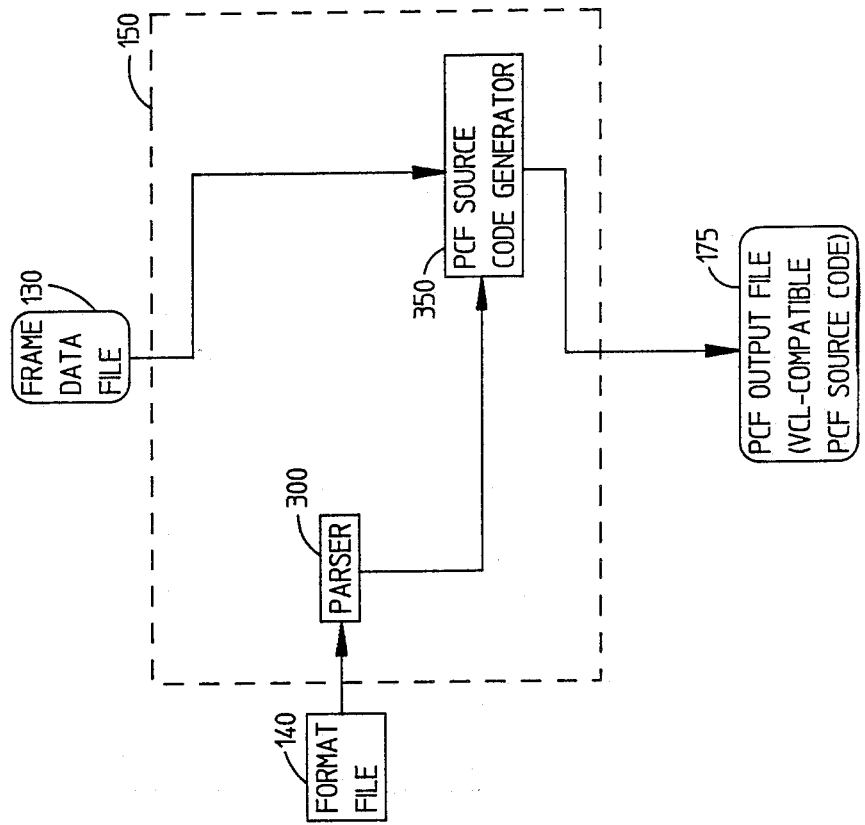
FIG. 5 shows a schematic diagram of PCF Generator 150 of FIG. 3.

FIG. 5 shows a schematic diagram of PCF Generator 150 of FIG. 3. PCF Generator 150, merges data with a programming language to produce a file which is directly executable by computer 5. In the preferred embodiment of the present invention, PCF Generator 150 has two input files: data is contained in Frame Data File 130 and a programmable language is contained in Format File 140. The data in Frame Data File 130 may be supplied by the user or it can be generated by Serial Frame Generator 125. Format File 140 is written by the user. Format File 140 will contain executable VCL code together with instructions for merging the data in Frame Data File 130 with the executable VCL code to produce an executable PCF Output File 175. As noted above, "VCL" stands for "Vector Control Language". VCL is a feature of the HP-3065 circuit board tester. VCL is a high-level language which is compiled, linked and executed by the HP-3065 computer. VCL allows a programmer to operate the HP-3065 with source-code-like programming instructions. (VCL is fully explained in chaper 23 of the HP-3065 X/L user's manual, Vol. I: *System Reference*). The PCF Generator includes a Parser 300 and a PCF Source Code Generator 350 which generates VCL-compatible source code. User-written Format File 140 is the input file to the Parser 300. Frame Data File 130 is the input file to the PCF Source Code Generator 350. Parser 300 processes the syntax information in the Format Dile 140 and issues commands to PCF Source Code Generator 350. PCF Source Code Generator 350 processes Frame Data File 130 together with the output of Parser 300 to produce the PCF Output File 175 containing VCL-compatible PCF source code. A complete explanation of the operation of PCF Source Code Generator 350 together with, prescriptions of Format File 140 syntax is contained in Chapter 1 of HP-3065 X/L user's Manual, Vol. III, Rev. C pages 9-62 through 9-70. An implementation of PCF Source Code Generator 350 in the BT-BASIC programming language is listed in Appendix D.

FIG. 6 shows an example of Format File 140. Format File 140 is written by the user. Instructions for writing the Format File are listed in Chapter 9 of HP-3065 X/L user's Manual, Vol. III, Rev C. As shown in FIG. 6, the Format File has two sections: a header section and a program section. The header section lines are indicated by leading "!" characters. The program section is the remaining part of the Format File and contains VCL and PCF statements. (Recall that PCF is explained in chapter 7 of the 3065 X/L user's manual, Vol. III, and VCL is explained in chapter 23 of the 3065 X/L user's manual, Vol. I.). The lines beginning with the character "!" are comment lines in VCL. However, a line beginning with "!##" is a replacement command to the PCF Generator. The "!##" command will specify a replacement character and the name of a Frame Data File 130. In FIG. 6, the PCF command line is: !##M "*" "d13 a_data". The asterisk (*) is the replacement character and d_a_data is the name of the Frame Data File 130. The command tells the PCF Generator to replace the asterisk with data from the d_a_data file wherever the asterisk occurs in the PCF code in the program section of the Format File. The PCF code is bounded by the statements pcf and end pcf in the program section.

FIG. 6A shows the contents of the d_a_data file of FIG. 6. The d_a_data file is the Frame Data File 140.

FIG. 6B shows an example of a PCF Output File 175 which has been derived from the Format File 140 of FIG. 6 and the Frame Data File 130 of FIG. 6A.

FIG. 7 shows pseudo-code which shows how Parser 300 and PCF Source Code Generator of 350 process Format File 140 and Frame Data File 130, respectively, to produce PCF Output File 175. Parser 300 detects the "!##" line in Format File 140, reads the name of the Frame Data File 130, and associates that name with the replacement character (the "*" in FIG. 6).

TABLE OF CONTENTS
APPENDIX A

FRAME_1CH
   sub Generate_1ch
FRAME_24CH
   sub Generate_24ch
FRAME_30CH
   sub Generate_30ch
FRAME_HDLC
   sub Generate_hdlc FRAME_IOM
FRAME_RS232
FRAME_SLD
FRAME_TEMPLATE
   sub Generate_frame
FRAME_SBUS_TE
   sub Generate_Sbus_TE

```
! /TELECOM/GEN/FRAME_1CH                                    Rev 3.0
!
! FRAME GENERATOR  for simple one time slot ( channel ) pcm generator
!
!
!
!
!
!
!
!
!
!
!
!
!
! Copyright Hewlett-Packard 1987.  All Rights Reserved.
!
!*********************************************************************
!---------------------------------------------------------------------
!
! To add other DSP subroutines, simply type in the following BTBasic commands
! at the command line:
!
!   edit 9999        ! This places the edit cursor at the last line.
!   merge "file id"  ! Merge the "file id" source at the current edit line.
!
!---------------------------------------------------------------------
!
!    This program is meant to be modified by the user BEFORE it is executed.
! The first half of this program consists of routines that fill pre-defined
! variables (arrays or numeric variables) with values from data files, user
! entry or DSP subroutine generated data.  These predefined variables reflect
! the data field(s) within this particular serial frame format.
!
!    The second half of this program consists of a subroutine that formats the
! values within the predefined variables into this serial frame format.  The
! manner in which the predefined variables are formatted is discussed in the
! comment section of the framing subroutine.
!
!    The subroutines following the framing subroutine are standard throughout
! the frame generator programs.  Not all of these subroutines are used in a
! particular frame generator.  These subroutines are documented in the comment
! section proceding the implementation section of each subroutine.
!
!    This allows the user to have complete control and flexibility over data
! field values and how they are generated.  Each frame generator program is to
! be used for a different frame format.
!
!---------------------------------------------------------------------
!
! USER MODIFIABLE PARAMETERS
!
I              = 0          ! Scratch variable.
MAX_LEN        = 1000       ! Maximum number of frames.  Same value used in
                            !    data field array dimensioning.
LEN            = 0          ! Default number of frames to generate.
dim CH(1000)                ! Channel field array.
!---------------------------------------------------------------------
```

```
print using "@"
print "ONE CHANNEL FRAME GENERATOR"
print
print loop
   input "Enter number of frames to be generated : ",LEN
   exit if (LEN >= 1) and (LEN < MAX_LEN)
   print "VALUE OUT OF RANGE, RANGE = 1 ..";MAX_LEN;", RETRY"
end loop !*********************************************************************
! Retrieve/Generate field data for frame(s)
!*********************************************************************

!!!!!!!!!!!!!!!!!!!!!!!!!!!!!   E X A M P L E   !!!!!!!!!!!!!!!!!!!!!!!!!!!!!!
!
! One channel of data is generated from dsp subroutines; tone and mu_law
!
print
input "Enter the tone frequency(Hz) to be generated : ",Frequency
!
! use rms value to produce full range
!
VRMS          = 8159 / sqr(2)        ! for MU_LAW
Phase         = 0
SampFrequency = 8000
call Tone( VRMS, Frequency, Phase, SampFrequency, LEN, CH(*) )
call MU_law( LEN, CH(*) )
!
! be sure to merge TONE and MU_LAW at end of test
!

call Generate_1ch( "ch1#file", LEN, CH(*) )

print
print "FRAME GENERATOR SUCCESSFULLY COMPLETED"

end ! main program

!!!!!!!!!!!!!!!!!!!!!!!!!!!!!!!!!!!!!!!!!!!!!!!!!!!!!!!!!!!!!!!!!!!!!!!!!!!!!
!!!!                                                                     !!!!
!!!!            P R O G R A M   S U B R O U T I N E S                    !!!!
!!!!                                                                     !!!!
!!!!!!!!!!!!!!!!!!!!!!!!!!!!!!!!!!!!!!!!!!!!!!!!!!!!!!!!!!!!!!!!!!!!!!!!!!!!!

sub Generate_1ch( FileName$, Length, Channel(*) )
!-----------------------------------------------------------------------
!
!     This routine will open the output file, generate the framed field
!  data, output the framed data to the output file, and close the output
!  file.  Any fatal error encountered will be reported and program
!  execution will stop.
!
!     This subroutine reproduces a single time-slot of bit data for a pcm
!  data stream.  Each time-slot consists of eight boolean values MSB-->LSB.
!  The other bits required for a complete pcm frame are to be provided by the
!  user.  These 'frame stuffing' bits may be provided by VCL vectors in the
!  PCF format file (used by the PCF Generator), or by the users VCL digital
!  program.
!
```

```
!       For example, if Length = 4 and the Channel array is filled with the
! following values:
!
!       Channel(0) = 128
!       Channel(1) = 255
!       Channel(2) = 0
!       Channel(3) = 255
!
! The output file will be as follows:
!
!       10000000;
!       11111111;
!       00000000;
!       11111111;;
!
!
! GLOBAL OUTPUTS:
!
!       ""      -------------- no global outputs are exported.
!
! GLOBAL INPUTS:
!
!       ""      -------------- no global inputs are imported.
!
! SUBROUTINE PARAMETERS:
!
!       FileName$  --------  String containing file pathname of the output
!                            file.
!
!       Length     --------  The number of frames to be generated.
!                            Range = 1..MAX_LEN
!
!       Channel(*) --------  Array id parameter containing 8 bit (0..255)
!                            single pcm channel of data. This array must be
!                            dimensioned as a single(1) dimension array
!                            of 0 to MAX_LEN elements prior to calling this
!                            subroutine.
!
!---------------------------------------------------------------------- dim Buffer$[80]

call OpenFile( FileName$, @FilePtr )

for Frame = 0 to Length-1
      Buffer$=""
      call GetBitsMSB( Channel(Frame), 8, Buffer$ )
      !
      ! The last frame of data ends with two ";" characters
      !
      if Frame = (Length-1) then
         output @FilePtr;Buffer$;";;"
      else
         output @FilePtr;Buffer$;";"
      end if
   next Frame
   !
   ! close the output file
   !
   assign @FilePtr,Error to *
subend sub GetBitsMSB( Value, Number_of_bits, Buffer$ )
!----------------------------------------------------------------------
!
!      This routine retrieves the boolean representation of an integer
! parameter and appends it to a string parameter. The boolean values
! are stripped from MSB ( most significant bit ) to LSB ( least
! significant bit ). Example: decimal value 23 = "00010111", if
! eight(8) bits are requested in the <Number_of_bits> parameter.
!
! Note: If the <Value> parameter is greater than the 2's complement
! range for the <Number_of_bits> parameter requested, the extra bits
! withing the <Value> parameter are ignored and not put into the <Buffer$>
! string parameter.
```

```
!   GLOBAL OUTPUTS:
!
!       ""    -------------- no global outputs are exported.
!
!
!   GLOBAL INPUTS:
!
!       ""    -------------- no global inputs are imported.
!
!   SUBROUTINE PARAMETERS:
!
!       Value ------------ Integer parameter.  Range = -32768..32767
!
!       Number_of_bits --- Size of the boolean representation of the
!                          integer parameter.  Range = 1..16
!
!       Buffer$ ---------- String parameter to which the boolean representation
!                          is appended.
!
!------------------------------------------------------------------------ if (Number_of_bits < 1) or (Number_of_bits > 16) then
       call FGen_Error( "GetBitsMSB: Number_of_bits<1 or Number_of_bits>16" )
    end if if (Value < -32768) or (Value > 32767) then
       call FGen_Error( "GetBitsMSB: Value<-32768 or Value>32767" )
    end if for I = (Number_of_bits-1) to 0 step -1
       Buffer$ = Buffer$ & val$( bit( Value,I ) )
    next I subend sub GetBitsLSB( Value, Number_of_bits, Buffer$ )
!------------------------------------------------------------------------
!
!     This routine retrieves the boolean representation of an integer
!  parameter and appends it to a string parameter.  The boolean values
!  are stripped from LSB ( least significant bit ) to MSB ( most
!  significant bit ).  Example: decimal value 23 = "11101000", if
!  eight(8) bits are requested in the <Number_of_bits> parameter.
!
!  Note: If the <Value> parameter is greater than the 2's complement
!  range for the <Number_of_bits> parameter requested, the extra bits
!  withing the <Value> parameter are ignored and not put into the <Buffer$>
!  string parameter.
!
!
!
!   GLOBAL OUTPUTS:
!
!       ""    -------------- no global outputs are exported.
!
!
!   GLOBAL INPUTS:
!
!       ""    -------------- no global inputs are imported.
!
!   SUBROUTINE PARAMETERS:
!
!       Value ------------ Integer parameter.  Range = -32768..32767
!
!       Number_of_bits --- Size of the boolean representation of the
!                          integer parameter.  Range = 1..16
!
!       Buffer$ ---------- String parameter to which the boolean representation
!                          is appended.
!
!------------------------------------------------------------------------
```

```
       if (Number_of_bits < 1) or (Number_of_bits > 16) then
          call FGen_Error( "GetBitsLSB: Number_of_bits<1 or Number_of_bits>16" )
       end if if (Value < -32768) or (Value > 32767) then
          call FGen_Error( "GetBitsLSB: Value<-32768 or Value>32767" )
       end if for I = 0 to (Number_of_bits-1)
          Buffer$ = Buffer$ & val$( bit( Value,I ) )
       next I subend sub ReadArray( FileName$, Length, Array(*) )
!-----------------------------------------------------------------
!
!    This routine reads an ASCII text file of integer data (one integer
! per line ) into an array.  Any errors found during file access are
! reported and the program execution is stopped.  If the file does not
! contain Length number of integers, an error occurs and program execution
! is stopped.
!
!
! GLOBAL OUTPUTS:
!
!      ""        -------------- no global outputs are exported.
!
!
! GLOBAL INPUTS:
!
!      ""        -------------- no global inputs are imported.
!
! SUBROUTINE PARAMETERS:
!
!    FileName$ ----------- A string the containing file pathname of the file
!                          to be read into the Array parameter.
!
!    Length    ----------- The number of integers to be read into the Array
!                          parameter.  Range = 1..32766
!
!    Array     ----------- Array id.  The integer values read from the file
!                          are returned in this parameter.  The array must
!                          be dimensioned prior to calling this subroutine.
!                          The array must be a single(1) dimensioned array.
!                          The array indices are assumed to start at zero(0)
!                          and stop at Length-1 or greater than Length-1.
!
!-----------------------------------------------------------------
    NO_ERROR              = 0
    EOF                   = 101007
    FILE_NOT_FOUND        = 100009
    WRONG_FILE_TYPE       = 101015
    FILE_NOT_ASSIGNED     = 136
    FILE_EXISTS           = 275 assign @File, Error to FileName$
    if Error <> NO_ERROR then
       call FGen_Error( "ReadArray: FILE ERROR '"&FileName$&"' "&errm$(Error) )
    end if for Index = 0 to Length-1
       enter @File,,Error; Array(Index)
       if Error <> NO_ERROR then
          if Error = EOF then
             call FGen_Error( "ReadArray: MORE DATA EXPECTED FROM '"&FileName$&"'" )
          else
             call FGen_Error("ReadArray: FILE ERROR '"&FileName$&"' "&errm$(Error))
          end if
       end if
    next Index
``` subend

```
sub OpenFile( FileName$, @FilePtr )
!-----------------------------------------------------------------
!
!     This routine opens an ASCII text file for output.  If the file already
!  exists, the user is prompted for overwrite.  If the file does not exist,
!  the file is created.  If any other file error occurs, the error is reported
!  to the CRT and program execution stops.
!
!
!  GLOBAL OUTPUTS:
!
!     ""      -------------- no global outputs are exported.
!
!
!  GLOBAL INPUTS:
!
!     ""      -------------- no global inputs are imported.
!
!  SUBROUTINE PARAMETERS:
!
!     FileName$  ----------- A string containing the file pathname of the
!                            output text file.
!
!     @FilePtr   ----------- The '@' file pointer.  If the file is opened,
!                            this pointer may be used by output statements
!                            to write data to the file.
!
!
!-----------------------------------------------------------------

NO_ERROR                = 0
   EOF                     = 101007
   FILE_NOT_FOUND          = 100009
   WRONG_FILE_TYPE         = 101015
   FILE_NOT_ASSIGNED       = 136
   FILE_EXISTS             = 275 assign @FilePtr, Error to FileName$;write,new
   if Error <> NO_ERROR then
      if Error = FILE_EXISTS then
         print
         print "The file '";FileName$;"' already exists."
         print "Do you want to write over this file (yes or no)?"
         input Answer$
         if lwc$(Answer$[1;1]) = "y" then
            assign @FilePtr,Error to FileName$; write
            if Error <> NO_ERROR then
               call FGen_Error("OpenFile: FILE ERROR '"&FileName$&"' "&errm$(Error))
            end if
         else ! don't want to write over file
            call FGen_Error( "OpenFile: USER STOPPED PROGRAM" )
         end if
      else ! file error of some sort
         call FGen_Error( "OpenFile: FILE ERROR '"&FileName$&"' "&errm$(Error) )
      end if
   end if subend sub PrintBits( Value, Number_of_bits )
!-----------------------------------------------------------------
!
!     This routine prints the boolean representation of an integer
!  parameter to the current printer device.  The boolean values are
!  printed from MSB ( most significant bit ) to LSB ( least
!  significant bit ).  Example: decimal value 23 = "00010111", if
!  eight(8) bits are requested in the <Number_of_bits> parameter.
!
```

```
!     GLOBAL OUTPUTS:
!
!          ""    -------------- no global outputs are exported.
!
!     GLOBAL INPUTS:
!
!          ""    -------------- no global inputs are imported.
!
!     SUBROUTINE PARAMETERS:
!
!          Value ------------ Integer parameter.  Range = -32768..32767
!
!          Number_of_bits --- Size of the boolean representation of the
!                             integer parameter.  Range = 1..16
!
!------------------------------------------------------------------------ if (Number_of_bits < 1) or (Number_of_bits > 16) then
     call FGen_Error( "PrintBits: Number_of_bits<1 or Number_of_bits>16" )
   end if if (Value < -32768) or (Value > 32767) then
     call FGen_Error( "PrintBits: Value<-32768 or Value>32767" )
   end if Buffer$ = ""
   for I = (Number_of_bits-1) to 0 step -1
     Buffer$ = Buffer$ & val$( bit( Value,I ) )
   next I print Value,Buffer$ subend sub FGen_Error( Err_msg$ )
!------------------------------------------------------------------------
!
!     This routine reports an error message from the Err_msg$ string
!     parameter and stops program execution.  This routine attempts to
!     report the error on the printer device and if this is not possible,
!     the printer device is reset to the CRT and the error is reported.
!
!     GLOBAL OUTPUTS:
!
!          ""    -------------- no global outputs are exported.
!
!     GLOBAL INPUTS:
!
!          ""    -------------- no global inputs are imported.
!
!     SUBROUTINE PARAMETERS:
!
!          Err_msg$ ---------- String variable containing error message.  This
!                              message is sent to the printer device.
!
!------------------------------------------------------------------------ dim Default_output$[80]
   Default_output$ = "/dev/crt"&crt$
   Device = 4                    ! status value of an HFS device node status Default_output$;Error,Opened,Type
   if Type=Device then assign @Output_error,Error to Default_output$;write,shared if not Error and Type = Device then
     output @Output_error;Err_msg$
   else
     printer is *
     print "The default error reporting device for FGen_Error is not available,"
     print "the printer destination has been reset to the CRT."
     print Err_msg$
```

TABLE OF CONTENTS
APPENDIX B

Tone
A_LAW
MU_LAW
G_noise
Idle_Code

PRBS
U_noise
A_to_D
Digital_mW

```
!!!!!!!!!!!!!!!!!!!!!!!!!!!!!!!!!!!!!!!!!!!!!!!!!!!!!!!!!!!!!!!!!!!!!!!!!!!!
!!!!                                                                    !!!!
!!!!        M E R G E   U S E R   S U B R O U T I N E S   H E R E       !!!!
!!!!             ||                                        ||           !!!!
!!!!             \/                                        \/           !!!!
!!!!!!!!!!!!!!!!!!!!!!!!!!!!!!!!!!!!!!!!!!!!!!!!!!!!!!!!!!!!!!!!!!!!!!!!!!!!

! /TELECOM/GEN/FRAME_24CH                              Rev 3.0
!
! FRAME GENERATOR  for Bell system 24-channel frame structure
!
!
!
!
!
!
!
!
!
!
!
!
! Copyright Hewlett-Packard 1987.  All Rights Reserved.
!
!****************************************************************************
!----------------------------------------------------------------------------
!
! To add other DSP subroutines, simply type in the following BTBasic commands
! at the command line:
!
!    edit 9999          ! This places the edit cursor at the last line.
!    merge "file id"    ! Merge the "file id" source at the current edit line.
!
!----------------------------------------------------------------------------
!
!    This program is meant to be modified by the user BEFORE it is executed.
! The first half of this program consists of routines that fill pre-defined
! variables (arrays or numeric variables) with values from data files, user
! entry or DSP subroutine generated data.  These predefined variables reflect
! the data field(s) within this particular serial frame format.
!
!    The second half of this program consists of a subroutine that formats the
! values within the predefined variables into this serial frame format.  The
! manner in which the predefined variables are formatted is discussed in the
! comment section of the framing subroutine.
!
!    The subroutines following the framing subroutine are standard throughout
! the frame generator programs.  Not all of these subroutines are used in a
! particular frame generator.  These subroutines are documented in the comment
! section proceding the implementation section of each subroutine.
!
!    This allows the user to have complete control and flexibility over data
! field values and how they are generated.  Each frame generator program is to
! be used for a different frame format.
!
!----------------------------------------------------------------------------
!
! USER MODIFIABLE PARAMETERS
!
I              = 0        ! Scratch variable.
MAX_LEN        = 1000     ! Maximum number of frames.  Same value used in
                          !   data field array dimensioning.
```

```
LEN                = 0          ! Default number of frames to generate.
dim CH(23,1000)                 ! Channel field array.
!--------------------------------------------------------------------- print using "@"
print "24 CHANNEL FRAME GENERATOR"
print
print loop
   input "Enter number of frames to be generated : ",LEN
   exit if (LEN >= 1) and (LEN < MAX_LEN)
   print "VALUE OUT OF RANGE, RANGE = 1 ..";MAX_LEN;", RETRY"
end loop !************************************************************************
! Retrieve/Generate field data for frame(s)
!************************************************************************

!!!!!!!!!!!!!!!!!!!!!!!!!!!!!   E X A M P L E   !!!!!!!!!!!!!!!!!!!!!!!!!!!!!
!
! Channel 1 data is generated from dsp subroutines; tone and mu_law
!
dim TempCH1(1000)                       ! Temporary array for channel#1 data.
                                        ! Dimensioned to MAX_LEN elements.
print
input "Enter the tone frequency(Hz) to be generated : ",Frequency
!
! use rms value to produce full range
!
VRMS          = 8159 / sqr(2)           ! for MU_LAW
Phase         = 0
SampFrequency = 8000
call Tone( VRMS, Frequency, Phase, SampFrequency, LEN, TEMPCH1(*) )
call MU_law( LEN, TEMPCH1(*) )
!
! transfer to appropriate row of channel array
!
for I = 0 to LEN-1
   CH(0,I) = TEMPCH1(I)
next I
!
! Be sure to merge TONE and MU_LAW at end of test
!

!!!!!!!!!!!!!!!!!!!!!!!!!!!!!   E X A M P L E   !!!!!!!!!!!!!!!!!!!!!!!!!!!!!
!
! Retrieve channels 2 through 24 data from files.
!
dim TempArray(1000)         ! Dimensioned to MAX_LEN elements.
print
for Channel = 2 to 24
   FileName$ = "ch24#data" & val$(Channel)

print "Retrieving channel ";val$(Channel);" field data from '";FileName$;"'"

call ReadArray( FileName$, LEN, TempArray(*) )

for I = 0 to LEN - 1
      CH( Channel-1, I ) = TempArray( I )
   next I
next Channel
print call Generate_24ch( "ch24#file", LEN, CH(*) )

print
```

```
    print "FRAME GENERATOR SUCCESSFULLY COMPLETED"

end ! main program

!!!!!!!!!!!!!!!!!!!!!!!!!!!!!!!!!!!!!!!!!!!!!!!!!!!!!!!!!!!!!!!!!!!!!!!!!!!!!!
!!!!                                                                      !!!!
!!!!             P R O G R A M   S U B R O U T I N E S                    !!!!
!!!!                                                                      !!!!
!!!!!!!!!!!!!!!!!!!!!!!!!!!!!!!!!!!!!!!!!!!!!!!!!!!!!!!!!!!!!!!!!!!!!!!!!!!!!!

sub Generate_24ch( FileName$, Length, CH24(*) )
!-----------------------------------------------------------------------
!
!    This routine will open the output file, generate the framed field
! data, output the framed data to the output file, and close the output
! file.  Any fatal error encountered will be reported and program
! execution will stop.
!
!    This subroutine reproduces the Bell System 24-channel frame structure.
! The 24 channel frame consists of a master frame bit followed by 24 time
! slots of data.  Each time slot consists of 8 boolean values MSB to LSB.
!
!    For example, if Length = 1 and the CH24 array is filled with the
! following values:
!
!              |----- Channel 0..23 for 24 channels of data.
!              |  |-- This index represents a frame of data.
!              |  |
!     Channel( 0, 0) = 1
!     Channel( 1, 0) = 2
!     Channel( 2, 0) = 3
!     Channel( 3, 0) = 4
!     Channel( 4, 0) = 5
!     Channel( 5, 0) = 6
!     Channel( 6, 0) = 7
!     Channel( 7, 0) = 8
!     Channel( 8, 0) = 9
!     Channel( 9, 0) = 10
!     Channel(10, 0) = 11
!     Channel(11, 0) = 12
!     Channel(12, 0) = 13
!     Channel(13, 0) = 14
!     Channel(14, 0) = 15
!     Channel(15, 0) = 16
!     Channel(16, 0) = 17
!     Channel(17, 0) = 18
!     Channel(18, 0) = 19
!     Channel(19, 0) = 20
!     Channel(20, 0) = 21
!     Channel(21, 0) = 22
!     Channel(22, 0) = 23
!     Channel(23, 0) = 24
!
! The output file will be as follows:
!
!     100000001
!     000000010000001100000100000001010000011000000111000010000000001001
!     000010100001011000011000000110100001110000111100010000000010001
!     000100100001001100010100000101010001011000010111000011000;;
!
!
!
! GLOBAL OUTPUTS:
!
!     ""    -------------- no global outputs are exported.
!
! GLOBAL INPUTS:
```

```
!           ""       ------------- no global inputs are imported.
!
! SUBROUTINE PARAMETERS:
!
!           FileName$ --------  A string containing the file pathname of the
!                               output file.
!
!           Length    ---------- The number of frames to be generated.
!                               Range = 1..MAX_LEN
!
!           CH24(*)  ---------- Array id parameter containing 24 channels of pcm
!                               data.  The array must be dimensioned as a two(2)
!                               dimensional array prior to calling this subroutine.
!                               The first dimension holds the 24 time slot values
!                               while the second dimension represents the full
!                               frame values for one frame.
!
!--------------------------------------------------------------------- dim Buffer$[80]

call OpenFile( FileName$, @FilePtr )

FTbit    = 1
  FSbit    = 0
  FirstBit = 0 for Frame = 0 to Length-1 if Frame mod 2 = 0 then
       FirstBit = FTbit
       FTbit = not FTbit
    else
       FirstBit = FSbit
       ! flip bit every sixth frame
       if Frame mod 6 = 5 then FSbit = not FSbit
    end if Buffer$ = ""

call GetBitsMSB( FirstBit, 1, Buffer$ )

for Channel = 0 to 23
      call GetBitsMSB( CH24( Channel, Frame ), 8, Buffer$ )
      !
      ! Output Buffer$ so that overflow will not occur
      !
      if Channel mod 8 = 0 then
        output @FilePtr;Buffer$
        Buffer$ = ""
      end if
    next Channel
    !
    ! The last frame of data ends with two ";" characters
    !
    if Frame = Length-1 then
       output @FilePtr;Buffer$;";;"
    else
       output @FilePtr;Buffer$;";"
    end if
  next FRAME
  !
  ! close the output file
  !
  assign @FilePtr,Error to * subend
```

```
sub GetBitsMSB( Value, Number_of_bits, Buffer$ )
!------------------------------------------------------------------------
!
!     This routine retrieves the boolean representation of an integer
!  parameter and appends it to a string parameter.  The boolean values
!  are stripped from MSB ( most significant bit ) to LSB ( least
!  significant bit ).  Example: decimal value 23 = "00010111", if
!  eight(8) bits are requested in the <Number_of_bits> parameter.
!
!  Note: If the <Value> parameter is greater than the 2's complement
!  range for the <Number_of_bits> parameter requested, the extra bits
!  withing the <Value> parameter are ignored and not put into the <Buffer$>
!  string parameter.
!
!
!
!  GLOBAL OUTPUTS:
!
!       ""      -------------- no global outputs are exported.
!
!
!  GLOBAL INPUTS:
!
!       ""      -------------- no global inputs are imported.
!
!  SUBROUTINE PARAMETERS:
!
!       Value ------------ Integer parameter.  Range = -32768..32767
!
!       Number_of_bits --- Size of the boolean representation of the
!                          integer parameter.  Range = 1..16
!
!       Buffer$ ---------- String parameter to which the boolean representation
!                          is appended.
!
!------------------------------------------------------------------------ if (Number_of_bits < 1) or (Number_of_bits > 16) then
      call FGen_Error( "GetBitsMSB: Number_of_bits<1 or Number_of_bits>16" )
   end if if (Value < -32768) or (Value > 32767) then
      call FGen_Error( "GetBitsMSB: Value<-32768 or Value>32767" )
   end if for I = (Number_of_bits-1) to 0 step -1
      Buffer$ = Buffer$ & val$( bit( Value,I ) )
   next I subend sub GetBitsLSB( Value, Number_of_bits, Buffer$ )
!------------------------------------------------------------------------
!
!     This routine retrieves the boolean representation of an integer
!  parameter and appends it to a string parameter.  The boolean values
!  are stripped from LSB ( least significant bit ) to MSB ( most
!  significant bit ).  Example: decimal value 23 = "11101000", if
!  eight(8) bits are requested in the <Number_of_bits> parameter.
!
!  Note: If the <Value> parameter is greater than the 2's complement
!  range for the <Number_of_bits> parameter requested, the extra bits
!  withing the <Value> parameter are ignored and not put into the <Buffer$>
!  string parameter.
!
!
!
!  GLOBAL OUTPUTS:
!
!       ""      -------------- no global outputs are exported.
!
!
!  GLOBAL INPUTS:
```

```
!          ""      ------------- no global inputs are imported.
!
! SUBROUTINE PARAMETERS:
!
!      Value ------------ Integer parameter.  Range = -32768..32767
!
!      Number_of_bits --- Size of the boolean representation of the
!                         integer parameter.  Range = 1..16
!
!      Buffer$ ---------- String parameter to which the boolean representation
!                         is appended.
!
!------------------------------------------------------------------------ if (Number_of_bits < 1) or (Number_of_bits > 16) then
      call FGen_Error( "GetBitsLSB: Number_of_bits<1 or Number_of_bits>16" )
   end if if (Value < -32768) or (Value > 32767) then
      call FGen_Error( "GetBitsLSB: Value<-32768 or Value>32767" )
   end if for I = 0 to (Number_of_bits-1)
      Buffer$ = Buffer$ & val$( bit( Value,I ) )
   next I subend sub ReadArray( FileName$, Length, Array(*) )
!------------------------------------------------------------------------
!
!    This routine reads an ASCII text file of integer data (one integer
! per line ) into an array. .-Any errors found during file access are
! reported and the program execution is stopped.  If the file does not
! contain Length number of integers, an error occurs and program execution
! is stopped.
!
!
! GLOBAL OUTPUTS:
!
!      ""      --------------- no global outputs are exported.
!
!
! GLOBAL INPUTS:
!
!      ""      ------------- no global inputs are imported.
!
! SUBROUTINE PARAMETERS:
!
!     FileName$ ---------- A string the containing file pathname of the file
!                          to be read into the Array parameter.
!
!     Length ------------- The number of integers to be read into the Array
!                          parameter.  Range = 1..32766
!
!     Array -------------- Array id.  The integer values read from the file
!                          are returned in this parameter.  The array must
!                          be dimensioned prior to calling this subroutine.
!                          The array must be a single(1) dimensioned array.
!                          The array indices are assumed to start at zero(0)
!                          and stop at Length-1 or greater than Length-1.
!
!------------------------------------------------------------------------

NO_ERROR            = 0
   EOF                 = 101007
   FILE_NOT_FOUND      = 100009
   WRONG_FILE_TYPE     = 101015
   FILE_NOT_ASSIGNED   = 136
   FILE_EXISTS         = 275
```

```
    assign @File, Error to FileName$
    if Error <> NO_ERROR then
      call FGen_Error( "ReadArray: FILE ERROR '"&FileName$&"' "&errm$(Error) )
    end if for Index = 0 to Length-1
      enter @File,,Error; Array(Index)
      if Error <> NO_ERROR then
        if Error = EOF then
          call FGen_Error( "ReadArray: MORE DATA EXPECTED FROM '"&FileName$&"'" )
        else
          call FGen_Error("ReadArray: FILE ERROR '"&FileName$&"' "&errm$(Error))
        end if
      end if
    next Index subend sub OpenFile( FileName$, @FilePtr )
!-------------------------------------------------------------------------
!
!    This routine opens an ASCII text file for output.  If the file already
! exists, the user is prompted for overwrite.  If the file does not exist,
! the file is created.  If any other file error occurs, the error is reported
! to the CRT and program execution stops.
!
!
! GLOBAL OUTPUTS:
!
!     ""       -------------- no global outputs are exported.
!
! GLOBAL INPUTS:
!
!     ""       -------------- no global inputs are imported.
!
! SUBROUTINE PARAMETERS:
!
!     FileName$ ----------- A string containing the file pathname of the
!                           output text file.
!
!     @FilePtr  ----------- The '@' file pointer.  If the file is opened,
!                           this pointer may be used by output statements
!                           to write data to the file.
!
!-------------------------------------------------------------------------

NO_ERROR          = 0
    EOF               = 101007
    FILE_NOT_FOUND    = 100009
    WRONG_FILE_TYPE   = 101015
    FILE_NOT_ASSIGNED = 136
    FILE_EXISTS       = 275 assign @FilePtr, Error to FileName$;write,new
    if Error <> NO_ERROR then
      if Error = FILE_EXISTS then
        print
        print "The file '";FileName$;"' already exists."
        print "Do you want to write over this file (yes or no)?"
        input Answer$
        if lwc$(Answer$[1;1]) = "y" then
          assign @FilePtr,Error to FileName$; write
          if Error <> NO_ERROR then
            call FGen_Error("OpenFile: FILE ERROR '"&FileName$&"' "&errm$(Error))
          end if
        else ! don't want to write over file
          call FGen_Error( "OpenFile: USER STOPPED PROGRAM" )
        end if
      else ! file error of some sort
        call FGen_Error( "OpenFile: FILE ERROR '"&FileName$&"' "&errm$(Error) )
      end if
    end if subend
```

```
sub PrintBits( Value, Number_of_bits )
!----------------------------------------------------------------
!
!      This routine prints the boolean representation of an integer
!  parameter to the current printer device.  The boolean values are
!  printed from MSB ( most significant bit ) to LSB ( least
!  significant bit ).  Example: decimal value 23 = "00010111", if
!  eight(8) bits are requested in the <Number_of_bits> parameter.
!
!  GLOBAL OUTPUTS:
!
!      ""     -------------- no global outputs are exported.
!
!  GLOBAL INPUTS:
!
!      ""     -------------- no global inputs are imported.
!
!  SUBROUTINE PARAMETERS:
!
!      Value ------------ Integer parameter.   Range = -32768..32767
!      Number_of_bits --- Size of the boolean representation of the
!                         integer parameter.  Range = 1..16
!
!---------------------------------------------------------------- if (Number_of_bits < 1) or (Number_of_bits > 16) then
     call FGen_Error( "PrintBits: Number_of_bits<1 or Number_of_bits>16" )
   end if if (Value < -32768) or (Value > 32767) then
     call FGen_Error( "PrintBits: Value<-32768 or Value>32767" )
   end if Buffer$ = ""
   for I = (Number_of_bits-1) to 0 step -1
     Buffer$ = Buffer$ & val$( bit( Value,I ) )
   next I print Value,Buffer$ subend sub FGen_Error( Err_msg$ )
!----------------------------------------------------------------
!
!      This routine reports an error message from the Err_msg$ string
!  parameter and stops program execution.  This routine attempts to
!  report the error on the printer device and if this is not possible,
!  the printer device is reset to the CRT and the error is reported.
!
!  GLOBAL OUTPUTS:
!
!      ""     -------------- no global outputs are exported.
!
!  GLOBAL INPUTS:
!
!      ""     -------------- no global inputs are imported.
!
!  SUBROUTINE PARAMETERS:
!
!      Err_msg$ --------- String variable containing error message.  This
!                         message is sent to the printer device.
!
!---------------------------------------------------------------- dim Default_output$[80]
   Default_output$ = "/dev/crt"&crt$
   Device = 4                    ! status value of an HFS device node status Default_output$;Error,Opened,Type
   if Type=Device then assign @Output_error,Error to Default_output$;write,shared
```

```
  if not Error and Type = Device then
    output @Output_error;Err_msg$
  else
    printer is *
    print "The default error reporting device for FGen_Error is not available,"
    print "the printer destination has been reset to the CRT."
    print Err_msg$
  end if
  stop
subend
```

TABLE OF CONTENTS
APPENDIX D

| | |
|---|---|
| PCFEN | Code_gen |
| PARSE_FFILE | 15 PCF_REPL_FRAME |
| SCAN_FFILE_LINE | GET_CHAR |
| PCFCOM_SCAN | READ_LINE |
| PCF_SCAN | ABORT |
| COMM_PROC | Warning |
| ASSIGN_DFILE | 20 CLOSE_FILES |

```
!!!!!!!!!!!!!!!!!!!!!!!!!!!!!!!!!!!!!!!!!!!!!!!!!!!!!!!!!!!!!!!!!!!!!!!!!!!!!!!!
!!!!                                                                        !!!!
!!!!        M E R G E   U S E R   S U B R O U T I N E S   H E R E           !!!!
!!!!              ||                                      ||                !!!!
!!!!              \/                                      \/                !!!!
!!!!!!!!!!!!!!!!!!!!!!!!!!!!!!!!!!!!!!!!!!!!!!!!!!!!!!!!!!!!!!!!!!!!!!!!!!!!!!!!

! /TELECOM/GEN/FRAME_30CH                                  Rev 3.0
!
! FRAME GENERATOR   for the CEPT 30-channel frame structure  (G.732)
!
!
!
!
!
!
!
!
!
!
!
!
! Copyright Hewlett-Packard 1987.  All Rights Reserved.
!
!*******************************************************************************
!-------------------------------------------------------------------------------
!
! To add other DSP subroutines, simply type in the following BTBasic commands
! at the command line:
!
!   edit 9999         ! This places the edit cursor at the last line.
!   merge "file id"   ! Merge the "file id" source at the current edit line.
!
!-------------------------------------------------------------------------------
!
!    This program is meant to be modified by the user BEFORE it is executed.
! The first half of this program consists of routines that fill pre-defined
! variables (arrays or numeric variables) with values from data files, user
! entry or DSP subroutine generated data.  These predefined variables reflect
! the data field(s) within this particular serial frame format.
!
!    The second half of this program consists of a subroutine that formats the
! values within the predefined variables into this serial frame format.  The
! manner in which the predefined variables are formatted is discussed in the
! comment section of the framing subroutine.
!
!    The subroutines following the framing subroutine are standard throughout
! the frame generator programs.  Not all of these subroutines are used in a
! particular frame generator.  These subroutines are documented in the comment
! section procedding the implementation section of each subroutine.
```

```
!     This allows the user to have complete control and flexibility over data
!     field values and how they are generated.  Each frame generator program is to
!     be used for a different frame format.
!
!------------------------------------------------------------------------
!
! USER MODIFIABLE PARAMETERS
!
I              = 0          ! Scratch variable.
MAX_LEN        = 1000       ! Maximum number of frames.  Same value used in
                            !   data field array dimensioning.
LEN            = 0          ! Default number of frames to generate.
dim CH(29,1000)             ! Channel field array.
dim CTRL(1000)              ! Control field array.
dim SIGL(1000)              ! Signal field array.
!------------------------------------------------------------------------ print using "@"
print "CEPT 30 Channel FRAME GENERATOR"
print loop
   input "Enter number of frames to be generated : ",LEN
   exit if (LEN >= 1) and (LEN < MAX_LEN)
   print "VALUE OUT OF RANGE, RANGE = 1 ..";MAX_LEN;", RETRY"
end loop !*************************************************************************
! Retrieve/Generate field data for frame(s)
!*************************************************************************

!!!!!!!!!!!!!!!!!!!!!!!!!!!!!!   E X A M P L E   !!!!!!!!!!!!!!!!!!!!!!!!!!!!!!!!
!
! One channel of data is generated from dsp subroutines; tone and a_law
!
dim TempCH1(1000)                    ! Dimensioned to MAX_LEN
print
input "Enter the tone frequency(Hz) to be generated : ",Frequency
!
! use rms value to produce full range
!
VRMS           = 4096 / sqr(2)       ! for A_LAW
Phase          = 0
SampFrequency  = 8000
call Tone( VRMS, Frequency, Phase, SampFrequency, LEN, TempCH1(*) )
call A_law( LEN, TempCH1(*) )
!
! tranfer to appropriate row of channel array
!
for I = 0 to LEN-1
   CH( 0, I ) = TempCH1( I )
next I
!
! Be sure to merge TONE and A_LAW at end of test
!

!!!!!!!!!!!!!!!!!!!!!!!!!!!!!!   E X A M P L E   !!!!!!!!!!!!!!!!!!!!!!!!!!!!!!!!
!
! Retrieve channels 2 through 30 data from files.
!
dim TempArray(1000)           ! Dimensioned to MAX_LEN elements.
print
for Channel = 2 to 30
   FileName$ = "ch30#data" & val$(Channel)
```

```
    print "Retrieving channel ";val$(Channel);" field data from '";FileName$;"'"

call ReadArray( FileName$, LEN, TempArray(*) )

for I = 0 to LEN - 1
       CH( Channel-1, I ) = TempArray( I )
    next I
  next Channel
  print !!!!!!!!!!!!!!!!!!!!!!!!!!!!!!   E X A M P L E   !!!!!!!!!!!!!!!!!!!!!!!!!!!!!!
!
! Retrieve CONTROL field data from a text file.
!
print
FileName$ = "ch30#ctrl"
print "Retrieving CONTROL field data from '";FileName$;"'"
call ReadArray( FileName$, LEN, CTRL(*) )
print !!!!!!!!!!!!!!!!!!!!!!!!!!!!!!   E X A M P L E   !!!!!!!!!!!!!!!!!!!!!!!!!!!!!!
!
! Retrieve SIGNAL field data from a text file.
!
print
FileName$ = "ch30#sigl"
print "Retrieving SIGNAL field data from '";FileName$;"'"
call ReadArray( FileName$, LEN, SIGL(*) )
print call Generate_30ch( "ch30#file", LEN, CH(*), CTRL(*), SIGL(*) )

print
print "FRAME GENERATOR SUCCESSFULLY COMPLETED"

end ! main program

!!!!!!!!!!!!!!!!!!!!!!!!!!!!!!!!!!!!!!!!!!!!!!!!!!!!!!!!!!!!!!!!!!!!!!!!!!!!!!!
!!!!                                                                       !!!!
!!!!               P R O G R A M   S U B R O U T I N E S                   !!!!
!!!!                                                                       !!!!
!!!!!!!!!!!!!!!!!!!!!!!!!!!!!!!!!!!!!!!!!!!!!!!!!!!!!!!!!!!!!!!!!!!!!!!!!!!!!!!

sub Generate_30ch( FileName$, Length, CH30(*), Control(*), Signal(*) )
!------------------------------------------------------------------
!
!     This routine will open the output file, generate the framed field
!  data, output the framed data to the output file, and close the output
!  file.  Any fatal error encountered will be reported and program
!  execution will stop.
!
!     This subroutine reproduces the CEPT 30-channel frame structure (G.732).
!  A 30 channel frame consists of an 8 bit control field, 15 fields of
!  codec field data (8 bits), an 8 bit signal field and 15 more fields
!  of codec field data (8 bits).  All fields consists of 8 bits, MSB to LSB,
!
!     For example, if Length = 1 and the CH30 array is filled with the
!  following values:
!
!              |----- Channel 0..29 for 30 channels of data.
```

```
!            |  |-- This index represents a frame of data.
!            |  |
!    CH30( 0, 0) = 1
!    CH30( 1, 0) = 2
!    CH30( 2, 0) = 3
!    CH30( 3, 0) = 4
!    CH30( 4, 0) = 5
!    CH30( 5, 0) = 6
!    CH30( 6, 0) = 7
!    CH30( 7, 0) = 8
!    CH30( 8, 0) = 9
!    CH30( 9, 0) = 10
!    CH30(10, 0) = 11
!    CH30(11, 0) = 12
!    CH30(12, 0) = 13
!    CH30(13, 0) = 14
!    CH30(14, 0) = 15
!    CH30(15, 0) = 16
!    CH30(16, 0) = 17
!    CH30(17, 0) = 18
!    CH30(18, 0) = 19
!    CH30(19, 0) = 20
!    CH30(20, 0) = 21
!    CH30(21, 0) = 22
!    CH30(22, 0) = 23
!    CH30(23, 0) = 24
!    CH30(24, 0) = 25
!    CH30(25, 0) = 26
!    CH30(26, 0) = 27
!    CH30(27, 0) = 28
!    CH30(28, 0) = 29
!    CH30(29, 0) = 30
!
!    Control( 0) = 255
!    Signal ( 0) = 255
!
! The output file will be as follows:
!
!    1111111100000001
!    00000010000000110000010000000101000001100000011100001000000001001
!    0000101000010110000110000001101000011100000111111111110001000000010001
!    000100100010011000101000001010100010110000101110001100000011001
!    000110100001101100011100000111010001111 0 ; ;
!
!
! GLOBAL OUTPUTS:
!
!    ""    -------------- no global outputs are exported.
!
! GLOBAL INPUTS:
!
!    ""    -------------- no global inputs are imported.
!
! SUBROUTINE PARAMETERS:
!
!    FileName$ --------- A string containing the file pathname of the
!                        output file.
!
!    Length ------------ The number of frames to be generated.
!                        Range = 1..MAX_LEN
!
!    CH30(*) ----------- Array id parameter containing 30 channels of pcm
!                        data.  This array must be dimensioned as a two(2)
!                        dimension array prior to calling this subroutine.
!                        The first dimension holds the 30 time slot values
!                        while the second dimension represents the full
!                        frame values for one frame.
!
!    Control(*) -------- Array id parameter containing 8 bit (0..255)
!                        control field data.  This array must be
!                        dimensioned as a single(1) dimension array
!                        of 0 to MAX_LEN elements.
!
```

```
!         Signal(*)  --------   Array id parameter containing 8 bit (0..255)
!                               signal field data.  This array must be
!                               dimensioned as a single(1) dimension array
!                               of 0 to MAX_LEN elements.
!
!------------------------------------------------------------------------- dim Buffer$[80]

call OpenFile( FileName$, @FilePtr )

for Frame = 0 to Length-1

Buffer$ = ""

for Channel = 0 to 29
        !
        ! Before the first channel put out the control field
        !
        if Channel = 0 then
           call GetBitsMSB( Control( Frame ), 8, Buffer$ )
           end if
        !
        ! Before the 16th channel put out the signal field.
        !
        if Channel = 15 then
           call GetBitsMSB( Signal( Frame ), 8, Buffer$ )
           end if call GetBitsMSB( CH30( Channel, Frame ), 8, Buffer$ )

!
        ! Output Buffer$ so that overflow will not occur
        !
        if Channel mod 8 = 0 then
           output @FilePtr;Buffer$
           Buffer$ = ""
           end if next Channel
     !
     ! The last frame of data ends with two ";" characters
     !
     if Frame = (Length-1) then
         output @FilePtr;Buffer$;";;"
       else
         output @FilePtr;Buffer$;";"
       end if
   next Frame
   !
   ! close the output file
   !
   assign @FilePtr,Error to * subend
sub GetBitsMSB( Value, Number_of_bits, Buffer$ )
!-------------------------------------------------------------------------
!
!     This routine retrieves the boolean representation of an integer
!  parameter and appends it to a string parameter.  The boolean values
!  are stripped from MSB ( most significant bit ) to LSB ( least
!  significant bit ).  Example: decimal value 23 = "00010111", if
!  eight(8) bits are requested in the <Number_of_bits> parameter.
!
!  Note: If the <Value> parameter is greater than the 2's complement
!  range for the <Number_of_bits> parameter requested, the extra bits
!  withing the <Value> parameter are ignored and not put into the <Buffer$>
!  string parameter.
!
!
!  GLOBAL OUTPUTS:
!
!        ""     -------------  no global outputs are exported.
```

```
!   GLOBAL INPUTS:
!
!       ""    -------------- no global inputs are imported.
!
!   SUBROUTINE PARAMETERS:
!
!       Value ------------ Integer parameter.  Range = -32768..32767
!
!       Number_of_bits --- Size of the boolean representation of the
!                          integer parameter.  Range = 1..16
!
!       Buffer$ ---------- String parameter to which the boolean representation
!                          is appended.
!
!------------------------------------------------------------------------ if (Number_of_bits < 1) or (Number_of_bits > 16) then
       call FGen_Error( "GetBitsMSB: Number_of_bits<1 or Number_of_bits>16" )
    end if if (Value < -32768) or (Value > 32767) then
       call FGen_Error( "GetBitsMSB: Value<-32768 or Value>32767" )
    end if for I = (Number_of_bits-1) to 0 step -1
       Buffer$ = Buffer$ & val$( bit( Value,I ) )
    next I subend sub GetBitsLSB( Value, Number_of_bits, Buffer$ )
!------------------------------------------------------------------------
!
!       This routine retrieves the boolean representation of an integer
!   parameter and appends it to a string parameter.  The boolean values
!   are stripped from LSB ( least significant bit ) to MSB ( most
!   significant bit ).  Example: decimal value 23 = "11101000", if
!   eight(8) bits are requested in the <Number_of_bits> parameter.
!
!   Note: If the <Value> parameter is greater than the 2's complement
!   range for the <Number_of_bits> parameter requested, the extra bits
!   withing the <Value> parameter are ignored and not put into the <Buffer$>
!   string parameter.
!   GLOBAL OUTPUTS:
!
!       ""    -------------- no global outputs are exported.
!
!
!   GLOBAL INPUTS:
!
!       ""    -------------- no global inputs are imported.
!
!   SUBROUTINE PARAMETERS:
!
!       Value ------------ Integer parameter.  Range = -32768..32767
!
!       Number_of_bits --- Size of the boolean representation of the
!                          integer parameter.  Range = 1..16
!
!       Buffer$ ---------- String parameter to which the boolean representation
!                          is appended.
!
!------------------------------------------------------------------------ if (Number_of_bits < 1) or (Number_of_bits > 16) then
       call FGen_Error( "GetBitsLSB: Number_of_bits<1 or Number_of_bits>16" )
    end if if (Value < -32768) or (Value > 32767) then
       call FGen_Error( "GetBitsLSB: Value<-32768 or Value>32767" )
    end if
```

```
    for I = 0 to (Number_of_bits-1)
      Buffer$ = Buffer$ & val$( bit( Value,I ) )
    next I
subend sub ReadArray( FileName$, Length, Array(*) )
!--------------------------------------------------------------------
!
!     This routine reads an ASCII text file of integer data (one integer
! per line ) into an array.  Any errors found during file access are
! reported and the program execution is stopped.  If the file does not
! contain Length number of integers, an error occurs and program execution
! is stopped.
!
!
! GLOBAL OUTPUTS:
!
!      ""     ------------- no global outputs are exported.
!
!
! GLOBAL INPUTS:
!
!      ""     ------------- no global inputs are imported.
!
! SUBROUTINE PARAMETERS:
!
!    FileName$ ----------- A string the containing file pathname of the file
!                          to be read into the Array parameter.
!
!    Length   ------------- The number of integers to be read into the Array
!                          parameter.  Range = 1..32766
!    Array    ------------- Array id.  The integer values read from the file
!                          are returned in this parameter.  The array must
!                          be dimensioned prior to calling this subroutine.
!                          The array must be a single(1) dimensioned array.
!                          The array indices are assumed to start at zero(0)
!                          and stop at Length-1 or greater than Length-1.
!
!--------------------------------------------------------------------

NO_ERROR              = 0
    EOF                   = 101007
    FILE_NOT_FOUND        = 100009
    WRONG_FILE_TYPE       = 101015
    FILE_NOT_ASSIGNED     = 136
    FILE_EXISTS           = 275 assign @File, Error to FileName$
    if Error <> NO_ERROR then
      call FGen_Error( "ReadArray: FILE ERROR '"&FileName$&"' "&errm$(Error) )
    end if for Index = 0 to Length-1
      enter @File,,Error; Array(Index)
      if Error <> NO_ERROR then
        if Error = EOF then
          call FGen_Error( "ReadArray: MORE DATA EXPECTED FROM '"&FileName$&"'" )
        else
          call FGen_Error("ReadArray: FILE ERROR '"&FileName$&"' "&errm$(Error))
        end if
      end if
    next Index subend sub OpenFile( FileName$, @FilePtr )
!--------------------------------------------------------------------
!
!     This routine opens an ASCII text file for output.  If the file already
! exists, the user is prompted for overwrite.  If the file does not exist,
```

```
!    the file is created.  If any other file error occurs, the error is reported
!    to the CRT and program execution stops.
!
!
!  GLOBAL OUTPUTS:
!
!       ""       -------------  no global outputs are exported.
!
!
!  GLOBAL INPUTS:
!
!       ""       -------------  no global inputs are imported.
!
!  SUBROUTINE PARAMETERS:
!
!      FileName$ -----------  A string containing the file pathname of the
!                             output text file.
!
!      @FilePtr  -----------  The '@' file pointer.  If the file is opened,
!                             this pointer may be used by output statements
!                             to write data to the file.
!
!-----------------------------------------------------------------------------

NO_ERROR              = 0
   EOF                   = 101007
   FILE_NOT_FOUND        = 100009
   WRONG_FILE_TYPE       = 101015
   FILE_NOT_ASSIGNED     = 136
   FILE_EXISTS           = 275 assign @FilePtr, Error to FileName$;write,new
   if Error <> NO_ERROR then
     if Error = FILE_EXISTS then
       print
       print "The file '";FileName$;"' already exists."
       print "Do you want to write over this file (yes or no)?"
       input Answer$
       if lwc$(Answer$[1;1]) = "y" then
         assign @FilePtr,Error to FileName$; write
         if Error <> NO_ERROR then
           call FGen_Error("OpenFile: FILE ERROR '"&FileName$&"' "&errm$(Error))
         end if
       else ! don't want to write over file
         call FGen_Error( "OpenFile: USER STOPPED PROGRAM" )
       end if
     else ! file error of some sort
       call FGen_Error( "OpenFile: FILE ERROR '"&FileName$&"' "&errm$(Error) )
     end if
   end if subend sub PrintBits( Value, Number_of_bits )
!-----------------------------------------------------------------------------
!
!     This routine prints the boolean representation of an integer
!  parameter to the current printer device.  The boolean values are
!  printed from MSB ( most significant bit ) to LSB ( least
!  significant bit ).  Example: decimal value 23 = "00010111", if
!  eight(8) bits are requested in the <Number_of_bits> parameter.
!
!  GLOBAL OUTPUTS:
!
!       ""       -------------  no global outputs are exported.
!
!  GLOBAL INPUTS:
!
!       ""       -------------  no global inputs are imported.
!
!  SUBROUTINE PARAMETERS:
!
!       Value    ------------  Integer parameter.  Range = -32768..32767
```

```
!     Number_of_bits --- Size of the boolean representation of the
!                        integer parameter.  Range = 1..16
!
!----------------------------------------------------------------------- if (Number_of_bits < 1) or (Number_of_bits > 16) then
    call FGen_Error( "PrintBits: Number_of_bits<1 or Number_of_bits>16" )
  end if if (Value < -32768) or (Value > 32767) then
    call FGen_Error( "PrintBits: Value<-32768 or Value>32767" )
  end if Buffer$ = ""
  for I = (Number_of_bits-1) to 0 step -1
    Buffer$ = Buffer$ & val$( bit( Value,I ) )
  next I print Value,Buffer$ subend sub FGen_Error( Err_msg$ )
!-----------------------------------------------------------------------
!
!     This routine reports an error message from the Err_msg$ string
!  parameter and stops program execution.  This routine attempts to
!  report the error on the printer device and if this is not possible,
!  the printer device is reset to the CRT and the error is reported.
!
!  GLOBAL OUTPUTS:
!
!      ""           ------------- no global outputs are exported.
!
!  GLOBAL INPUTS:
!
!      ""           ------------- no global inputs are imported.
!
!  SUBROUTINE PARAMETERS:
!
!      Err_msg$     ---------- String variable containing error message.  This
!                              message is sent to the printer device.
!
!----------------------------------------------------------------------- dim Default_output$[80]
  Default_output$ = "/dev/crt"&crt$
  Device = 4                       ! status value of an HFS device node status Default_output$;Error,Opened,Type
  if Type=Device then assign @Output_error,Error to Default_output$;write,shared if not Error and Type = Device then
    output @Output_error;Err_msg$
  else
    printer is *
    print "The default error reporting device for FGen_Error is not available,"
    print "the printer destination has been reset to the CRT."
    print Err_msg$
  end if
  stop
subend !!!!!!!!!!!!!!!!!!!!!!!!!!!!!!!!!!!!!!!!!!!!!!!!!!!!!!!!!!!!!!!!!!!!!!!!!!!!!!
!!!!                                                                      !!!!
!!!!         M E R G E   U S E R   S U B R O U T I N E S   H E R E        !!!!
!!!!              ||                                        ||            !!!!
!!!!              \/                                        \/            !!!!
!!!!!!!!!!!!!!!!!!!!!!!!!!!!!!!!!!!!!!!!!!!!!!!!!!!!!!!!!!!!!!!!!!!!!!!!!!!!!!
```

```
! /TELECOM/GEN/FRAME_HDLC                                    Rev 3.0
!
! FRAME GENERATOR  for the HDLC (X.25) frame structure
!
!
!
!
!
!
!
!
!
!
!
!
!
!
!
! Copyright Hewlett-Packard 1987.  All Rights Reserved.
!
!**********************************************************************
!----------------------------------------------------------------------
!
! To add other DSP subroutines, simply type in the following BTBasic commands
! at the command line:
!
!   edit 9999           ! This places the edit cursor at the last line.
!   merge "file id"     ! Merge the "file id" source at the current edit line.
!
!----------------------------------------------------------------------
!
!    This program is meant to be modified by the user BEFORE it is executed.
! The first half of this program consists of routines that fill pre-defined
! variables (arrays or numeric variables) with values from data files, user
! entry or DSP subroutine generated data.  These predefined variables reflect
! the data field(s) within this particular serial frame format.
!
!    The second half of this program consists of a subroutine that formats the
! values within the predefined variables into this serial frame format.  The
! manner in which the predefined variables are formatted is discussed in the
! comment section of the framing subroutine.
!
!    The subroutines following the framing subroutine are standard throughout
! the frame generator programs.  Not all of these subroutines are used in a
! particular frame generator.  These subroutines are documented in the comment
! section proceding the implementation section of each subroutine.
!
!-   This allows the user to have complete control and flexibility over data
! field values and how they are generated.  Each frame generator program is to
! be used for a different frame format.
!
!----------------------------------------------------------------------
!
! USER MODIFIABLE PARAMETERS
!
I               = 0         ! Scratch variable.
MAX_LEN         = 1000      ! Maximum number of frames.  Same value used in
                            !  data field array dimensioning.
LEN             = 0         ! Default number of frames to generate.
dim CTRL(1000)              ! Control field array.
dim ADDR(1000)              ! Address field array.
dim INFO(32766)             ! Information field array.
                            ! Array id parameter containing the HDLC
                            ! information field data.  This array must be
                            ! dimensioned as a single(1) dimension array
                            ! of 0 to MAX_INFO elements.  Although the Address
                            ! and Control arrays have each element placed in
                            ! a frame, the Info array can have any number of
                            ! elements placed in a frame.  The values in the
                            ! Info array are placed in the INFORMATION field
                            ! of the HDLC frame until an integer value of -1
                            ! is encountered in the sequence of elements in
                            ! the Info array.  The number of elements in the
                            ! Info array does NOT correspond to the number of
                            ! elements in the Address or Control field arrays.
!----------------------------------------------------------------------
```

```
print using "@"
print "HDLC FRAME GENERATOR"
print
print loop
   input "Enter number of frames to be generated : ",LEN
   exit if (LEN >= 1) and (LEN < MAX_LEN)
   print "VALUE OUT OF RANGE, RANGE = 1 ..";MAX_LEN;", RETRY"
   end loop !!!!!!!!!!!!!!!!!!!!!!!!!!!!!   E X A M P L E   !!!!!!!!!!!!!!!!!!!!!!!!!!!!!!!!
!
! Retrieve ADDRESS field data from a text file.
!
print
FileName$ = "hdlc#addr"
print "Retrieving ADDRESS field data from '";FileName$;"'"
call ReadArray( FileName$, LEN, ADDR(*) )
print !!!!!!!!!!!!!!!!!!!!!!!!!!!!!   E X A M P L E   !!!!!!!!!!!!!!!!!!!!!!!!!!!!!!!!
!
! Retrieve CONTROL field data from a text file.
!
print
FileName$ = "hdlc#ctrl"
print "Retrieving CONTROL field data from '";FileName$;"'"
call ReadArray( FileName$, LEN, CTRL(*) )
print !!!!!!!!!!!!!!!!!!!!!!!!!!!!!   E X A M P L E   !!!!!!!!!!!!!!!!!!!!!!!!!!!!!!!!
!
! Retrieve INFORMATION field data from a text file.
!
print
FileName$ = "hdlc#info"
print "Retrieving INFORMATION field data from '";FileName$;"'"
call ReadInfo( FileName$, LEN, INFO(*) )
print call Generate_hdlc( "hdlc#file", LEN, ADDR(*), CTRL(*), INFO(*) )

print print "FRAME GENERATOR SUCCESSFULLY COMPLETED"

end ! main program

!!!!!!!!!!!!!!!!!!!!!!!!!!!!!!!!!!!!!!!!!!!!!!!!!!!!!!!!!!!!!!!!!!!!!!!!!!!!!!!!
!!!!                                                                        !!!!
!!!!              P R O G R A M   S U B R O U T I N E S                     !!!!
!!!!                                                                        !!!!
!!!!!!!!!!!!!!!!!!!!!!!!!!!!!!!!!!!!!!!!!!!!!!!!!!!!!!!!!!!!!!!!!!!!!!!!!!!!!!!!
```

```
sub Generate_hdlc( FileName$, Length, Address(*), Control(*), Info(*) )
!--------------------------------------------------------------------------
!
!      This routine will open the output file, generate the framed field
!   data, output the framed data to the output file, and close the output
!   file.  Any fatal error encountered will be reported and program
!   execution will stop.
!
!      The HDLC frame structure consists of three user defined data fields.
!   The first two fields, ADDRESS and CONTROL are simply 8 or 16 bit boolean
!   data fields with a bit order of LSB to MSB.  The INFORMATION field consists
!   of any number of 8 bit boolean data, MSB to LSB.  The ADDRESS and CONTROL
!   arrays have each element contain a data value for each frame, the INFORMATION
!   array contains a sequence of 8 bit values (0..255) followed by the integer
!   value of -1.  This allows the user to define any number of 8 bit boolean
!   data values for the INFORMATION field within an HDLC frame.
!
!
!   HDLC bit stream:
!
!      FLAG:ADDRESS:CONTROL:FCS:FLAG
!      FLAG:ADDRESS:CONTROL:INFORMATION:FCS:FLAG
!
!      Where:
!
!         FLAG        = "01111110" bit pattern
!         ADDRESS     = 8 or 16 bits
!         CONTROL     = 8 or 16 bits
!         INFORMATION = N number of octets(8 bit words), N is an integer value
!         FCS         = Frame Check Sequence (calculated from ADDRESS,CONTROL
!                       and INFORMATION fields).
!
!   EXAMPLE:
!
!      Generate one frame of HDLC from the following data within the field data
!      arrays:
!
!         Address(0) = 168
!         Control(0) = 85
!         Info(0)    = 1
!         Info(1)    = 2
!         Info(2)    = 3
!         Info(3)    = 4
!         Info(4)    = -1
!
!      Produces the following output file:
!
!   GLOBAL OUTPUTS:
!
!         ""          ------------- no global outputs are exported.
!
!   GLOBAL INPUTS:
!
!         ""          ------------- no global inputs are imported.
!
!   SUBROUTINE PARAMETERS:
!
!         FileName$ --------- String containing file pathname of the output
!                             file.
!
!         Length ------------ The number of frames to be generated.
!                             Range = 1..MAX_LEN
!
!         Address(*) -------- Array id parameter containing the HDLC
!                             address field data.  This array must be
!                             dimensioned as a single(1) dimension array
!                             of 0 to MAX_LEN elements prior to calling
!                             this subroutine.
!
!         Control(*) -------- Array id parameter containing the HDLC
!                             control field data.  This array must be
!                             dimensioned as a single(1) dimension array
!                             of 0 to MAX_LEN elements prior to calling
!                             this subroutine.
```

```
!       Info(*)  ----------  Array id parameter containing the HDLC
!                            information field data.  This array must be
!                            dimensioned as a single(1) dimension array
!                            of 0 to MAX_INFO elements.  Although the Address
!                            and Control arrays have each element placed in
!                            a frame, the Info array can have any number of
!                            elements placed in a frame.  The values in the
!                            Info array are placed in the INFORMATION field
!                            of the HDLC frame until an integer value of -1
!                            is encountered in the sequence of elements in
!                            the Info array.  The number of elements in the
!                            Info array does NOT correspond to the number of
!                            elements in the Address or Control field arrays.
!
!------------------------------------------------------------------------ dim Buffer$[80], FLAG$[8]
   FLAG$            = "01111110"
   MAX_BUFFER_SIZE  = 60
   ADDRESS_SIZE     = 8
   CONTROL_SIZE     = 8 call OpenFile( FileName$, @FilePtr )

InfoCount       = 0 for Frame = 0 to Length-1

FirstBuffer = 1        ! Boolean used to output opening flag
      Buffer$     = ""       ! Initialize output buffer
      BitCount    = 0        ! Counter for frame bits
      TransCount  = 0        ! Transparency bit counter
      CRC2        = 0        ! Second CRC for FCS calculation BitCount = BitCount + ADDRESS_SIZE call GetBitsLSB( Address( Frame ), ADDRESS_SIZE, Buffer$ )

BitCount = BitCount + CONTROL_SIZE
call GetBitsLSB( Control( Frame ), CONTROL_SIZE, Buffer$ )

loop
   exit if Info( InfoCount ) = -1

BitCount = BitCount + 8
   call GetBitsMSB( Info( InfoCount ), 8, Buffer$ )

InfoCount = InfoCount + 1 if len( Buffer$) > MAX_BUFFER_SIZE then
      call ReadyForOutput( TransCount, CRC2, Buffer$ )

if FirstBuffer then
        FirstBuffer = 0
        output @FilePtr;Flag$;Buffer$
      else
        output @FilePtr;Buffer$
        end if
      Buffer$ = ""
      end if
end loop
!
! Skip end of frame marker (-1) in info array
!
InfoCount = InfoCount + 1 call ReadyForOutput( TransCount, CRC2, Buffer$ )
if FirstBuffer then
   FirstBuffer = 0
   output @FilePtr;Flag$;Buffer$
else
   output @FilePtr;Buffer$
   end if
```

```
Buffer$=""
!
!                      BitCount   16   15   14          1        16   12   5
! Calculate CRC for [X       *(X  + X  + X  +....+X + 1)]/(X  + X  + X + 1)
!
CRC1 = bti("1111111111111111")
for I = 1 to BitCount | call CRC( 0, CRC1 ) | next I
!
!                    16                  16   12   5
! Calculate CRC for [X  *(frame bits)]/(X  + X  + X + 1)
!    where the frame bits are from the last bit of the opening flag to the
!    first bit of the frame crc word, exculsive.
!
for I = 1 to 16 | call CRC( 0, CRC2 ) | next I
!
! Frame Check Sequence calculation from the two base CRC's
!
call GetBitsMSB( bincmp( bineor( CRC1, CRC2 ) ), 16, Buffer$ )

call ReadyForOutput( TransCount, CRC2, Buffer$ )
!
! The last frame of data ends with two ";" characters
!
if Frame = (Length-1) then
    output @FilePtr;Buffer$;FLAG$;";;"
  else
    output @FilePtr;Buffer$;FLAG$;";"
  end if
next Frame !
! close the output file
!
  assign @FilePtr,Error to * subend sub ReadyForOutput( TransCount, CRC2, Buffer$ )
!-------------------------------------------------------------------------
!
!     This routine does transparency bit checking and calculates the next
! CRC2 value for each bit in the <Buffer$> parameter.
!
!
! GLOBAL OUTPUTS:
!
!       ""   -------------- no global outputs are exported.
!
! GLOBAL INPUTS:
!
!       ""   -------------- no global inputs are imported.
!
! SUBROUTINE PARAMETERS:
!
!       TransCount -------  Integer parameter.  Range = 0..5
!
!       CRC2 -------------  Integer parameter.  Range = -32768..32767
!
!       Buffer$ ----------  String parameter containing the latest output
!                           buffer.
!
!------------------------------------------------------------------------- dim Temp$[80]

Temp$ = ""

if (TransCount < 0) or (TransCount > 5) then
     call FGen_Error( "ReadyForOutput: TransCount<0 or TransCount>5" )
  end if
```

```
if (CRC2 < -32768) or (CRC2 > 32767) then
  call FGen_Error( "ReadyForOutput: CRC2<-32768 or CRC2>32767" )
end if for I = 1 to len( Buffer$ )
  Hbit = val ( Buffer$[I;1] )
  Temp$ = Temp$ & Buffer$[I;1]
  !
  ! Insert transparency bit if a sequence of five ones is found.
  !
  if Hbit then                  ! "1" found, increment transparency count
    TransCount = TransCount + 1
  else                          ! "0" found, reset transparency count
    TransCount = 0
  end if
  if TransCount = 5 then        ! Insert transparency bit
    TransCount = 0
    Temp$ = Temp$ & "0"
  end if
  !
  ! Calculate next CRC2 value
  !

call CRC( Hbit, CRC2 )
next I

Buffer$ = Temp$ subend sub CRC( Ibit, Checksum )
!-------------------------------------------------------------------
!
!      This routine calculates a the next CRC (Cyclic Redundancy Check)
! using <Checksum> as the previous CRC register value and <Ibit> as the
! next input boolean value.
!
!
! GLOBAL OUTPUTS:
!
!       ""    -------------- no global outputs are exported.
!
! GLOBAL INPUTS:
!
!       ""    -------------- no global inputs are imported.
!
! SUBROUTINE PARAMETERS:
!
!       Ibit  -------------- Boolean parameter.  Range = 0..1
!
!       Checksum ----------- Integer parameter.  Range = -32768..32767
!
!
! The generating polynomial = x16 + x12 + x5 + 1
!
!------------------------------------------------------------------- if (Ibit < 0) or (Ibit > 1) then
    call FGen_Error( "CRC: Ibit<0 or IBit>1" )
  end if if (Checksum < -32768) or (Checksum > 32767) then
    call FGen_Error( "CRC: Checksum<-32768 or Checksum>32767" )
  end if HighBit = bit( Checksum, 15 )
  X12     = HighBit exor bit( Checksum, 11 )
  X5      = HighBit exor bit( Checksum,  4 )
  X0      = HighBit exor Ibit
```

```
   Checksum = shift( Checksum, -1 )
   call SetBit( Checksum, 12, X12 )
   call SetBit( Checksum,  5, X5 )
   call SetBit( Checksum,  0, X0 )

subend sub SetBit( Value, BitPosition, Sbit )
!------------------------------------------------------------------------
!
!     This routine sets a bit position within an integer variable to
!  the <Sbit> value (0 or 1).
!  GLOBAL OUTPUTS:
!
!        ""     ------------- no global outputs are exported.
!
!  GLOBAL INPUTS:
!
!        ""     ------------- no global inputs are imported.
!
!  SUBROUTINE PARAMETERS:
!
!        Value ------------ Integer parameter.  Range = -32768..32767
!
!        BitPosition ------ Position of the bit to be set.  Range = 0..15
!
!        Sbit  ------------ Set the bit in <Value> at <Bitposition to the
!                           boolean value in <Sbit>.
!
!------------------------------------------------------------------------ if (BitPosition < 0) or (BitPosition > 15) then
      call FGen_Error( "SetBit: BitPosition<0 or BitPosition>15" )
   end if if (Sbit < 0) or (Sbit > 1) then
      call FGen_Error( "SetBit: Sbit<0 or SBit>1" )
   end if if (Value < -32768) or (Value > 32767) then
      call FGen_Error( "SetBit: Value<-32768 or Value>32767" )
   end if if BitPosition < 15 then
      if Sbit = 0 then
         Value = binand( Value, bincmp(2^BitPosition) )
      else
         Value = binior( Value, 2^BitPosition )
      end if
   else
      if Sbit = 0 then
         Value = binand( Value, 32767 )
      else
         Value = binior( Value, -32768 )
      end if
   end if
subend sub ReadInfo( FileName$, Length, Array(*) )
!------------------------------------------------------------------------
!
!     This routine reads an ASCII text file of INFORMATION field data (one
!  integer per line ) into an array until End-Of-File occurs.  The number of
!  requested frames is passed through the <Length> parameter.
!     If the number of frames read from the file (each sequence of Info field
!  values is terminated by a -1 integer value) does not equal the number
!  of requested frames (<Length> parameter), an error is reported and
!  program execution is stopped.
```

!     If a file error occurs during this subroutine an error is reported
!  and program execution is stopped.
!     If more than 32766 integers are read from the file an error is
!  reported and program execution is stopped.
!
!
! GLOBAL OUTPUTS:
!
!     ""    ------------- no global outputs are exported.
!
!
! GLOBAL INPUTS:
!
!     ""    ------------- no global inputs are imported.
!
! SUBROUTINE PARAMETERS:
!
!    FileName$ ---------- A string containing the file pathname of the file
!                         to be read into the <Array> parameter.
!
!    Length ------------- The requested number of frames parameter.
!                         Range = 1..32766.
!
!    Array -------------- Array id.  The integer values read from the file
!                         are returned in this parameter.  The array must
!                         be dimensioned as a single(1) dimensioned array
!                         prior to calling this subroutine.
!                         The array indices range from 0 to 32766.
!
!--------------------------------------------------------------------------

NO_ERROR            = 0
   EOF                 = 101007
   FILE_NOT_FOUND      = 100009
   WRONG_FILE_TYPE     = 101015
   FILE_NOT_ASSIGNED   = 136
   FILE_EXISTS         = 275

END_OF_SEQUENCE     = -1
   FrameCount          = 0
   Index               = 0 assign @File, Error to FileName$
   if Error <> NO.ERROR then
      call FGen_Error( "ReadFile: FILE ERROR '"&FileName$&"' "&errm$(Error) )
   end if loop
      enter @File,,Error; Array(Index)

exit if Error = EOF if Error <> NO_ERROR then
         call FGen_Error("ReadInfo: FILE ERROR '"&FileName$&"' "&errm$(Error))
      end if if Array(Index) = END_OF_SEQUENCE then
         FrameCount = FrameCount + 1
         if FrameCount > Length then
            call FGen_Error("ReadInfo: # REQUESTED FRAMES <> # FRAMES IN INFO FILE")
         end if
      end if Index = Index + 1 if Index > 32766 then
         call FGen_Error("ReadInfo: ATTEMPT TO READ MORE THAN 32766 ELEMENTS")
      end if end loop subend

```
sub GetBitsMSB( Value, Number_of_bits, Buffer$ )
!------------------------------------------------------------------
!
!    This routine retrieves the boolean representation of an integer
! parameter and appends it to a string parameter.  The boolean values
! are stripped from MSB ( most significant bit ) to LSB ( least
! significant bit ).  Example: decimal value 23 = "00010111", if
! eight(8) bits are requested in the <Number_of_bits> parameter.
!
! Note: If the <Value> parameter is greater than the 2's complement
! range for the <Number_of_bits> parameter requested, the extra bits
! withing the <Value> parameter are ignored and not put into the <Buffer$>
! string parameter.
!
!
! GLOBAL OUTPUTS:
!
!      ""     -------------- no global outputs are exported.
!
!
! GLOBAL INPUTS:
!
!      ""     -------------- no global inputs are imported.
!
! SUBROUTINE PARAMETERS:
!
!      Value  ------------ Integer parameter.  Range = -32768..32767
!
!      Number_of_bits  --- Size of the boolean representation of the
!                          integer parameter.  Range = 1..16
!
!      Buffer$ ----------- String parameter to which the boolean representation
!                          is appended.
!
!------------------------------------------------------------------ if (Number_of_bits < 1) or (Number_of_bits > 16) then
    call FGen_Error( "GetBitsMSB: Number_of_bits<1 or Number_of_bits>16" )
  end if if (Value < -32768) or (Value > 32767) then
    call FGen_Error( "GetBitsMSB: Value<-32768 or Value>32767" )
  end if for I = (Number_of_bits-1) to 0 step -1
    Buffer$ = Buffer$ & val$( bit( Value,I ) )
  next I subend sub GetBitsLSB( Value, Number_of_bits, Buffer$ )
!------------------------------------------------------------------
!
!    This routine retrieves the boolean representation of an integer
! parameter and appends it to a string parameter.  The boolean values
! are stripped from LSB ( least significant bit ) to MSB ( most
! significant bit ).  Example: decimal value 23 = "11101000", if
! eight(8) bits are requested in the <Number_of_bits> parameter.
! Note: If the <Value> parameter is greater than the 2's complement
! range for the <Number_of_bits> parameter requested, the extra bits
! withing the <Value> parameter are ignored and not put into the <Buffer$>
! string parameter.
!
!
!
! GLOBAL OUTPUTS:
!
!      ""     -------------- no global outputs are exported.
!
!
! GLOBAL INPUTS:
```

```
!           ""       -------------- no global inputs are imported.
!
! SUBROUTINE PARAMETERS:
!
!       Value ------------ Integer parameter.  Range = -32768..32767
!
!       Number_of_bits --- Size of the boolean representation of the
!                          integer parameter.  Range = 1..16
!
!       Buffer$ ---------- String parameter to which the boolean representation
!                          is appended.
!
!------------------------------------------------------------------------ if (Number_of_bits < 1) or (Number_of_bits > 16) then
    call FGen_Error( "GetBitsLSB: Number_of_bits<1 or Number_of_bits>16" )
  end if if (Value < -32768) or (Value > 32767) then
    call FGen_Error( "GetBitsLSB: Value<-32768 or Value>32767" )
  end if for I = 0 to (Number_of_bits-1)
    Buffer$ = Buffer$ & val$( bit( Value,I ) )
  next I subend sub ReadArray( FileName$, Length, Array(*) )
!------------------------------------------------------------------------
!
!    This routine reads an ASCII text file of integer data (one integer
! per line ) into an array.  Any errors found during file access are
! reported and the program execution is stopped.  If the file does not
! contain Length number of integers, an error occurs and program execution
! is stopped.
!
!
! GLOBAL OUTPUTS:
!
!       ""       -------------- no global outputs are exported.
!
!
! GLOBAL INPUTS:
!
!       ""       -------------- no global inputs are imported.
!
! SUBROUTINE PARAMETERS:
!
!       FileName$ ---------- A string the containing file pathname of the file
!                            to be read into the Array parameter.
!
!       Length ------------- The number of integers to be read into the Array
!                            parameter.  Range = 1..32766
!
!       Array -------------- Array id.  The integer values read from the file
!                            are returned in this parameter.  The array must
!                            be dimensioned prior to calling this subroutine.
!                            The array must be a single(1) dimensioned array.
!                            The array indices are assumed to start at zero(0)
!                            and stop at Length-1 or greater than Length-1.
!
!------------------------------------------------------------------------

NO_ERROR              = 0
  EOF                   = 101007
  FILE_NOT_FOUND        = 100009
  WRONG_FILE_TYPE       = 101015
  FILE_NOT_ASSIGNED     = 136
  FILE_EXISTS           = 275
```

```
    assign @File, Error to FileName$
    if Error <> NO_ERROR then
      call FGen_Error( "ReadArray: FILE ERROR '"&FileName$&"' "&errm$(Error) )
    end if for Index = 0 to Length-1
      enter @File,,Error; Array(Index)
      if Error <> NO_ERROR then
        if Error = EOF then
          call FGen_Error( "ReadArray: MORE DATA EXPECTED FROM '"&FileName$&"'" )
        else
          call FGen_Error("ReadArray: FILE ERROR '"&FileName$&"' "&errm$(Error))
        end if
      end if
    next Index subend
sub OpenFile( FileName$, @FilePtr )
!-----------------------------------------------------------------------
!
!    This routine opens an ASCII text file for output.  If the file already
! exists, the user is prompted for overwrite.  If the file does not exist,
! the file is created.  If any other file error occurs, the error is reported
! to the CRT and program execution stops.
!
!
! GLOBAL OUTPUTS:
!
!     ""      -------------- no global outputs are exported.
!
!
! GLOBAL INPUTS:
!
!     ""      -------------- no global inputs are imported.
!
! SUBROUTINE PARAMETERS:
!
!     FileName$ ----------- A string containing the file pathname of the
!                           output text file.
!
!     @FilePtr ----------- The '@' file pointer.  If the file is opened,
!                          this pointer may be used by output statements
!                          to write data to the file.
!
!
!-----------------------------------------------------------------------
    NO_ERROR                = 0
    EOF                     = 101007
    FILE_NOT_FOUND          = 100009
    WRONG_FILE_TYPE         = 101015
    FILE_NOT_ASSIGNED       = 136
    FILE_EXISTS             = 275 assign @FilePtr, Error to FileName$;write,new
    if Error <> NO_ERROR then
      if Error = FILE_EXISTS then
        print
        print "The file '";FileName$;"' already exists."
        print "Do you want to write over this file (yes or no)?"
        input Answer$
        if lwc$(Answer$[1;1]) = "y" then
          assign @FilePtr,Error to FileName$; write
          if Error <> NO_ERROR then
            call FGen_Error("OpenFile: FILE ERROR '"&FileName$&"' "&errm$(Error))
          end if
        else ! don't want to write over file
          call FGen_Error( "OpenFile: USER STOPPED PROGRAM" )
        end if
      else ! file error of some sort
        call FGen_Error( "OpenFile: FILE ERROR '"&FileName$&"' "&errm$(Error) )
      end if
    end if subend
```

```
sub PrintBits( Value, Number_of_bits )
!-----------------------------------------------------------------
!
!     This routine prints the boolean representation of an integer
! parameter to the current printer device.  The boolean values are
! printed from MSB ( most significant bit ) to LSB ( least
! significant bit ).  Example: decimal value 23 = "00010111", if
! eight(8) bits are requested in the <Number_of_bits> parameter.
!
! GLOBAL OUTPUTS:
!
!     ""         -------------- no global outputs are exported.
!
! GLOBAL INPUTS:
!
!     ""         -------------- no global inputs are imported.
!
! SUBROUTINE PARAMETERS:
!
!     Value ------------ Integer parameter.  Range = -32768..32767
!
!     Number_of_bits --- Size of the boolean representation of the
!                        integer parameter.  Range = 1..16
!
!----------------------------------------------------------------- if (Number_of_bits < 1) or (Number_of_bits > 16) then
     call FGen_Error( "PrintBits: Number_of_bits<1 or Number_of_bits>16" )
   end if if (Value < -32768) or (Value > 32767) then call FGen_Error( "PrintBits: Value<-32768 or Value>32767" )
   end if Buffer$ = ""
   for I = (Number_of_bits-1) to 0 step -1
     Buffer$ = Buffer$ & val$( bit( Value,I ) )
   next I print Value,Buffer$ subend sub FGen_Error( Err_msg$ )
!-----------------------------------------------------------------
!
!     This routine reports an error message from the Err_msg$ string
! parameter and stops program execution.  This routine attempts to
! report the error on the printer device and if this is not possible,
! the printer device is reset to the CRT and the error is reported.
!
! GLOBAL OUTPUTS:
!
!     ""         -------------- no global outputs are exported.
!
! GLOBAL INPUTS:
!
!     ""         -------------- no global inputs are imported.
!
! SUBROUTINE PARAMETERS:
!
!     Err_msg$ ---------- String variable containing error message.  This
!                         message is sent to the printer device.
!
!----------------------------------------------------------------- dim Default_output$[80]
   Default_output$ = "/dev/crt"&crt$
   Device = 4                    ! status value of an HFS device node
```

```
    status Default_output$;Error,Opened,Type
    if Type=Device then assign @Output_error,Error to Default_output$;write,shared if not Error and Type = Device then
      output @Output_error;Err_msg$
    else
      printer is *
      print "The default error reporting device for FGen_Error is not available,"
      print "the printer destination has been reset to the CRT."
      print Err_msg$
    end if
    stop
subend
```

```
!!!!!!!!!!!!!!!!!!!!!!!!!!!!!!!!!!!!!!!!!!!!!!!!!!!!!!!!!!!!!!!!!!!!!!!!!!!!!!!
!!!!                                                                       !!!!
!!!!         M E R G E    U S E R    S U B R O U T I N E S    H E R E      !!!!
!!!!            ||                                              ||         !!!!
!!!!            \/                                              \/         !!!!

!
! /TELECOM/GEN/FRAME_IOM                                    Rev 3.0
!
! IOM FRAME GENERATOR
!
! This program will generate framing data for the Siemens IOM protocol to be
! used as input for the PCF Generator Tool
!
!
!
!
!
!
!
!
!
! Copyright Hewlett-Packard 1987.  All Rights Reserved.
!
!********************************************************************************
!--------------------------------------------------------------------------------
!
! To add other DSP subroutines, simply type in the following BTBasic commands
! at the command line:
!
!    edit 9999         ! This places the edit cursor at the last line.
!    merge "file id"   ! Merge the "file id" source at the current edit line.
!
!--------------------------------------------------------------------------------
!
!    This program is meant to be modified by the user BEFORE it is executed.
! The first half of this program consists of routines that fill pre-defined
! variables (arrays or numeric variables) with values from data files, user
! entry or DSP subroutine generated data.  These predefined variables reflect
! the data field(s) within this particular serial frame format.
!
!    The second half of this program consists of a subroutine that formats the
! values within the predefined variables into this serial frame format.  The
! manner in which the predefined variables are formatted is discussed in the
! comment section of the framing subroutine.
!
!    The subroutines following the framing subroutine are standard throughout
! the frame generator programs.  Not all of these subroutines are used in a
! particular frame generator.  These subroutines are documented in the comment
! section proceding the implementation section of each subroutine.
!
```

```
!   This allows the user to have complete control and flexibility over data
!   field values and how they are generated.  Each frame generator program is to
!   be used for a different frame format.
!
!-----------------------------------------------------------------------------
!
! USER MODIFIABLE PARAMETERS
!
I              = 0            ! Scratch variable.
MAX_LEN        = 1000         ! Maximum number of frames.  Same value used in
                              !   data field array dimensioning.
LEN            = 0            ! Default number of frames to generate.
dim B1(1000)                  ! Channel B1 field array.  (max elements = 32766)
dim B2(1000)                  ! Channel B2 field array.  (max elements = 32766)
dim MONI(1000)                ! Monitor field array.     (max elements = 32766)
dim D(1000)                   ! Channel D field array.   (max elements = 32766)
dim C_I(1000)                 ! C/I field array.         (max elements = 32766)
dim TE(1000)                  ! T and E fields array.    (max elements = 32766)
!----------------------------------------------------------------------------- print using "@"
print "IOM FRAME GENERATOR"
print
print loop
   input "Enter number of frames to be generated : ",LEN
   exit if (LEN >= 1) and (LEN < MAX_LEN)
   print "VALUE OUT OF RANGE, RANGE = 1 ..";MAX_LEN;", RETRY"
   end loop !!!!!!!!!!!!!!!!!!!!!!!!!!!!   E X A M P L E   !!!!!!!!!!!!!!!!!!!!!!!!!!!!!!
!
! Data field B1 is generated from dsp subroutines; tone and mu_law
!
print
input "Enter the tone frequency(Hz) to be generated : ",Frequency
!
! use rms value to produce full range
!
VRMS          = 8159 / sqr(2)        ! for MU_LAW
Phase         = 0
SampFrequency = 8000
call Tone( VRMS, Frequency, Phase, SampFrequency, LEN, B1(*) )
call MU_law( LEN, B1(*) )
!
! Be sure to merge TONE and MU_LAW at end of test
!

!!!!!!!!!!!!!!!!!!!!!!!!!!!!   E X A M P L E   !!!!!!!!!!!!!!!!!!!!!!!!!!!!!!
!
! Retrieve B2 field data from a text file.
!
print
FileName$ = "iom#b2"
print "Retrieving B2 field data from '";FileName$;"'"
call ReadArray( FileName$, LEN, B2(*) )
print !!!!!!!!!!!!!!!!!!!!!!!!!!!!   E X A M P L E   !!!!!!!!!!!!!!!!!!!!!!!!!!!!!!
!
! Retrieve MONITOR field data from a text file.
!
print
FileName$ = "iom#moni"
print "Retrieving MONITOR field data from '";FileName$;"'"
call ReadArray( FileName$, LEN, MONI(*) )
print
```

```
!!!!!!!!!!!!!!!!!!!!!!!!!!!!!!!!!   E X A M P L E   !!!!!!!!!!!!!!!!!!!!!!!!!!!!!!!!!!
!
! Retrieve D field data from a text file.
!
print
FileName$ = "iom#d"
print "Retrieving D field data from '";FileName$;"'"
call ReadArray( FileName$, LEN, D(*) )
print !!!!!!!!!!!!!!!!!!!!!!!!!!!!!!!!!   E X A M P L E   !!!!!!!!!!!!!!!!!!!!!!!!!!!!!!!!!!
!
! Retrieve C/I field data from a text file.
!
print
FileName$ = "iom#c_i"
print "Retrieving C/I field data from '";FileName$;"'"
call ReadArray( FileName$, LEN, C_I(*) )
print !!!!!!!!!!!!!!!!!!!!!!!!!!!!!!!!!   E X A M P L E   !!!!!!!!!!!!!!!!!!!!!!!!!!!!!!!!!!
!
! Retrieve T and E field data from a text file.
!
print
FileName$ = "iom#te"
print "Retrieving T & E field data from '";FileName$;"'"
call ReadArray( FileName$, LEN, TE(*) )
print call Generate_iom( "iom#file",LEN,B1(*),B2(*),MONI(*),D(*),C_I(*),TE(*) )

print
print "FRAME GENERATOR SUCCESSFULLY COMPLETED"

end ! main program

!!!!!!!!!!!!!!!!!!!!!!!!!!!!!!!!!!!!!!!!!!!!!!!!!!!!!!!!!!!!!!!!!!!!!!!!!!!!!!!!!!
!!!!                                                                          !!!!
!!!!              P R O G R A M   S U B R O U T I N E S                       !!!!
!!!!                                                                          !!!!
!!!!!!!!!!!!!!!!!!!!!!!!!!!!!!!!!!!!!!!!!!!!!!!!!!!!!!!!!!!!!!!!!!!!!!!!!!!!!!!!!!

sub Generate_iom( FileName$,Length,B1(*),B2(*),Monitor(*),D(*),C_I(*),TE(*) )
!----------------------------------------------------------------
!
!     This routine will open the output file, generate the framed field
!  data, output the framed data to the output file, and close the output
!  file.  Any fatal error encountered will be reported and program
!  execution will stop
!
! An IOM frame is shown below:
!
```

```
+----------------------------------------+--------------------------+
|     B1      |      B2     |  MONITOR   | D | C/I | T | E |
+----------------------------------------+--------------------------+
```

The first three fields consists of eight bits, MSB first, LSB last.
Communication channels are the B1, B2, and D. The MONITOR field is used
to signal line termination and error rate information. The C/I field
(command/indicate) is used to control message flow and is four bits wide.
The D channel is two bits long and the T and E are a single bit each.

GLOBAL OUTPUTS:

""  -------------- no global outputs are exported.

GLOBAL INPUTS:

""  -------------- no global inputs are imported.

SUBROUTINE PARAMETERS:

FileName$ --------- A string containing the file pathname of the
                       output file.

Length ----------- The number of frames to be generated.
                       Range = 1..MAX_LEN B1(*) ------------- Array id parameter containing B1 channel field
                       data. Each element is sent in its boolean
                       representation to the output file as part of a
                       frame. Must be dimensioned prior to calling this
                       routine, single dimension 1..32766.

B2(*) ------------- Array id parameter containing B2 channel field
                       data. Each element is sent in its boolean
                       representation to the output file as part of a
                       frame. Must be dimensioned prior to calling this
                       routine, single dimension 1..32766.

Monitor(*) ------- Array id parameter containing MONITOR field data.
                       Each element is sent in its boolean
                       representation to the output file as part of a
                       frame. Must be dimensioned prior to calling this
                       routine, single dimension 1..32766.

D(*) -------------- Array id parameter containing D channel field
                       data. Each element is sent in its boolean
                       representation to the output file as part of a
                       frame. Must be dimensioned prior to calling this
                       routine, single dimension 1..32766.

C_I(*) ----------- Array id parameter containing C/I field data.
                       Each element is sent in its boolean
                       representation to the output file as part of a
                       frame. Must be dimensioned prior to calling this
                       routine, single dimension 1..32766.

TE(*) ------------- Array id parameter containing T and E field data.
                       Both T and E bits are encoded in each element of
                       this array. Bit 0 is the E bit, while Bit 1 is
                       the T bit. Examples:
                         TE(0) = 0, T=0 and E=0
                         TE(0) = 1, T=0 and E=1
                         TE(0) = 2, T=1 and E=0
                         TE(0) = 3, T=1 and E=1
                     Each element is sent in its boolean
                     representation to the output file as part of a
                     frame. Must be dimensioned prior to calling this
                     routine, single dimension 1..32766.

```
   dim Buffer$[80]

call OpenFile( FileName$, @FilePtr )

for Frame = 0 to Length-1

Buffer$ = ""

call GetBitsMSB( B1(Frame),      8, Buffer$ )
      call GetBitsMSB( B2(Frame),      8, Buffer$ )
      call GetBitsMSB( Monitor(Frame), 8, Buffer$ )
      call GetBitsMSB( D(Frame),       2, Buffer$ )
      call GetBitsMSB( C_I(Frame),     4, Buffer$ )
      call GetBitsMSB( TE(Frame),      2, Buffer$ )
      !
      ! The last frame of data ends with two ";" characters
      !
      if Frame = (Length-1) then
         output @FilePtr;Buffer$;";;"
       else
         output @FilePtr;Buffer$;";"
      end if
   next Frame
   !
   ! close the output file
   !
   assign @FilePtr,Error to * subend sub GetBitsMSB( Value, Number_of_bits, Buffer$ )
!----------------------------------------------------------------------
!
!    This routine retrieves the boolean representation of an integer
! parameter and appends it to a string parameter. The boolean values
! are stripped from MSB ( most significant bit ) to LSB ( least
! significant bit ). Example: decimal value 23 = "00010111", if
! eight(8) bits are requested in the <Number_of_bits> parameter.
!
! Note: If the <Value> parameter is greater than the 2's complement
! range for the <Number_of_bits> parameter requested, the extra bits
! withing the <Value> parameter are ignored and not put into the <Buffer$>
! string parameter.
!
!
! GLOBAL OUTPUTS:
!
!      ""     -------------- no global outputs are exported.
!
!
! GLOBAL INPUTS:
!
!      ""     -------------- no global inputs are imported.
!
! SUBROUTINE PARAMETERS:
!
!      Value  ------------- Integer parameter. Range = -32768..32767
!
!      Number_of_bits --- Size of the boolean representation of the
!                         integer parameter. Range = 1..16
!
!      Buffer$ ---------- String parameter to which the boolean representation
!                         is appended.
!
!---------------------------------------------------------------------- if (Number_of_bits < 1) or (Number_of_bits > 16) then
      call FGen_Error( "GetBitsMSB: Number_of_bits<1 or Number_of_bits>16" )
   end if
```

```
    if (Value < -32768) or (Value > 32767) then
      call FGen_Error( "GetBitsMSB: Value<-32768 or Value>32767" )
    end if for I = (Number_of_bits-1) to 0 step -1
      Buffer$ = Buffer$ & val$( bit( Value,I ) )
    next I subend sub GetBitsLSB( Value, Number_of_bits, Buffer$ )
!-------------------------------------------------------------------
!
!     This routine retrieves the boolean representation of an integer
!  parameter and appends it to a string parameter.  The boolean values
!  are stripped from LSB ( least significant bit ) to MSB ( most
!  significant bit ).  Example: decimal value 23 = "11101000", if
!  eight(8) bits are requested in the <Number_of_bits> parameter.
!
!  Note: If the <Value> parameter is greater than the 2's complement
!  range for the <Number_of_bits> parameter requested, the extra bits
!  withing the <Value> parameter are ignored and not put into the <Buffer$>
!  string parameter.
!
!
!
!  GLOBAL OUTPUTS:
!
!       ""     -------------- no global outputs are exported.
!
!
!  GLOBAL INPUTS:
!
!       ""     -------------- no global inputs are imported.
!
!  SUBROUTINE PARAMETERS:
!
!       Value ------------- Integer parameter.  Range = -32768..32767
!
!       Number_of_bits --- Size of the boolean representation of the
!                          integer parameter.  Range = 1..16
!
!       Buffer$ ----------- String parameter to which the boolean representation
!                           is appended.
!
!------------------------------------------------------------------- if (Number_of_bits < 1) or (Number_of_bits > 16) then
      call FGen_Error( "GetBitsLSB: Number_of_bits<1 or Number_of_bits>16" )
    end if if (Value < -32768) or (Value > 32767) then
      call FGen_Error( "GetBitsLSB: Value<-32768 or Value>32767" )
    end if for I = 0 to (Number_of_bits-1)
      Buffer$ = Buffer$ & val$( bit( Value,I ) )
    next I subend sub ReadArray( FileName$, Length, Array(*) )
!-------------------------------------------------------------------
!
!     This routine reads an ASCII text file of integer data (one integer
!  per line ) into an array.  Any errors found during file access are
!  reported and the program execution is stopped.  If the file does not
!  contain Length number of integers, an error occurs and program execution
!  is stopped.
```

```
! GLOBAL OUTPUTS:
!
!       ""    ------------- no global outputs are exported.
!
!
! GLOBAL INPUTS:
!
!       ""    ------------- no global inputs are imported.
!
! SUBROUTINE PARAMETERS:
!
!     FileName$ ----------- A string the containing file pathname of the file
!                           to be read into the Array parameter.
!
!     Length  ------------- The number of integers to be read into the Array
!                           parameter.  Range = 1..32766
!
!     Array   ------------- Array id.  The integer values read from the file
!                           are returned in this parameter.  The array must
!                           be dimensioned prior to calling this subroutine.
!                           The array must be a single(1) dimensioned array.
!                           The array indices are assumed to start at zero(0)
!                           and stop at Length-1 or greater than Length-1.
!
!-------------------------------------------------------------------------

NO_ERROR              = 0
    EOF                   = 101007
    FILE_NOT_FOUND        = 100009
    WRONG_FILE_TYPE       = 101015
    FILE_NOT_ASSIGNED     = 136
    FILE_EXISTS           = 275 assign @File, Error to FileName$
    if Error <> NO_ERROR then
       call FGen_Error( "ReadArray: FILE ERROR '"&FileName$&"' "&errm$(Error) )
    end if for Index = 0 to Length-1
      enter @File,,Error; Array(Index)
       if Error <> NO_ERROR then
         if Error = EOF then
           call FGen_Error( "ReadArray: MORE DATA EXPECTED FROM '"&FileName$&"'" )
         else
           call FGen_Error("ReadArray: FILE ERROR '"&FileName$&"' "&errm$(Error))
         end if
       end if
    next Index subend sub OpenFile( FileName$, @FilePtr )
!-------------------------------------------------------------------------
!
!     This routine opens an ASCII text file for output.  If the file already
!  exists, the user is prompted for overwrite.  If the file does not exist,
!  the file is created.  If any other file error occurs, the error is reported
!  to the CRT and program execution stops.
!
!
! GLOBAL OUTPUTS:
!
!       ""    ------------- no global outputs are exported.
!
!
! GLOBAL INPUTS:
!
!       ""    ------------- no global inputs are imported.
!
! SUBROUTINE PARAMETERS:
!
!     FileName$ ----------- A string containing the file pathname of the
!                           output text file.
```

```
!       @FilePtr ------------ The '@' file pointer.  If the file is opened,
!                             this pointer may be used by output statements
!                             to write data to the file.
!
!------------------------------------------------------------------------

NO_ERROR                = 0
   EOF                     = 101007
   FILE_NOT_FOUND          = 100009
   WRONG_FILE_TYPE         = 101015
   FILE_NOT_ASSIGNED       = 136
   FILE_EXISTS             = 275 assign @FilePtr, Error to FileName$;write,new
   if Error <> NO_ERROR then
     if Error = FILE_EXISTS then
       print
       print "The file '";FileName$;"' already exists."
       print "Do you want to write over this file (yes or no)?"
       input Answer$
       if lwc$(Answer$[1;1]) = "y" then
         assign @FilePtr,Error to FileName$; write
         if Error <> NO_ERROR then
           call FGen_Error("OpenFile: FILE ERROR '"&FileName$&"' "&errm$(Error))
         end if
       else ! don't want to write over file
         call FGen_Error( "OpenFile: USER STOPPED PROGRAM" )
       end if
     else ! file error of some sort
       call FGen_Error( "OpenFile: FILE ERROR '"&FileName$&"' "&errm$(Error) )

end if
   end if subend sub PrintBits( Value, Number_of_bits )
!------------------------------------------------------------------------
!
!     This routine prints the boolean representation of an integer
!  parameter to the current printer device.  The boolean values are
!  printed from MSB ( most significant bit ) to LSB ( least
!  significant bit ).  Example: decimal value 23 = "00010111", if
!  eight(8) bits are requested in the <Number_of_bits> parameter.
!
!  GLOBAL OUTPUTS:
!
!       ""         -------------- no global outputs are exported.
!
!  GLOBAL INPUTS:
!
!       ""         -------------- no global inputs are imported.
!
!  SUBROUTINE PARAMETERS:
!
!       Value ------------ Integer parameter.  Range = -32768..32767
!
!       Number_of_bits --- Size of the boolean representation of the
!                          integer parameter.  Range = 1..16
!
!------------------------------------------------------------------------ if (Number_of_bits < 1) or (Number_of_bits > 16) then
     call FGen_Error( "PrintBits: Number_of_bits<1 or Number_of_bits>16" )
   end if if (Value < -32768) or (Value > 32767) then
     call FGen_Error( "PrintBits: Value<-32768 or Value>32767" )
   end if Buffer$ = ""
```

```
  for I = (Number_of_bits-1) to 0 step -1
    Buffer$ = Buffer$ & val$( bit( Value,I ) )
  next I print Value,Buffer$ subend sub FGen_Error( Err_msg$ )
!------------------------------------------------------------------
!
!      This routine reports an error message from the Err_msg$ string
!   parameter and stops program execution.  This routine attempts to
!   report the error on the printer device and if this is not possible,
!   the printer device is reset to the CRT and the error is reported.
!
!   GLOBAL OUTPUTS:
!
!        ""      -------------- no global outputs are exported.
!
!   GLOBAL INPUTS:
!        ""      -------------- no global inputs are imported.
!
!   SUBROUTINE PARAMETERS:
!
!        Err_msg$ ---------- String variable containing error message.  This
!                            message is sent to the printer device.
!
!------------------------------------------------------------------ dim Default_output$[80]
  Default_output$ = "/dev/crt"&crt$
  Device = 4                    ! status value of an HFS device node status Default_output$;Error,Opened,Type
  if Type=Device then assign @Output_error,Error to Default_output$;write,shared if not Error and Type = Device then
    output @Output_error;Err_msg$
  else
    printer is *
    print "The default error reporting device for FGen_Error is not available,"
    print "the printer destination has been reset to the CRT."
    print Err_msg$
  end if
  stop
subend
```

!!!!!!!!!!!!!!!!!!!!!!!!!!!!!!!!!!!!!!!!!!!!!!!!!!!!!!!!!!!!!!!!!!!!!!!!!!!!!!!
!!!!                                                                       !!!!
!!!!         M E R G E    U S E R    S U B R O U T I N E S    H E R E      !!!!
!!!!             ||                                          ||            !!!!
!!!!             \/                                          \/            !!!!
!!!!!!!!!!!!!!!!!!!!!!!!!!!!!!!!!!!!!!!!!!!!!!!!!!!!!!!!!!!!!!!!!!!!!!!!!!!!!!!

! /TELECOM/GEN/FRAME_RS232                              Rev 3.0
!
! Frame Generator for the serial RS232 format.
!
!
!
! Copyright Hewlett-Packard 1987.  All Rights Reserved.
!
!******************************************************************************
!------------------------------------------------------------------
!
! To add other DSP subroutines, simply type in the following BTBasic commands
! at the command line:
!
!   edit 9999          ! This places the edit cursor at the last line.
!   merge "file id"    ! Merge the "file id" source at the current edit line.
!
!------------------------------------------------------------------

```
!    This program is meant to be modified by the user BEFORE it is executed.
! The first half of this program consists of routines that fill pre-defined
! variables (arrays or numeric variables) with values from data files, user
! entry or DSP subroutine generated data.  These predefined variables reflect
! the data field(s) within this particular serial frame format.
!
!    The second half of this program consists of a subroutine that formats the
! values within the predefined variables into this serial frame format.  The
! manner in which the predefined variables are formatted is discussed in the
! comment section of the framing subroutine.
!
!    The subroutines following the framing subroutine are standard throughout
! the frame generator programs.  Not all of these subroutines are used in a
! particular frame generator.  These subroutines are documented in the comment
! section proceding the implementation section of each subroutine.
!
!    This allows the user to have complete control and flexibility over data
! field values and how they are generated.  Each frame generator program is to
! be used for a different frame format.
!
!-----------------------------------------------------------------------------
!
! USER MODIFIABLE PARAMETERS
!
I              = 0          ! Scratch variable.
dim A$[256]                 ! Transmit data string.
!----------------------------------------------------------------------------- print using "@"
print "RS232 FRAME GENERATOR"
print
print

A$="This is an example of a text string to be framed by this Frame Generator..."

call Generate_rs232( "rs232#file", A$ )

print
print "FRAME GENERATOR SUCCESSFULLY COMPLETED"

end ! main program

!!!!!!!!!!!!!!!!!!!!!!!!!!!!!!!!!!!!!!!!!!!!!!!!!!!!!!!!!!!!!!!!!!!!!!!!!!!!!
!!!!                                                                     !!!!
!!!!               P R O G R A M   S U B R O U T I N E S                 !!!!
!!!!                                                                     !!!!
!!!!!!!!!!!!!!!!!!!!!!!!!!!!!!!!!!!!!!!!!!!!!!!!!!!!!!!!!!!!!!!!!!!!!!!!!!!!!

sub Generate_rs232( FileName$, String$ )
!-----------------------------------------------------------------------------
!
!     This routine will open the output file, generate the framed field
! data, output the framed data to the output file, and close the output
! file.  Any fatal error encountered will be reported and program
! execution will stop.
!
!     This subroutine converts an ASCII string into it boolean representation
! (LSB to MSB) and then is framed with start and stop bits.  The values of
! the start/stop and ASCII character bits are inverted so that correct RS232
! drive levels are output (zero(0) > 3V and one(1) < -3V).
```

```
!  GLOBAL OUTPUTS:
!
!       ""      ------------ no global outputs are exported.
!
!  GLOBAL INPUTS:
!
!       ""      ------------ no global inputs are imported.
!
!  SUBROUTINE PARAMETERS:
!
!       FileName$ --------- A string containing file the pathname of the output
!                           file.
!
!       String$   --------- A string containing the ASCII string to be converted
!                           to the RS232 frame format.
!
!------------------------------------------------------------------------ dim Buffer$[256]

call OpenFile( FileName$, @FilePtr )

for I = 1 to len(String$)
     Buffer$ = "1"              ! Start bit call GetBitsLSB( bincmp( num(String$[I;1]) ), 8, Buffer$ )

Buffer$ = Buffer$ & "00"   ! Stop bits
     !
     ! The last frame of data ends with two ";" characters
     !
     if I = len(String$) then
        output @FilePtr;Buffer$;";;"
     else
        output @FilePtr;Buffer$;";"
     end if
   next I
   !
   ! close the output file
   !
   assign @FilePtr,Error to * subend sub GetBitsMSB( Value, Number_of_bits, Buffer$ )
!------------------------------------------------------------------------
!
!     This routine retrieves the boolean representation of an integer
!  parameter and appends it to a string parameter.  The boolean values
!  are stripped from MSB ( most significant bit ) to LSB ( least
!  significant bit ).  Example: decimal value 23 = "00010111", if
!  eight(8) bits are requested in the <Number_of_bits> parameter.
!
!  Note: If the <Value> parameter is greater than the 2's complement
!  range for the <Number_of_bits> parameter requested, the extra bits
!  withing the <Value> parameter are ignored and not put into the <Buffer$>
!  string parameter.
!
!
!  GLOBAL OUTPUTS:
!
!       ""      ------------ no global outputs are exported.
!
!
!  GLOBAL INPUTS:
!
!       ""      ------------ no global inputs are imported.
!
```

```
! SUBROUTINE PARAMETERS:
!
!       Value ------------ Integer parameter.  Range = -32768..32767
!
!       Number_of_bits --- Size of the boolean representation of the
!                         integer parameter.  Range = 1..16
!
!       Buffer$ ---------- String parameter to which the boolean representation
!                         is appended.
!
!----------------------------------------------------------------------- if (Number_of_bits < 1) or (Number_of_bits > 16) then
      call FGen_Error( "GetBitsMSB: Number_of_bits<1 or Number_of_bits>16" )
   end if if (Value < -32768) or (Value > 32767) then
      call FGen_Error( "GetBitsMSB: Value<-32768 or Value>32767" )
   end if for I = (Number_of_bits-1) to 0 step -1

Buffer$ = Buffer$ & val$( bit( Value,I ) )
   next I subend sub GetBitsLSB( Value, Number_of_bits, Buffer$ )
!-----------------------------------------------------------------------
!
!    This routine retrieves the boolean representation of an integer
! parameter and appends it to a string parameter.  The boolean values
! are stripped from LSB ( least significant bit ) to MSB ( most
! significant bit ).  Example: decimal value 23 = "11101000", if
! eight(8) bits are requested in the <Number_of_bits> parameter.
!
! Note: If the <Value> parameter is greater than the 2's complement
! range for the <Number_of_bits> parameter requested, the extra bits
! withing the <Value> parameter are ignored and not put into the <Buffer$>
! string parameter.
!
!
! GLOBAL OUTPUTS:
!
!       ""    -------------- no global outputs are exported.
!
!
! GLOBAL INPUTS:
!
!       ""    -------------- no global inputs are imported.
!
! SUBROUTINE PARAMETERS:
!
!       Value ------------ Integer parameter.  Range = -32768..32767
!
!       Number_of_bits --- Size of the boolean representation of the
!                         integer parameter.  Range = 1..16
!
!       Buffer$ ---------- String parameter to which the boolean representation
!                         is appended.
!
!----------------------------------------------------------------------- if (Number_of_bits < 1) or (Number_of_bits > 16) then
      call FGen_Error( "GetBitsLSB: Number_of_bits<1 or Number_of_bits>16" )
   end if if (Value < -32768) or (Value > 32767) then
      call FGen_Error( "GetBitsLSB: Value<-32768 or Value>32767" )
   end if
```

```
    for I = 0 to (Number_of_bits-1)
      Buffer$ = Buffer$ & val$( bit( Value,I ) )
    next I subend sub ReadArray( FileName$, Length, Array(*) )
!-----------------------------------------------------------------------
!
!      This routine reads an ASCII text file of integer data (one integer
!  per line ) into an array.  Any errors found during file access are
!  reported and the program execution is stopped.  If the file does not
!  contain Length number of integers, an error occurs and program execution
!  is stopped.
!
!
!  GLOBAL OUTPUTS:
!
!      ""     -------------- no global outputs are exported.
!
!
!  GLOBAL INPUTS:
!
!      ""     -------------- no global inputs are imported.
!
!  SUBROUTINE PARAMETERS:
!
!     FileName$ ----------- A string the containing file pathname of the file
!                           to be read into the Array parameter.
!
!     Length -------------- The number of integers to be read into the Array
!                           parameter.  Range = 1..32766
!
!     Array  -------------- Array id.  The integer values read from the file
!                           are returned in this parameter.  The array must
!                           be dimensioned prior to calling this subroutine.
!                           The array must be a single(1) dimensioned array.
!                           The array indices are assumed to start at zero(0)
!                           and stop at Length-1 or greater than Length-1.
!
!-----------------------------------------------------------------------
    NO_ERROR              = 0
    EOF                   = 101007
    FILE_NOT_FOUND        = 100009
    WRONG_FILE_TYPE       = 101015
    FILE_NOT_ASSIGNED     = 136
    FILE_EXISTS           = 275 assign @File, Error to FileName$
    if Error <> NO_ERROR then
      call FGen_Error( "ReadArray: FILE ERROR '"&FileName$&"' "&errm$(Error) )
    end if for Index = 0 to Length-1
      enter @File,,Error; Array(Index)
      if Error <> NO_ERROR then
        if Error = EOF then
          call FGen_Error( "ReadArray: MORE DATA EXPECTED FROM '"&FileName$&"'" )
        else
          call FGen_Error("ReadArray: FILE ERROR '"&FileName$&"' "&errm$(Error))
        end if
      end if
    next Index subend sub OpenFile( FileName$, @FilePtr )
!-----------------------------------------------------------------------
!
!      This routine opens an ASCII text file for output.  If the file already
!  exists, the user is prompted for overwrite.  If the file does not exist,
!  the file is created.  If any other file error occurs, the error is reported
!  to the CRT and program execution stops.
```

```
! GLOBAL OUTPUTS:
!
!       ""      -------------- no global outputs are exported.
!
!
! GLOBAL INPUTS:
!
!       ""      -------------- no global inputs are imported.
!
! SUBROUTINE PARAMETERS:
!
!    FileName$  ------------ A string containing the file pathname of the
!                            output text file.
!
!    @FilePtr   ------------ The '@' file pointer.  If the file is opened,
!                            this pointer may be used by output statements
!                            to write data to the file.
!
!-----------------------------------------------------------------------

NO_ERROR               = 0
  EOF                    = 101007
  FILE_NOT_FOUND         = 100009
  WRONG_FILE_TYPE        = 101015
  FILE_NOT_ASSIGNED      = 136
  FILE_EXISTS            = 275 assign @FilePtr, Error to FileName$;write,new
  if Error <> NO_ERROR then
    if Error = FILE_EXISTS then
      print
      print "The file '";FileName$;"' already exists."
      print "Do you want to write over this file (yes or no)?"
      input Answer$
      if lwc$(Answer$[1;1]) = "y" then
        assign @FilePtr,Error to FileName$; write
        if Error <> NO_ERROR then
          call FGen_Error("OpenFile: FILE ERROR '"&FileName$&"' "&errm$(Error))
        end if
      else ! don't want to write over file
        call FGen_Error( "OpenFile: USER STOPPED PROGRAM" )
      end if
    else ! file error of some sort
      call FGen_Error( "OpenFile: FILE ERROR '"&FileName$&"' "&errm$(Error) )
    end if
  end if subend sub PrintBits( Value, Number_of_bits )
!-----------------------------------------------------------------------
!
!     This routine prints the boolean representation of an integer
!  parameter to the current printer device.  The boolean values are
!  printed from MSB ( most significant bit ) to LSB ( least
!  significant bit ).  Example: decimal value 23 = "00010111", if
!  eight(8) bits are requested in the <Number_of_bits> parameter.
!
! GLOBAL OUTPUTS:
!
!       ""      -------------- no global outputs are exported.
!
! GLOBAL INPUTS:
!
!       ""      -------------- no global inputs are imported.
!
! SUBROUTINE PARAMETERS:
!
!      Value    ------------ Integer parameter.  Range = -32768..32767
!
!      Number_of_bits  ---  Size of the boolean representation of the
!                           integer parameter.  Range = 1..16
!
!-----------------------------------------------------------------------
```

```
   if (Number_of_bits < 1) or (Number_of_bits > 16) then
     call FGen_Error( "PrintBits: Number_of_bits<1 or Number_of_bits>16" )
   end if if (Value < -32768) or (Value > 32767) then
     call FGen_Error( "PrintBits: Value<-32768 or Value>32767" )
   end if Buffer$ = ""
   for I = (Number_of_bits-1) to 0 step -1
     Buffer$ = Buffer$ & val$( bit( Value,I ) )
   next I print Value,Buffer$ subend sub FGen_Error( Err_msg$ )
!-----------------------------------------------------------------------
!
!     This routine reports an error message from the Err_msg$ string
!  parameter and stops program execution.  This routine attempts to
!  report the error on the printer device and if this is not possible,
!  the printer device is reset to the CRT and the error is reported.
!
!  GLOBAL OUTPUTS:
!
!         ""      ------------ no global outputs are exported.
!
!  GLOBAL INPUTS:
!
!         ""      ------------ no global inputs are imported.
!
!  SUBROUTINE PARAMETERS:
!
!         Err_msg$ ---------- String variable containing error message.  This
!                             message is sent to the printer device.
!
!----------------------------------------------------------------------- dim Default_output$[80]
   Default_output$ = "/dev/crt"&crt$
   Device = 4                     ! status value of an HFS device node status Default_output$;Error,Opened,Type
   if Type=Device then assign @Output_error,Error to Default_output$;write,shared if not Error and Type = Device then
     output @Output_error;Err_msg$
   else
     printer is *
     print "The default error reporting device for FGen_Error is not available,"
     print "the printer destination has been reset to the CRT."
     print Err_msg$
   end if
   stop
subend !!!!!!!!!!!!!!!!!!!!!!!!!!!!!!!!!!!!!!!!!!!!!!!!!!!!!!!!!!!!!!!!!!!!!!!!!!!!
!!!!                                                                    !!!!
!!!!         M E R G E    U S E R    S U B R O U T I N E S    H E R E   !!!!
!!!!              ||                                      ||            !!!!
!!!!              \/                                      \/            !!!!
!!!!!!!!!!!!!!!!!!!!!!!!!!!!!!!!!!!!!!!!!!!!!!!!!!!!!!!!!!!!!!!!!!!!!!!!!!!!

!
! /TELECOM/GEN/FRAME_SLD                                    Rev 3.0
!
! Frame Generator for the Siemens SLD protocol.
!
```

```
! Copyright Hewlett-Packard 1987.  All Rights Reserved.
!
!************************************************************************
!------------------------------------------------------------------------
!
! To add other DSP subroutines, simply type in the following BTBasic commands
! at the command line:
!
!   edit 9999         ! This places the edit cursor at the last line.
!   merge "file id"   ! Merge the "file id" source at the current edit line.
!
!------------------------------------------------------------------------
!
!    This program is meant to be modified by the user BEFORE it is executed.
! The first half of this program consists of routines that fill pre-defined
! variables (arrays or numeric variables) with values from data files, user
! entry or DSP subroutine generated data.  These predefined variables reflect
! the data field(s) within this particular serial frame format.
!
!    The second half of this program consists of a subroutine that formats the
! values within the predefined variables into this serial frame format.  The
! manner in which the predefined variables are formatted is discussed in the
! comment section of the framing subroutine.
!
!    The subroutines following the framing subroutine are standard throughout
! the frame generator programs.  Not all of these subroutines are used in a
! particular frame generator.  These subroutines are documented in the comment
! section proceding the implementation section of each subroutine.
!
!    This allows the user to have complete control and flexibility over data
! field values and how they are generated.  Each frame generator program is to
! be used for a different frame format.
!
!------------------------------------------------------------------------
!
! USER MODIFIABLE PARAMETERS
!
I             = 0       ! Scratch variable.
MAX_LEN       = 1000    ! Maximum number of frames.  Same value used in
                        !   data field array dimensioning.
LEN           = 0       ! Default number of frames to generate.
FIRST         = TRUE    ! Fill first frame half with XMITdata(FALSE=second)
dim CH_A(1000)          ! Channel A field array. (max elements = 32766)
dim CH_B(1000)          ! Channel B field array. (max elements = 32766)
dim CTRL(1000)          ! Control field array.   (max elements = 32766)
dim SIGL(1000)          ! Signal field array.    (max elements = 32766)
!------------------------------------------------------------------------ print using "@"
print "SLD FRAME GENERATOR"
print
print loop
   input "Enter number of frames to be generated : ",LEN
   exit if (LEN >= 1) and (LEN < MAX_LEN)
   print "VALUE OUT OF RANGE, RANGE = 1 ..";MAX_LEN;", RETRY"
end loop loop
   input "Send data in first(1) or second(0) half frame : ",FIRST
   exit if ((FIRST<=1) and (FIRST>=0))
   print "VALUE OUT OF RANGE, RANGE = 0..1, RETRY"
end loop !************************************************************************
! Retrieve/Generate field data for Frame(s)
!************************************************************************
```

```
!!!!!!!!!!!!!!!!!!!!!!!!!!!!!!!  E X A M P L E  !!!!!!!!!!!!!!!!!!!!!!!!!!!!!!!!!
!
! Channel A of data is generated from dsp subroutines; tone and mu_law
!
print
input "Enter the tone frequency(Hz) to be generated : ",Frequency
!
! use rms value to produce full range
!
VRMS          = 8159 / sqr(2)           ! for MU_LAW
Phase         = 0
SampFrequency = 8000
call Tone( VRMS, Frequency, Phase, SampFrequency, LEN, CH_A(*) )
call MU_law( LEN, CH_A(*) )
!
! Be sure to merge TONE and MU_LAW at end of test
!

!!!!!!!!!!!!!!!!!!!!!!!!!!!!!!!  E X A M P L E  !!!!!!!!!!!!!!!!!!!!!!!!!!!!!!!!!
!
! Channel B of data is set to zero(0).
!
print
print"Setting channel B to zero(0)..."
for I = 0 to LEN - 1
   CH_B(I) = 0
next I
print !!!!!!!!!!!!!!!!!!!!!!!!!!!!!!!  E X A M P L E  !!!!!!!!!!!!!!!!!!!!!!!!!!!!!!!!!
!
! Retrieve CONTROL field data from a text file.
!
print
FileName$ = "sld#ctrl"
print "Retrieving CONTROL field data from '";FileName$;"'"
call ReadArray( FileName$, LEN, CTRL(*) )
print !!!!!!!!!!!!!!!!!!!!!!!!!!!!!!!  E X A M P L E  !!!!!!!!!!!!!!!!!!!!!!!!!!!!!!!!!
!
! Retrieve SIGNAL field data from a text file.
!
print
FileName$ = "sld#sigl"
print "Retrieving SIGNAL field data from '";FileName$;"'"
call ReadArray( FileName$, LEN, SIGL(*) )
print call Generate_sld( "sld#file", LEN, FIRST, CH_A(*), CH_B(*), CTRL(*), SIGL(*) )

print
print "FRAME GENERATOR SUCCESSFULLY COMPLETED"

end ! main program

!!!!!!!!!!!!!!!!!!!!!!!!!!!!!!!!!!!!!!!!!!!!!!!!!!!!!!!!!!!!!!!!!!!!!!!!!!!!!!!!!
!!!!                                                                         !!!!
!!!!               P R O G R A M   S U B R O U T I N E S                     !!!!
!!!!                                                                         !!!!
!!!!!!!!!!!!!!!!!!!!!!!!!!!!!!!!!!!!!!!!!!!!!!!!!!!!!!!!!!!!!!!!!!!!!!!!!!!!!!!!!
```

```
sub Generate_sld( FileName$,Length,First,CHA(*),CHB(*),Control(*),Signal(*) )
!------------------------------------------------------------------------
!
!    This routine will open the output file, generate the framed field
! data, output the framed data to the output file, and close the output
! file.  Any fatal error encountered will be reported and program
! execution will stop.
!
! A SLD Frame is shown below:
!
!  |<------ First Half -------->|<----- Second Half ------->|
!  +----------------------------+---------------------------+
!  | CH_A | CH_B | CTRL | SIGL | CH_A | CH_B | CTRL | SIGL |
!  +----------------------------+---------------------------+
!
!    Each data field(such as CH_A) consists of eight bits, MSB first, LSB last.
! Also, each frame half is actually sent to the PCF generator as a complete
! frame ( ASCII 0's and 1's followed by a ";" character).  This allows the
! user to change the direction line (DIR on the Siemens 2060) in the format
! file pcf vectors.
!
!
! GLOBAL OUTPUTS:
!
!      ""      ------------- no global outputs are exported.
!
! GLOBAL INPUTS:
!
!      ""      ------------- no global inputs are imported.
!
! SUBROUTINE PARAMETERS:
!
!      FileName$ -------- A string containing the file pathname of the output
!                         file.
!
!      Length ----------- The number of frames to be generated.
!                         Range = 1..MAX_LEN
!
!      First ------------ Boolean(0..1) that determines which half frame
!                         will contain the transmitted field data.  This
!                         frame generator will only generate the transmit
!                         half frame.  The receive half frame will always
!                         be receive don't cares ("Z").
!
!      CHA(*) ----------- Array id parameter containing channel A field
!                         data.  Each element is sent in its boolean
!                         representation to the output file as part of the
!                         SLD frame.
!                         The array is dimensioned as a single dimension
!                         array prior to calling this subroutine.
!
!      CHB(*) ----------- Array id parameter containing channel B field
!                         data.  Each element is sent in its boolean
!                         representation to the output file as part of the
!                         SLD frame.
!                         The array is dimensioned as a single dimension
!                         array prior to calling this subroutine.
!
!      Control(*) ------- Array id parameter containing CONTROL field
!                         data.  Each element is sent in its boolean
!                         representation to the output file as part of the
!                         SLD frame.
!                         The array is dimensioned as a single dimension
!                         array prior to calling this subroutine.
!
!      Signal(*) -------- Array id parameter containing SIGNAL field
!                         data.  Each element is sent in its boolean
!                         representation to the output file as part of the
!                         SLD frame.
!                         The array is dimensioned as a single dimension
!                         array prior to calling this subroutine.
!
!------------------------------------------------------------------------
```

```
dim Buffer$[80]

call OpenFile( FileName$, @FilePtr )
!
! Place the field data in the first half frame
!
if First then
   for Frame = 0 to Length-1

Buffer$=""

call GetBitsMSB( CHA(Frame),     8, Buffer$ )
      call GetBitsMSB( CHB(Frame),     8, Buffer$ )
      call GetBitsMSB( Control(Frame), 8, Buffer$ )
      call GetBitsMSB( Signal(Frame),  8, Buffer$ )
         output @FilePtr;Buffer$;";       ! TRANSMIT"
         !
         ! The last frame of data ends with two ";" characters
         !
         if Frame = Length-1 then
            output @FilePtr;"ZZZZZZZZZZZZZZZZZZZZZZZZZZZZZZZZ;;    ! RECEIVE"
         else
            output @FilePtr;"ZZZZZZZZZZZZZZZZZZZZZZZZZZZZZZZZ;     ! RECEIVE"
         end if
   next Frame
else                            ! Place field data in the second half frame
   for Frame = 0 to Length-1
      !
      ! If the user requests that the data be placed in the second frame,
      ! pad the first frame with drive don't cares("Z").
      !
      output @FilePtr;"ZZZZZZZZZZZZZZZZZZZZZZZZZZZZZZZZ;      ! RECEIVE"

Buffer$=""

call GetBitsMSB( CHA(Frame),     8, Buffer$ )
      call GetBitsMSB( CHB(Frame),     8, Buffer$ )
      call GetBitsMSB( Control(Frame), 8, Buffer$ )
      call GetBitsMSB( Signal(Frame),  8, Buffer$ )
      !
      ! The last frame of data ends with two ";" characters
      !
      if Frame = Length-1 then
         output @FilePtr;Buffer$;";;    ! TRANSMIT"
      else
         output @FilePtr;Buffer$;";     ! TRANSMIT"
      end if
   next Frame end if
!
! close the output file
!
assign @FilePtr,Error to * subend sub GetBitsMSB( Value, Number_of_bits, Buffer$ )
!------------------------------------------------------------------------
!
!    This routine retrieves the boolean representation of an integer
! parameter and appends it to a string parameter. The boolean values
! are stripped from MSB ( most significant bit ) to LSB ( least
! significant bit ). Example: decimal value 23 = "00010111", if
! eight(8) bits are requested in the <Number_of_bits> parameter.
!
! Note: If the <Value> parameter is greater than the 2's complement
! range for the <Number_of_bits> parameter requested, the extra bits
```

! withing the <Value> parameter are ignored and not put into the <Buffer$>
! string parameter.
!
!
! GLOBAL OUTPUTS:
!
!       ""    ------------- no global outputs are exported.
!
!
! GLOBAL INPUTS:
!
!       ""    ------------- no global inputs are imported.
!
! SUBROUTINE PARAMETERS:
!
!       Value     ------------ Integer parameter.  Range = -32768..32767
!
!       Number_of_bits --- Size of the boolean representation of the
!                          integer parameter.  Range = 1..16
!
!       Buffer$   ---------- String parameter to which the boolean representation
!                          is appended.
!
!------------------------------------------------------------------------ if (Number_of_bits < 1) or (Number_of_bits > 16) then
      call FGen_Error( "GetBitsMSB: Number_of_bits<1 or Number_of_bits>16" )
    end if if (Value < -32768) or (Value > 32767) then
      call FGen_Error( "GetBitsMSB: Value<-32768 or Value>32767" )
    end if for I = (Number_of_bits-1) to 0 step -1
      Buffer$ = Buffer$ & val$( bit( Value,I ) )
    next I subend sub GetBitsLSB( Value, Number_of_bits, Buffer$ )
!------------------------------------------------------------------------
!
!     This routine retrieves the boolean representation of an integer
! parameter and appends it to a string parameter.  The boolean values
! are stripped from LSB ( least significant bit ) to MSB ( most
! significant bit ).  Example: decimal value 23 = "11101000", if
! eight(8) bits are requested in the <Number_of_bits> parameter.
!
! Note: If the <Value> parameter is greater than the 2's complement
! range for the <Number_of_bits> parameter requested, the extra bits
! withing the <Value> parameter are ignored and not put into the <Buffer$>
! string parameter.
!
!
!
! GLOBAL OUTPUTS:
!
!       ""    ------------- no global outputs are exported.
!
!
! GLOBAL INPUTS:
!
!       ""    ------------- no global inputs are imported.
!
! SUBROUTINE PARAMETERS:
!
!       Value     ------------ Integer parameter.  Range = -32768..32767
!
!       Number of_bits --- Size of the boolean representation of the
!                          integer parameter.  Range = 1..16

```
!       Buffer$ ---------- String parameter to which the boolean representation
!                          is appended.
!
!----------------------------------------------------------------------- if (Number_of_bits < 1) or (Number_of_bits > 16) then
     call FGen_Error( "GetBitsLSB: Number_of_bits<1 or Number_of_bits>16" )
   end if if (Value < -32768) or (Value > 32767) then
     call FGen_Error( "GetBitsLSB: Value<-32768 or Value>32767" )
   end if for I = 0 to (Number_of_bits-1)
     Buffer$ = Buffer$ & val$( bit( Value,I ) )
   next I subend sub ReadArray( FileName$, Length, Array(*) )
!-----------------------------------------------------------------------
!
!     This routine reads an ASCII text file of integer data (one integer
! per line ) into an array.  Any errors found during file access are
! reported and the program execution is stopped.  If the file does not
! contain Length number of integers, an error occurs and program execution
! is stopped.
!
!
! GLOBAL OUTPUTS:
!
!       ""   -------------- no global outputs are exported.
!
!
! GLOBAL INPUTS:
!
!       ""   -------------- no global inputs are imported.
!
! SUBROUTINE PARAMETERS:
!
!    FileName$ ----------- A string the containing file pathname of the file
!                          to be read into the Array parameter.
!
!    Length  ------------- The number of integers to be read into the Array
!                          parameter.  Range = 1..32766
!
!    Array   ------------- Array id.  The integer values read from the file
!                          are returned in this parameter.  The array must
!                          be dimensioned prior to calling this subroutine.
!                          The array must be a single(1) dimensioned array.
!                          The array indices are assumed to start at zero(0)
!                          and stop at Length-1 or greater than Length-1.
!
!-----------------------------------------------------------------------

NO_ERROR           = 0
   EOF                = 101007
   FILE_NOT_FOUND     = 100009
   WRONG_FILE_TYPE    = 101015
   FILE_NOT_ASSIGNED  = 136
   FILE_EXISTS        = 275 assign @File, Error to FileName$
   if Error <> NO_ERROR then
     call FGen_Error( "ReadArray: FILE ERROR '"&FileName$&"' "&errm$(Error) )
   end if for Index = 0 to Length-1
     enter @File,,Error; Array(Index)
     if Error <> NO_ERROR then
       if Error = EOF then
         call FGen_Error( "ReadArray: MORE DATA EXPECTED FROM '"&FileName$&"'" )
```

```
      else
         call FGen_Error("ReadArray: FILE ERROR '"&FileName$&"' "&errm$(Error))
      end if
   end if
next Index subend sub OpenFile( FileName$, @FilePtr )
!------------------------------------------------------------------
!
!    This routine opens an ASCII text file for output.  If the file already
! exists, the user is prompted for overwrite.  If the file does not exist,
! the file is created.  If any other file error occurs, the error is reported
! to the CRT and program execution stops.
!
!
! GLOBAL OUTPUTS:
!
!      ""      -------------- no global outputs are exported.
!
!
! GLOBAL INPUTS:
!
!      ""      -------------- no global inputs are imported.
!
! SUBROUTINE PARAMETERS:
!
!    FileName$ ----------- A string containing the file pathname of the
!                          output text file.
!
!    @FilePtr  ----------- The '@' file pointer.  If the file is opened,
!                          this pointer may be used by output statements
!                          to write data to the file.
!
!------------------------------------------------------------------

NO_ERROR              = 0
   EOF                   = 101007
   FILE_NOT_FOUND        = 100009
   WRONG_FILE_TYPE       = 101015
   FILE_NOT_ASSIGNED     = 136
   FILE_EXISTS           = 275 assign @FilePtr, Error to FileName$;write,new
   if Error <> NO_ERROR then
      if Error = FILE_EXISTS then
         print
         print "The file '";FileName$;"' already exists."
         print "Do you want to write over this file (yes or no)?"
         input Answer$
         if lwc$(Answer$[1;1]) = "y" then
            assign @FilePtr,Error to FileName$; write
            if Error <> NO_ERROR then
               call FGen_Error("OpenFile: FILE ERROR '"&FileName$&"' "&errm$(Error))
            end if
         ... ! don't want to write over file
            call FGen_Error( "OpenFile: USER STOPPED PROGRAM"
         end if
      else ! file error of some sort
         call FGen_Error( "OpenFile: FILE ERROR '"&FileName$&"' "&errm$(Error) )
      end if
   end if subend sub PrintBits( Value, Number_of_bits )
!------------------------------------------------------------------
!
```

```
!    This routine prints the boolean representation of an integer
! parameter to the current printer device.  The boolean values are
! printed from MSB ( most significant bit ) to LSB ( least
! significant bit ).  Example: decimal value 23 = "00010111", if
! eight(8) bits are requested in the <Number_of_bits> parameter.
!
! GLOBAL OUTPUTS:
!
!      ""    ------------- no global outputs are exported.
!
! GLOBAL INPUTS:
!
!      ""    ------------- no global inputs are imported.
!
! SUBROUTINE PARAMETERS:
!
!      Value ------------ Integer parameter.  Range = -32768..32767
!
!      Number_of_bits --- Size of the boolean representation of the
!                         integer parameter.  Range = 1..16
!
!------------------------------------------------------------------- if (Number_of_bits < 1) or (Number_of_bits > 16) then
    call FGen_Error( "PrintBits: Number_of_bits<1 or Number_of_bits>16" )
  end if if (Value < -32768) or (Value > 32767) then
    call FGen_Error( "PrintBits: Value<-32768 or Value>32767" )
  end if Buffer$ = ""
  for I = (Number_of_bits-1) to 0 step -1
    Buffer$ = Buffer$ & val$( bit( Value,I ) )
  next I print Value,Buffer$ subend sub FGen_Error( Err_msg$ )
!-------------------------------------------------------------------
!
!    This routine reports an error message from the Err_msg$ string
! parameter and stops program execution.  This routine attempts to
! report the error on the printer device and if this is not possible,
! the printer device is reset to the CRT and the error is reported.
!
! GLOBAL OUTPUTS:
!
!      ""    ------------- no global outputs are exported.
!
! GLOBAL INPUTS:
!
!      ""    ------------- no global inputs are imported.
!
! SUBROUTINE PARAMETERS:
!
!      Err_msg$ --------- String variable containing error message.  This
!                         message is sent to the printer device.
!
!------------------------------------------------------------------- dim Default_output$[80]
  Default_output$ = "/dev/crt"&crt$
  Device = 4                    ! status value of an HFS device node status Default_output$;Error,Opened,Type
  if Type=Device then assign @Output_error,Error to Default_output$;write,shared if not Error and Type = Device then
    output @Output_error;Err_msg$
```

```
     else
       printer is *
       print "The default error reporting device for FGen_Error is not available,"
       print "the printer destination has been reset to the CRT."
       print Err_msg$
     end if
     stop
subend
```

```
!!!!!!!!!!!!!!!!!!!!!!!!!!!!!!!!!!!!!!!!!!!!!!!!!!!!!!!!!!!!!!!!!!!!!!!!!!!!!!!
!!!!                                                                       !!!!
!!!!          M E R G E    U S E R    S U B R O U T I N E S    H E R E     !!!!
!!!!             ||                                              ||        !!!!
!!!!             \/                                              \/        !!!!
!!!!!!!!!!!!!!!!!!!!!!!!!!!!!!!!!!!!!!!!!!!!!!!!!!!!!!!!!!!!!!!!!!!!!!!!!!!!!!!

! /TELECOM/GEN/FRAME_TEMPLATE                                  Rev 3.0
!
! Frame Generator Template
!
!
!
!
!
!
!
!
!
!
!
! Copyright Hewlett-Packard 1987.  All Rights Reserved.
!
!*******************************************************************************
!-------------------------------------------------------------------------------
!
! To add other DSP subroutines, simply type in the following BTBasic commands
! at the command line:
!
!    edit 9999        ! This places the edit cursor at the last line.
!    merge "file id"  ! Merge the "file id" source at the current edit line.
!
!-------------------------------------------------------------------------------
!
!     This program is meant to be modified by the user BEFORE it is executed.
! The first half of this program consists of routines that fill pre-defined
! variables (arrays or numeric variables) with values from data files, user
! entry or DSP subroutine generated data.  These predefined variables reflect
! the data field(s) within this particular serial frame format.
!
!     The second half of this program consists of a subroutine that formats the
! values within the predefined variables into this serial frame format.  The
! manner in which the predefined variables are formatted is discussed in the
! comment section of the framing subroutine.
!
!     The subroutines following the framing subroutine are standard throughout
! the frame generator programs.  Not all of these subroutines are used in a
! particular frame generator.  These subroutines are documented in the comment
! section proceding the implementation section of each subroutine.
!
!     This allows the user to have complete control and flexibility over data
! field values and how they are generated.  Each frame generator program is to
! be used for a different frame format.
!
!-------------------------------------------------------------------------------
!
! USER MODIFIABLE PARAMETERS
```

```
!
I                = 0              ! Scratch variable.
MAX_LEN          = 1000           ! Maximum number of frames.  Same value used in
                                  !  data field array dimensioning.
LEN              = 0              ! Default number of frames to generate.
dim CH1(1000)                     ! Channel 1 field array. (max elements = 32766)
dim CH2(1000)                     ! Channel 2 field array. (max elements = 32766)
!----------------------------------------------------------------------------- print using "@"
print "FRAME GENERATOR"
print loop
   input "Enter number of frames to be generated : ",LEN
   exit if (LEN >= 1) and (LEN < MAX_LEN)
   print "VALUE OUT OF RANGE, RANGE = 1 ..";MAX_LEN;", RETRY"
end loop !*********************************************************************
! Retrieve/Generate field data for frame(s)
!*********************************************************************

!!!!!!!!!!!!!!!!!!!!!!!!!!!!!   E X A M P L E   !!!!!!!!!!!!!!!!!!!!!!!!!!!!!
!
! Retrieve CHANNEL1 field data from a text file.
!
print
FileName$ = "ch1#data"
print "Retrieving CHANNEL1 field data from '";FileName$;"'"
call ReadArray( FileName$, LEN, CH1(*) )
print !!!!!!!!!!!!!!!!!!!!!!!!!!!!!   E X A M P L E   !!!!!!!!!!!!!!!!!!!!!!!!!!!!!
!
! CHANNEL 2 field data is generated from dsp subroutines; tone and mu_law
!
print
input "Enter the tone frequency(Hz) to be generated : ",Frequency
!
! use rms value to produce full range
!
VRMS          = 8159 / sqr(2)         ! for MU_LAW
Phase         = 0
SampFrequency = 8000
call Tone( VRMS, Frequency, Phase, SampFrequency, LEN, CH2(*) )
call MU_law( LEN, CH2(*) )
!
! Be sure to merge TONE and MU_LAW at end of test
!

print
print "FRAME GENERATOR SUCCESSFULLY COMPLETED"

end ! main program

!!!!!!!!!!!!!!!!!!!!!!!!!!!!!!!!!!!!!!!!!!!!!!!!!!!!!!!!!!!!!!!!!!!!!!!!!!!!!
!!!!                                                                     !!!!
!!!!              P R O G R A M   S U B R O U T I N E S                  !!!!
!!!!                                                                     !!!!
!!!!!!!!!!!!!!!!!!!!!!!!!!!!!!!!!!!!!!!!!!!!!!!!!!!!!!!!!!!!!!!!!!!!!!!!!!!!!
```

```
sub Generate_frame( FileName$, Length, Channel1(*), Channel2(*) )
!-----------------------------------------------------------------------
!
!     This routine will open the output file, generate the framed field
! data, output the framed data to the output file, and close the output
! file.  Any fatal error encountered will be reported and program
! execution will stop.
!
!
! GLOBAL OUTPUTS:
!
!      ""      ------------- no global outputs are exported.
!
! GLOBAL INPUTS:
!
!      ""      ------------- no global inputs are imported.
!
! SUBROUTINE PARAMETERS:
!
!      FileName$ --------  String containing file pathname of the output
!                          file.
!
!      Length   -----------  The number of frames to be generated.
!                            Range = 1..MAX_LEN
!
!      Channel1(*) ------  Array id parameter containing CHANNEL 1 field
!                          data.  Each element is sent in its boolean
!                          representation to the output file as part of a frame.
!                          The array is dimensioned as a single(1) dimensioned
!                          array prior to calling this subroutine.
!
!      Channel2(*) ------  Array id parameter containing CHANNEL 2 field
!                          data.  Each element is sent in its boolean
!                          representation to the output file as part of a frame.
!                          The array is dimensioned as a single(1) dimensioned
!                          array prior to calling this subroutine.
!
!----------------------------------------------------------------------- dim Buffer$[80]

call OpenFile( FileName$, @FilePtr )

for Frame = 0 to Length-1

Buffer$=""
    !
    ! Get the lower eight bits of each element of the Channel1 array MSB->LSB.
    !
    call GetBitsMSB( Channel1( Frame ), 8, Buffer$ )
    !
    ! Get the lower sixteen bits of each element of the Channel2 array LSB->MSB.
    !
    call GetBitsLSB( Channel2( Frame ), 16, Buffer$ )
    !
    ! The last frame of data ends with two ";" characters
    !
    if Frame = Length-1 then
        output @FilePtr;Buffer$;";;"
      else
        output @FilePtr;Buffer$;";"
      end if
  next Frame
  !
  ! close the output file
  !
  assign @FilePtr,Error to * subend sub GetBitsMSB( Value, Number_of_bits, Buffer$ )
!-----------------------------------------------------------------------
!
```

```
!     This routine retrieves the boolean representation of an integer
!  parameter and appends it to a string parameter.  The boolean values
!  are stripped from MSB ( most significant bit ) to LSB ( least
!  significant bit ).  Example: decimal value 23 = "00010111", if
!  eight(8) bits are requested in the <Number_of_bits> parameter.
!
!  Note: If the <Value> parameter is greater than the 2's complement
!  range for the <Number_of_bits> parameter requested, the extra bits
!  withing the <Value> parameter are ignored and not put into the <Buffer$>
!  string parameter.
!
!
!  GLOBAL OUTPUTS:
!
!       ""    -------------- no global outputs are exported.
!
!
!  GLOBAL INPUTS:
!
!       ""    -------------- no global inputs are imported.
!
!  SUBROUTINE PARAMETERS:
!
!       Value ------------ Integer parameter.  Range = -32768..32767
!
!       Number_of_bits --- Size of the boolean representation of the
!                          integer parameter.  Range = 1..16
!
!       Buffer$ ---------- String parameter to which the boolean representation
!                          is appended.
!
!----------------------------------------------------------------------- if (Number_of_bits < 1) or (Number_of_bits > 16) then
     call FGen_Error( "GetBitsMSB: Number_of_bits<1 or Number_of_bits>16" )
   end if if (Value < -32768) or (Value > 32767) then
     call FGen_Error( "GetBitsMSB: Value<-32768 or Value>32767" )
   end if for I = (Number_of_bits-1) to 0 step -1
     Buffer$ = Buffer$ & val$( bit( Value,I ) )
   next I subend sub GetBitsLSB( Value, Number_of_bits, Buffer$ )
!-----------------------------------------------------------------------
!
!     This routine retrieves the boolean representation of an integer
!  parameter and appends it to a string parameter.  The boolean values
!  are stripped from LSB ( least significant bit ) to MSB ( most
!  significant bit ).  Example: decimal value 23 = "11101000", if
!  eight(8) bits are requested in the <Number_of_bits> parameter.
!
!  Note: If the <Value> parameter is greater than the 2's complement
!  range for the <Number_of_bits> parameter requested, the extra bits
!  withing the <Value> parameter are ignored and not put into the <Buffer$>
!  string parameter.
!
!
!  GLOBAL OUTPUTS:
!
!       ""    -------------- no global outputs are exported.
!
!
!  GLOBAL INPUTS:
!
!       ""    -------------- no global inputs are imported.
!
```

```
!    SUBROUTINE PARAMETERS:
!
!        Value ------------ Integer parameter.  Range = -32768..32767
!
!        Number_of_bits --- Size of the boolean representation of the
!                           integer parameter.  Range = 1..16
!
!        Buffer$ ---------- String parameter to which the boolean representation
!                           is appended.
!
!------------------------------------------------------------------- if (Number_of_bits < 1) or (Number_of_bits > 16) then
     call FGen_Error( "GetBitsLSB: Number_of_bits<1 or Number_of_bits>16" )
   end if if (Value < -32768) or (Value > 32767) then
     call FGen_Error( "GetBitsLSB: Value<-32768 or Value>32767" )
   end if for I = 0 to (Number_of_bits-1)
     Buffer$ = Buffer$ & val$( bit( Value,I ) )
   next I subend sub ReadArray( FileName$, Length, Array(*) )
!-------------------------------------------------------------------
!
!    This routine reads an ASCII text file of integer data (one integer
! per line ) into an array.  Any errors found during file access are
! reported and the program execution is stopped.  If the file does not
! contain Length number of integers, an error occurs and program execution
! is stopped.
!
!
! GLOBAL OUTPUTS:
!
!        ""    ------------- no global outputs are exported.
!
!
! GLOBAL INPUTS:
!
!        ""    ------------- no global inputs are imported.
!
! SUBROUTINE PARAMETERS:
!
!    FileName$ ----------- A string the containing file pathname of the file
!                          to be read into the Array parameter.
!
!    Length -------------- The number of integers to be read into the Array
!                          parameter.  Range = 1..32766
!
!    Array  -------------- Array id.  The integer values read from the file
!                          are returned in this parameter.  The array must
!                          be dimensioned prior to calling this subroutine.
!                          The array must be a single(1) dimensioned array.
!                          The array indices are assumed to start at zero(0)
!                          and stop at Length-1 or greater than Length-1.
!
!-------------------------------------------------------------------

NO_ERROR              = 0
   EOF                   = 101007
   FILE_NOT_FOUND        = 100009
   WRONG_FILE_TYPE       = 101015
   FILE_NOT_ASSIGNED     = 136
   FILE_EXISTS           = 275 assign @File, Error to FileName$
   if Error <> NO_ERROR then
```

```
      call FGen_Error( "ReadArray: FILE ERROR '"&FileName$&"' "&errm$(Error) )
    end if for Index = 0 to Length-1
      enter @File,,Error; Array(Index)
      if Error <> NO_ERROR then
        if Error = EOF then
          call FGen_Error( "ReadArray: MORE DATA EXPECTED FROM '"&FileName$&"'" )
        else
          call FGen_Error("ReadArray: FILE ERROR '"&FileName$&"' "&errm$(Error))
        end if
      end if
    next Index subend sub OpenFile( FileName$, @FilePtr )
!-----------------------------------------------------------------------
!
!    This routine opens an ASCII text file for output.  If the file already
! exists, the user is prompted for overwrite.  If the file does not exist,
! the file is created.  If any other file error occurs, the error is reported
! to the CRT and program execution stops.
!
!
! GLOBAL OUTPUTS:
!
!     ""     ------------- no global outputs are exported.
!
!
! GLOBAL INPUTS:
!
!     ""     ------------- no global inputs are imported.
!
! SUBROUTINE PARAMETERS:
!
!    FileName$  ----------- A string containing the file pathname of the
!                           output text file.
!
!    @FilePtr   ----------- The '@' file pointer.  If the file is opened,
!                           this pointer may be used by output statements
!                           to write data to the file.
!
!-----------------------------------------------------------------------

NO_ERROR                 = 0
    EOF                      = 101007
    FILE_NOT_FOUND           = 100009
    WRONG_FILE_TYPE          = 101015
    FILE_NOT_ASSIGNED        = 136
    FILE_EXISTS              = 275 assign @FilePtr, Error to FileName$;write,new
    if Error <> NO_ERROR then
      if Error = FILE_EXISTS then
        print
        print "The file '";FileName$;"' already exists."
        print "Do you want to write over this file (yes or no)?"
        input Answer$
        if lwc$(Answer$[1;1]) = "y" then
          assign @FilePtr,Error to FileName$; write
          if Error <> NO_ERROR then
            call FGen_Error("OpenFile: FILE ERROR '"&FileName$&"' "&errm$(Error))
          end if
        else ! don't want to write over file
          call FGen_Error( "OpenFile: USER STOPPED PROGRAM" )
        end if
      else ! file error of some sort
        call FGen_Error( "OpenFile: FILE ERROR '"&FileName$&"' "&errm$(Error) )
      end if
    end if subend
```

```
sub PrintBits( Value, Number_of_bits )
!-------------------------------------------------------------------
!
!      This routine prints the boolean representation of an integer
!   parameter to the current printer device.  The boolean values are
!   printed from MSB ( most significant bit ) to LSB ( least
!   significant bit ).  Example: decimal value 23 = "00010111", if
!   eight(8) bits are requested in the <Number_of_bits> parameter.
!
!   GLOBAL OUTPUTS:
!
!       ""     ------------- no global outputs are exported.
!
!   GLOBAL INPUTS:
!
!       ""     ------------- no global inputs are imported.
!
!   SUBROUTINE PARAMETERS:
!
!       Value ------------- Integer parameter.  Range = -32768..32767
!
!       Number_of_bits --- Size of the boolean representation of the
!                          integer parameter.  Range = 1..16
!
!------------------------------------------------------------------- if (Number_of_bits < 1) or (Num_  _of_bits > 16) then
      call FGen_Error( "PrintBits:    ber_of_bits<1 or Number_of_bits>16" )
   end if if (Value < -32768) or (Value    767) then
      call FGen_Error( "PrintBits:    e<-32768 or Value>32767" )
   end if Buffer$ = ""
   for I = (Number_of_bits-1) to     ep -1
      Buffer$ = Buffer$ & val$( b     alue,I ) )
   next I print Value,Buffer$ subend sub FGen_Error( Err_msg$ )
!-------------------------------  -------------------------------
!
!      This routine reports an     message from the Err_msg$ string
!   parameter and stops program    ution.  This routine attempts to
!   report the error on the pri    device and if this is not possible,
!   the printer device is reset    the CRT and the error is reported.
!
!   GLOBAL OUTPUTS:
!
!       ""     ------------- no    al outputs are exported.
!
!   GLOBAL INPUTS:
!
!       ""     ------------- no    al inputs are imported.
!
!   SUBROUTINE PARAMETERS:
!
!       Err_msg$ ---------- St     variable containing error message.  This
!                          me     e is sent to the printer device.
!
!-------------------------------  ------------------------------- dim Default_output$[80]
   Default_output$ = "/dev/crt    t$
   Device = 4                    atus value of an HFS device node status Default_output$;Errc   ened,Type
   if Type=Device then assign    put_error,Error to Default_output$;write,shared
```

```
      if not Error and Type = Dev    then
        output @Output_error;Err_
      else
        printer is *
        print "The default error    orting device for FGen_Error is not available,"
        print "the printer desti    on has been reset to the CRT."
        print Err_msg$
      end if
      stop
    subend !!!!!!!!!!!!!!!!!!!!!!!!!!!!!!!!!!!!!!!!!!!!!!!!!!!!!!!!!!!!!!!!!!!!!!!!!!!!
!!!!                                                                    !!!!
!!!!           M E R G E   U S E R   S U B R O U T I N E S   H E R E    !!!!
!!!!              ||                                 ||                 !!!!
!!!!              \/                                 \/                 !!!!
!!!!!!!!!!!!!!!!!!!!!!!!!!!!!!!!!!!!!!!!!!!!!!!!!!!!!!!!!!!!!!!!!!!!!!!!!!!!
```

!
! /TELECOM/GEN/FRAME_SBUS_TE                                  Rev 3.0
!
! Basic User-Network Interface (S reference) Frame Generator
! TE --> NT
!
!
!
!
!
!
!
!
!
!
! Copyright Hewlett-Packard 1987.  All Rights Reserved.
!
!****************************************************************************
!----------------------------------------------------------------------------
!
! To add other DSP subroutines, simply type in the following BTBasic commands
! at the command line:
!
!   edit 9999           ! This places the edit cursor at the last line.
!   merge "file id"     ! Merge the "file id" source at the current edit line.
!
!----------------------------------------------------------------------------
!
!     This program is meant to be modified by the user BEFORE it is executed.
! The first half of this program consists of routines that fill pre-defined
! variables (arrays or numeric variables) with values from data files, user
! entry or DSP subroutine generated data.  These predefined variables reflect
! the data field(s) within this particular serial frame format.
!
!     The second half of this program consists of a subroutine that formats the
! values within the predefined variables into this serial frame format.  The
! manner in which the predefined variables are formatted is discussed in the
! comment section of the framing subroutine.
!
!     The subroutines following the framing subroutine are standard throughout
! the frame generator programs.  Not all of these subroutines are used in a
! particular frame generator.  These subroutines are documented in the comment
! section proceding the implementation section of each subroutine.
!
!     This allows the user to have complete control and flexibility over data
! field values and how they are generated.  Each frame generator program is to
! be used for a different frame format.
!
!----------------------------------------------------------------------------
!
! USER MODIFIABLE PARAMETERS

```
!
I                    = 0          ! Scratch variable.
MAX_LEN              = 1000       ! Maximum number of frames.  Same value used in
                                  !   data field array dimensioning.
LEN                  = 0          ! Default number of frames to generate.
dim  B1(1000)                     ! Channel B1 field array.   (max elements = 32766)
dim  B2(1000)                     ! Channel B2 field array.   (max elements = 32766)
dim  D(1000)                      ! D channel field array.    (max elements = 32766)
dim  E(1000)                      ! D-echo-channel field array.(max elements = 32766)
dim  AC(1000)                     ! Activation bit field array.(max elements = 32766)
!----------------------------------------------------------------------------- print using "@"
print "SBUS TE --> NT FRAME GENERATOR"
print
print loop
   input "Enter number of frames to be generated : ",LEN
   exit if (LEN >= 1) and (LEN < MAX_LEN)
   print "VALUE OUT OF RANGE, RANGE = 1 ..";MAX_LEN;", RETRY"
end loop !*********************************************************************************
! Retrieve/Generate field data for frame(s)
!*********************************************************************************

!!!!!!!!!!!!!!!!!!!!!!!!!!!!!!   E X A M P L E   !!!!!!!!!!!!!!!!!!!!!!!!!!!!!!!!
!
! Retrieve B1 CHANNEL field data from a text file.
!
print
FileName$ = "sbus#b1"
print "Retrieving B1 CHANNEL field data from '";FileName$;"'"
call ReadArray( FileName$, LEN*2, B1(*) )
print !!!!!!!!!!!!!!!!!!!!!!!!!!!!!!   E X A M P L E   !!!!!!!!!!!!!!!!!!!!!!!!!!!!!!!!
!
! Retrieve B2 CHANNEL field data from a text file.
!
print
FileName$ = "sbus#b2"
print "Retrieving B2 CHANNEL field data from '";FileName$;"'"
call ReadArray( FileName$, LEN*2, B2(*) )
print !!!!!!!!!!!!!!!!!!!!!!!!!!!!!!   E X A M P L E   !!!!!!!!!!!!!!!!!!!!!!!!!!!!!!!!
!
! Retrieve D CHANNEL field data from a text file.
!
print
FileName$ = "sbus#d"
print "Retrieving D CHANNEL field data from '";FileName$;"'"
call ReadArray( FileName$, LEN, D(*) )
print File1$ = "sbus#file1"
File2$ = "sbus#file2"
call Generate_Sbus_TE( File1$, File2$, LEN, B1(*), B2(*), D(*) )
```

```
print
print "FRAME GENERATOR SUCCESSFULLY COMPLETED"

end ! main program
```

```
!!!!!!!!!!!!!!!!!!!!!!!!!!!!!!!!!!!!!!!!!!!!!!!!!!!!!!!!!!!!!!!!!!!!!!!!!!!!!
!!!!                                                                      !!!!
!!!!              P R O G R A M   S U B R O U T I N E S                   !!!!
!!!!                                                                      !!!!
!!!!!!!!!!!!!!!!!!!!!!!!!!!!!!!!!!!!!!!!!!!!!!!!!!!!!!!!!!!!!!!!!!!!!!!!!!!!!
```

```
sub Generate_Sbus_TE( File1$, File2$, Length, B1(*), B2(*), D(*) )
!-----------------------------------------------------------------
!
!    This routine will open the output file, generate the framed field
! data, output the framed data to the output file, and close the output
! file. Any fatal error encountered will be reported and program
! execution will stop.
!
!
! GLOBAL OUTPUTS:
!
!     ""      -------------- no global outputs are exported.
!
! GLOBAL INPUTS:
!
!     ""      -------------- no global inputs are imported.
!
! SUBROUTINE PARAMETERS:
!
!     File1$  ------------ String containing file pathname of the first half
!                          output file.
!
!     File2$  ------------ String containing file pathname of the second half
!                          output file.
!
!     Length  ------------ The number of frames to be generated.
!                          Range = 1..MAX_LEN
!
!     B1(*)   ------------ Array id parameter containing B1 CHANNEL field
!                          data. Each element is sent in its boolean
!                          representation to the output file as part of a frame.
!                          The array is dimensioned as a single(1) dimensioned
!                          array prior to calling this subroutine.
!
!     B2(*)   ------------ Array id parameter containing B2 CHANNEL field
!                          data. Each element is sent in its boolean
!                          representation to the output file as part of a frame.
!                          The array is dimensioned as a single(1) dimensioned
!                          array prior to calling this subroutine.
!
!     D(*)    ------------ Array id parameter containing D CHANNEL field
!                          data. Each element is sent in its boolean
!                          representation to the output file as part of a frame.
!                          The array is dimensioned as a single(1) dimensioned
!                          array prior to calling this subroutine.
!
!----------------------------------------------------------------- dim Buff1$[80], Buff2$[80]
```

```
TRUE  = 1
FALSE = 0 call OpenFile( File1$, @FilePtr1 )
call OpenFile( File2$, @FilePtr2 )

for Frame = 0 to Length-1
   !
   ! The LowZero boolean parameter is used to toggle the 0 coding values.
   ! If LowZero is TRUE, then the last bit was coded as a "low" zero and the
   !   current bit should be coded as a "high" zero value.
   ! If LowZero is FALSE, then the last bit was coded as a "high" zero and the
   !   current bit should be coded as a "low" zero value.
   ! The Code_SBUS_Bit routine will toggle the LowZero parameter is a zero
   !   bit value is coded.
   !
   LowZero = TRUE
   Buff1$  = ""
   Buff2$  = ""
      !
      ! Framing bit is always a "high" zero
      !
   call Code_SBUS_Bit( 0, LowZero,       0, Buff1$, Buff2$ )
      !
      ! The DC balancing bit following the framing bit is always a "low" zero.
      !
   call Code_SBUS_Bit( 0, LowZero, NumZeros, Buff1$, Buff2$ )
   output @FilePtr1;Buff1$ | output @FilePtr2;Buff2$ | Buff1$="" | Buff2$ = ""
      !
      ! B1 channel octet
      !
   NumZeros = 0         ! Start counting zeros for balance bits
   LowZero  = FALSE.    ! First zero valued bit of B1 is a "low" zero.
   call GetBitsSBUS( B1( Frame*2+0 ), 8, LowZero, NumZeros, Buff1$, Buff2$ )
   output @FilePtr1;Buff1$ | output @FilePtr2;Buff2$ | Buff1$="" | Buff2$ = ""
      !
      ! DC balancing bit
      !
   DC_Balance = (NumZeros+1) mod 2
   call Code_SBUS_Bit( DC_balance, LowZero, NumZeros, Buff1$, Buff2$ )
      !
      ! D-channel bit
      !
   NumZeros = 0         ! Start counting zeros for balance bits
   call GetBitsSBUS( bit(D(Frame),3), 1, LowZero, NumZeros, Buff1$, Buff2$ )
      !
      ! DC balancing bit
      !
   DC_Balance = (NumZeros+1) mod 2
   call Code_SBUS_Bit( DC_balance, LowZero, NumZeros, Buff1$, Buff2$ )
      !
      ! Auxiliary framing bit
      !
   NumZeros = 0         ! Start counting zeros for balance bits
   LowZero  = FALSE     ! Force auxiliary bit to be a "low" zero
   call Code_SBUS_Bit( 0, LowZero, NumZeros, Buff1$, Buff2$ )
      !
      ! DC balancing bit
      !
   DC_Balance = (NumZeros+1) mod 2
   call Code_SBUS_Bit( DC_balance, LowZero, NumZeros, Buff1$, Buff2$ )
   output @FilePtr1;Buff1$ | output @FilePtr2;Buff2$ | Buff1$="" | Buff2$ = ""
      !
      ! B2 channel octet
      !
   NumZeros = 0         ! Start counting zeros for balance bits
   call GetBitsSBUS( B2( Frame*2+0 ), 8, LowZero, NumZeros, Buff1$, Buff2$ )
   output @FilePtr1;Buff1$ | output @FilePtr2;Buff2$ | Buff1$="" | Buff2$ = ""
      !
      ! DC balancing bit
      !
```

```
   DC_Balance = (NumZeros+1) mod 2
   call Code_SBUS_Bit( DC_balance, LowZero, NumZeros, Buff1$, Buff2$ )
   !
     ! D-channel bit
   !
   NumZeros = 0        ! Start counting zeros for balance bits
   call GetBitsSBUS( bit(D(Frame),2), 1, LowZero, NumZeros, Buff1$, Buff2$ )
   !
     ! DC balancing bit
   !
   DC_Balance = (NumZeros+1) mod 2
   call Code_SBUS_Bit( DC_balance, LowZero, NumZeros, Buff1$, Buff2$ )
   output @FilePtr1;Buff1$ | output @FilePtr2;Buff2$ | Buff1$="" | Buff2$ = ""
   !
     ! B1 channel octet
   !
   NumZeros = 0        ! Start counting zeros for balance bits
   call GetBitsSBUS( B1( Frame*2+1 ), 8, LowZero, NumZeros, Buff1$, Buff2$ )
   output @FilePtr1;Buff1$ | output @FilePtr2;Buff2$ | Buff1$="" | Buff2$ = ""
   !
     ! DC balancing bit
   !
   DC_Balance = (NumZeros+1) mod 2
   call Code_SBUS_Bit( DC_balance, LowZero, NumZeros, Buff1$, Buff2$ )
   !
     ! D-channel bit
   !
   NumZeros = 0        ! Start counting zeros for balance bits
   call GetBitsSBUS( bit(D(Frame),1), 1, LowZero, NumZeros, Buff1$, Buff2$ )
   !
     ! DC balancing bit
   !
   DC_Balance = (NumZeros+1) mod 2
   call Code_SBUS_Bit( DC_balance, LowZero, NumZeros, Buff1$, Buff2$ )
   output @FilePtr1;Buff1$ | output @FilePtr2;Buff2$ | Buff1$="" | Buff2$ = ""
   !
     ! B2 channel octet
   !
   NumZeros = 0        ! Start counting zeros for balance bits
   call GetBitsSBUS( B2( Frame*2+1 ), 8, LowZero, NumZeros, Buff1$, Buff2$ )
   output @FilePtr1;Buff1$ | output @FilePtr2;Buff2$ | Buff1$="" | Buff2$ = ""
   !
     ! DC balancing bit
   !
   DC_Balance = (NumZeros+1) mod 2
   call Code_SBUS_Bit( DC_balance, LowZero, NumZeros, Buff1$, Buff2$ )

! D-channel bit
   !
   NumZeros = 0        ! Start counting zeros for balance bits
   call GetBitsSBUS( bit(D(Frame),0), 1, LowZero, NumZeros, Buff1$, Buff2$ )
   !
     ! DC balancing bit
   !
   DC_Balance = (NumZeros+1) mod 2
   call Code_SBUS_Bit( DC_balance, LowZero, NumZeros, Buff1$, Buff2$ )
   !
   ! The last frame of data ends with two ";" characters
   !
   if Frame = Length-1 then
       output @FilePtr1;Buff1$;";;"
       output @FilePtr2;Buff2$;";;"
     else
       output @FilePtr1;Buff1$;";"
       output @FilePtr2;Buff2$;";"
     end if
next Frame
!
! close the output files
!
```

```
    assign @FilePtr1,Error to *
    assign @FilePtr2,Error to * subend
```

```
sub GetBitsSBUS( Value, Number_of_bits, LowZero, NumZeros, Buff1$, Buff2$ )
!-----------------------------------------------------------------
!
!     This routine retrieves the boolean representation of an integer
! parameter and appends it to the string parameters according to the
! CCITT I.430 standard for pseudo-ternary coding.  The two string parameters
! represent the values of the two signals (combined at the transformer to
! for the pseudo-ternary signal).
!
! The Number_of_bits parameters represents the number bits within the integer
! value to convert to its pseudo-ternary format.  Bits are always converted
! MSB (Most Significant Bit) to LSB (Least Significant Bit).
!
! The LowZero parameter represents the current zero value, with
! TRUE = lower than zero and FALSE = higher than zero voltage potential.
!
!
! GLOBAL OUTPUTS:
!
!       ""     ------------- no global outputs are exported.
!
!
! GLOBAL INPUTS:
!
!       ""     ------------- no global inputs are imported.
!
! SUBROUTINE PARAMETERS:
!
!       Value  ------------- Integer parameter.  Range = -32768..32767
!
!       Number_of_bits ---  Size of the boolean representation of the
!                           integer parameter.  Range = 1..16
!
!       LowZero ----------- Boolean parameters representing the coding of the
!                           next zero parameter.  TRUE  = lower than zero.
!                                                 FALSE = higher than zero.
!
!       NumZeros ---------- Integer parameter to count the number of zeros
!                           (boolean value = 0) in the Value parameter.
!
!       Buff1$ ------------ First string parameter to which the boolean
!                           representation is appended.
!
!       Buff2$ ------------ Second string parameter to which the boolean
!                           representation is appended.
!
!----------------------------------------------------------------- if (Value < -32768) or (Value > 32767) then
      call FGen_Error( "GetBitsSBUS: Value<-32768 or Value>32767" )
    end if if (Number_of_bits < 1) or (Number_of_bits > 16) then
      call FGen_Error( "GetBitsSBUS: Number_of_bits<1 or Number_of_bits>16" )
    end if if (LowZero < 0) or (LowZero > 1) then
      call FGen_Error( "GetBitsSBUS: LowZero<0 or LowZero>1" )
    end if
```

```
! The B1 or B2 field are always an octet (8 bits)
!
   for I = (Number_of_bits-1) to 0 step -1
      call Code_SBUS_Bit( bit( Value, I ), LowZero, NumZeros, Buff1$, Buff2$ )
   next I subend sub Code_SBUS_Bit( BitValue, LowZero, NumZeros, Buff1$, Buff2$ )
!------------------------------------------------------------------
!
!     This routine converts a boolean value to its CCITT I.430 psuedo-ternary
!  coding representation and appends this code to the Buff1$ and Buff2$
!  parameters.
!
!     The LowZero parameter represents the current zero value, with
!  TRUE = lower than zero and FALSE = higher than zero voltage potential.
!
!     The NumZeros parameter is used to keep track of the number of zero
!  values in the SBUS frame.  This is used to set the balancing bits to the
!  correct code.
!
!  GLOBAL OUTPUTS:
!
!       ""          -------------- no global outputs are exported.
!
!
!  GLOBAL INPUTS:
!
!       ""          -------------- no global inputs are exported.
!
!  SUBROUTINE PARAMETERS:
!
!       BitValue   --------- Boolean parameter.  Range = 0..1
!
!       LowZero    ---------- Boolean parameters representing the coding of the
!                             next zero parameter.  TRUE = lower than zero.
!                                                   FALSE = higher than zero.
!
!       NumZeros   ---------- Integer parameter to count the number of zeros
!                             (boolean value = 0) in the Value parameter.
!
!       Buff1$     ----------- First string parameter to which the boolean
!                              representation is appended.
!
!       Buff2$     ----------- Second string parameter to which the boolean
!                              representation is appended.
!
!------------------------------------------------------------------

Zero$ = "00000000"
   One$  = "11111111"
   Off$  = "XXXXXXXX"

if (BitValue < 0) or (BitValue > 1) then
      call FGen_Error( "Code_SBUS_Bit: BitValue<0 or BitValue>1" )
   end if if (LowZero < 0) or (LowZero > 1) then
      call FGen_Error( "Code_SBUS_Bit: LowZero<0 or LowZero>1" )
   end if if BitValue then
      Buff1$ = Buff1$ & Zero$ | Buff2$ = Buff2$ & Zero$
   else
      NumZeros = NumZeros + 1
```

```
      if LowZero then
        !
        ! if last zero was a low zero then code this bit as high zero
        !
        Buff1$ = Buff1$ & Zero$ | Buff2$ = Buff2$ & One$
        LowZero = 0
      else
        !
        ! if last zero was not a low zero then code this bit as low zero
        !
        Buff1$ = Buff1$ & One$ | Buff2$ = Buff2$ & Zero$
        LowZero = 1
      end if
    end if subend sub GetBitsMSB( Value, Number_of_bits, Buffer$ )
!---------------------------------------------------------------------
!
!     This routine retrieves the boolean representation of an integer
!  parameter and appends it to a string parameter.  The boolean values
!  are stripped from MSB ( most significant bit ) to LSB ( least
!  significant bit ).  Example: decimal value 23 = "00010111", if
!  eight bits are requested in the Number of bits parameter
!
!  Note: If the <Value> parameter is greater than the 2's complement
!  range for the <Number_of_bits> parameter requested, the extra bits
!  withing the <Value> parameter are ignored and not put into the <Buffer$>
!  string parameter.
!
!
!  GLOBAL OUTPUTS:
!
!       ""     -------------- no global outputs are exported.
!
!
!  GLOBAL INPUTS:
!
!       ""     -------------- no global inputs are imported.
!
!  SUBROUTINE PARAMETERS:
!
!       Value ------------ Integer parameter.   Range = -32768..32767
!
!       Number_of_bits --- Size of the boolean representation of the
!                          integer parameter.  Range = 1..16
!
!       Buffer$ ---------- String parameter to which the boolean representation
!                          is appended.
!
!--------------------------------------------------------------------- if (Number_of_bits < 1) or (Number_of_bits > 16) then
    call FGen_Error( "GetBitsMSB: Number_of_bits<1 or Number_of_bits>16" )
  end if if (Value < -32768) or (Value > 32767) then
    call FGen_Error( "GetBitsMSB: Value<-32768 or Value>32767" )
  end if for I = (Number_of_bits-1) to 0 step -1
    Buffer$ = Buffer$ & val$( bit( Value,I ) )
  next I subend
```

```
sub GetBitsLSB( Value, Number_of_bits, Buffer$ )
!----------------------------------------------------------------
!
!     This routine retrieves the boolean representation of an integer
! parameter and appends it to a string parameter.  The boolean values
! are stripped from LSB ( least significant bit ) to MSB ( most
! significant bit ).  Example: decimal value 23 = "11101000", if
! eight(8) bits are requested in the <Number_of_bits> parameter.
!
! Note: If the <Value> parameter is greater than the 2's complement
! range for the <Number_of_bits> parameter requested, the extra bits
! withing the <Value> parameter are ignored and not put into the <Buffer$>
! string parameter.
!
!
!
! GLOBAL OUTPUTS:
!
!         ""     -------------- no global outputs are exported.
!
!
! GLOBAL INPUTS:
!
!         ""     -------------- no global inputs are imported.
!
! SUBROUTINE PARAMETERS:
!
!         Value ------------ Integer parameter.  Range = -32768..32767
!
!         Number_of_bits --- Size of the boolean representation of the
!                            integer parameter.  Range = 1..16
!
!         Buffer$ ---------- String parameter to which the boolean representation
!                            is appended.
!
!---------------------------------------------------------------- if (Number_of_bits < 1) or (Number_of_bits > 16) then
    call FGen_Error( "GetBitsLSB: Number_of_bits<1 or Number_of_bits>16" )
  end if if (Value < -32768) or (Value > 32767) then
    call FGen_Error( "GetBitsLSB: Value<-32768 or Value>32767" )
  end if for I = 0 to (Number_of_bits-1)
    Buffer$ = Buffer$ & val$( bit( Value,I ) )
  next I subend sub ReadArray( FileName$, Length, Array(*) )
!----------------------------------------------------------------
!
!     This routine reads an ASCII text file of integer data (one integer
! per line ) into an array.  Any errors found during file access are
! reported and the program execution is stopped.  If the file does not
! contain Length number of integers, an error occurs and program execution
! is stopped.
!
!
! GLOBAL OUTPUTS:
!
!         ""     -------------- no global outputs are exported.
!
!
! GLOBAL INPUTS:
!
!         ""     -------------- no global inputs are imported.
!
```

```
! SUBROUTINE PARAMETERS:
!
!     FileName$ ---------- A string, the containing file pathname of the file
!                          to be read into the Array parameter.
!
!     Length    ---------- The number of integers to be read into the Array
!                          parameter.  Range = 1..32766
!
!     Array     ---------- Array id.  The integer values read from the file
!                          are returned in this parameter. The array must
!                          be dimensioned prior to calling this subroutine.
!                          The array must be a single(1) dimensioned array.
!                          The array indices are assumed to start at zero(0)
!                          and stop at Length-1 or greater than Length-1.
!
!---------------------------------------------------------------------

NO_ERROR              = 0
   EOF                   = 101007
   FILE_NOT_FOUND        = 100009
   WRONG_FILE_TYPE       = 101015
   FILE_NOT_ASSIGNED     = 136
   FILE_EXISTS           = 275 assign @File, Error to FileName$
   if Error <> NO_ERROR then
      call FGen_Error( "ReadArray: FILE ERROR '"&FileName$&"' "&errm$(Error) )
   end if for Index = 0 to Length-1
      enter @File,,Error; Array(Index)
      if Error <> NO_ERROR then
         if Error = EOF then
            call FGen_Error( "ReadArray: MORE DATA EXPECTED FROM '"&FileName$&"'" )
         else
            call FGen_Error("ReadArray: FILE ERROR '"&FileName$&"' "&errm$(Error))
         end if
      end if
   next Index subend sub OpenFile( FileName$, @FilePtr )
!---------------------------------------------------------------------
!
!     This routine opens an ASCII text file for output.  If the file already
! exists, the user is prompted for overwrite.  If the file does not exist,
! the file is created.  If any other file error occurs, the error is reported
! to the CRT and program execution stops.
!
!
! GLOBAL OUTPUTS:
!
!     ""        ------------- no global outputs are exported.
!
!
! GLOBAL INPUTS:
!
!     ""        ------------- no global inputs are imported.
!
! SUBROUTINE PARAMETERS:
!
!     FileName$ ---------- A string containing the file pathname of the
!                          output text file.
!
!     @FilePtr  ---------- The '@' file pointer.  If the file is opened,
!                          this pointer may be used by output statements
!                          to write data to the file.
!
!---------------------------------------------------------------------
```

```
NO_ERROR                = 0
EOF                     = 101007
FILE_NOT_FOUND          = 100009
WRONG_FILE_TYPE         = 101015
FILE_NOT_ASSIGNED       = 136
FILE_EXISTS             = 275 assign @FilePtr, Error to FileName$;write,new
  if Error <> NO_ERROR then
    if Error = FILE_EXISTS then
      print
      print "The file '";FileName$;"' already exists."
      print "Do you want to write over this file (yes or no)?"
      input Answer$
      if lwc$(Answer$[1;1]) = "y" then
        assign @FilePtr,Error to FileName$; write
        if Error <> NO_ERROR then
          call FGen_Error("OpenFile: FILE ERROR '"&FileName$&"' "&errm$(Error))
        end if
      else ! don't want to write over file
        call FGen_Error( "OpenFile: USER STOPPED PROGRAM" )
      end if
    else ! file error of some sort
      call FGen_Error( "OpenFile: FILE ERROR '"&FileName$&"' "&errm$(Error) )
    end if
  end if subend sub PrintBits( Value, Number_of_bits )
!-----------------------------------------------------------------------
!
!     This routine prints the boolean representation of an integer
! parameter to the current printer device.  The boolean values are
! printed from MSB ( most significant bit ) to LSB ( least
! significant bit ).  Example: decimal value 23 = "00010111", if
! eight(8) bits are requested in the <Number_of_bits> parameter.
!
! GLOBAL OUTPUTS:
!
!       ""    ------------- no global outputs are exported.
!
! GLOBAL INPUTS:
!
!       ""    ------------- no global inputs are imported.
!
! SUBROUTINE PARAMETERS:
!
!       Value ------------- Integer parameter.  Range = -32768..32767
!
!       Number_of_bits --- Size of the boolean representation of the
!                          integer parameter.  Range = 1..16
!
!----------------------------------------------------------------------- if (Number_of_bits < 1) or (Number_of_bits > 16) then
    call FGen_Error( "PrintBits: Number_of_bits<1 or Number_of_bits>16" )
  end if if (Value < -32768) or (Value > 32767) then
```

```
       call FGen_Error( "PrintBits: Value<-32768 or Value>32767" )
     end if Buffer$ = ""
  for I = (Number_of_bits-1) to 0 step -1
    Buffer$ = Buffer$ & val$( bit( Value,I ) )
  next I print Value,Buffer$ subend sub FGen_Error( Err_msg$ )
!------------------------------------------------------------------
!
!     This routine reports an error message from the Err_msg$ string
!  parameter and stops program execution.  This routine attempts to
!  report the error on the printer device and if this is not possible,
!  the printer device is reset to the CRT and the error is reported.
!
!  GLOBAL OUTPUTS:
!
!       ""      ------------- no global outputs are exported.
!
!  GLOBAL INPUTS:
!
!       ""      ------------- no global inputs are imported.
!
!  SUBROUTINE PARAMETERS:
!
!       Err_msg$ ---------- String variable containing error message.  This
!                           message is sent to the printer device.
!
!------------------------------------------------------------------ dim Default_output$[80]
  Default_output$ = "/dev/crt"&crt$
  Device = 4                   ! status value of an HFS device node status Default_output$;Error,Opened,Type
  if Type=Device then assign @Output_error,Error to Default_output$;write,shared if not Error and Type = Device then
    output @Output_error;Err_msg$
  else
    printer is *
    print "The default error reporting device for FGen_Error is not available,"
    print "the printer destination has been reset to the CRT."
    print Err_msg$
  end if
  stop
subend !!!!!!!!!!!!!!!!!!!!!!!!!!!!!!!!!!!!!!!!!!!!!!!!!!!!!!!!!!!!!!!!!!!!!!!!!!!!
!!!!                                                                    !!!!
!!!!        M E R G E   U S E R   S U B R O U T I N E S   H E R E       !!!!
!!!!            ||                                    ||                !!!!
!!!!            \/                                    \/                !!!!
!!!!!!!!!!!!!!!!!!!!!!!!!!!!!!!!!!!!!!!!!!!!!!!!!!!!!!!!!!!!!!!!!!!!!!!!!!!!
```

APPENDIX B

```
sub Tone (VRMS, SIG_FREQ, PHASE, SAMP_FREQ, LENGTH, X(*) )
!* file pathname: /telecom/gen/tone                                    Rev 3.0
!* This routine will generate LENGTH values in the array X.
!* The value at N is computed by the formula:
!*
!*     X(N) = 2^(1/2) Vrms cos( 2 pi (SIG_FREQ N / SAMP_FREQ + PHASE/360) )
!*
!* where
!*   Vrms       is the signal amplitude in volts rms
!*   SIG_FREQ   is the signal frequency
!*   SAMP_FREQ  is the sampling frequency
!*   PHASE      is the initial phase angle
!* Copyright Hewlett-Packard 1987. All rights reserved.

! parameter check
  if (SAMP_FREQ<=0) or (SIG_FREQ>=SAMP_FREQ) then
     call DSP_type_error("Tone: Frequency parameter out of range")
    else | if (LENGTH<1) or (LENGTH>32767) then
        call DSP_type_error("Tone: Length parameter out of range")
       else | if (PHASE<0) or (PHASE>360) then
           call DSP_type_error("Tone: Phase parameter out of range")
         else
                     ! compute constant parts of the equation
           AMP = sqr(2) * VRMS
           DELT_ANGLE = 2 * pi * SIG_FREQ / SAMP_FREQ
           PHARAD = 2 * pi * PHASE / 360

! fill the array
           for IND = 0 to LENGTH-1
             X(IND) =  AMP * cos( DELT_ANGLE * IND + PHARAD)
             next IND end if
      end if
   end if subend ! tone !***********************************************************************
sub A_LAW( LENGTH, X(*) )
!* file pathname: /telecom/gen/a_law                                    Rev 3.0
!* This routine will take the real values passed in by the array X and convert
!* them to a non-uniform encoding via the A-law.
!*
!* The elements of the array are expected to be in the range [-4096,4096).
!* Any element outside this range will be treated as the closest boundary value.
!* LENGTH is the number of elements in the array which are to be converted
!*
!* Values produced will be an 8-bit code.
!* The boundary value will contain the code of the higher region.
!* Copyright Hewlett-Packard 1987. All rights reserved.

! parameter check
  if (LENGTH < 1) or (LENGTH > 32767) then
     call DSP_type_error("A_law: Length parameter out of range")
    else
                  ! for all the elements in the array
      for IND = 0 to LENGTH - 1
                  ! truncate value to closest magnitude
        TEMP = int(abs(X(IND)))
                  ! check value against the limit
        if TEMP> 4095 then TEMP = 4095
                  ! initialize to segment 0 parameters
        END = 32
        LEND = 0
        INTVSZ = 2
        SEG = 0
                  ! loop to locate segement
        loop
```

```
            exit if SEG = 8                     ! failsafe exit since 2**7 * 32 = 4096
                    ! check if correct segment to exit
            exit if TEMP <= END
                    ! adjust segment parameters
            LEND = END
            END = END * 2
                    ! every segement but seg #1 doubles in size
            if SEG>0 then INTVSZ = INTVSZ * 2
            SEG = SEG + 1
            end loop ! compute displacement into segment
            TEMP = TEMP - LEND
                    ! code lower 7 bits
            ALAW = 16 * SEG +  TEMP div INTVSZ
                    ! check sign bit correction
            if X(IND)>=0 then ALAW = ALAW + 128
                    ! invert alternate bits
            X(IND) = bineor(ALAW,85)
         next IND end if
subend  !  A_law !******************************************************************************
sub MU_LAW ( LENGTH, X(*) )                                                Rev 3.0
!* file pathname: /telecom/gen/mu_law
!* This routine will take the real values passed in by the array X and convert
!* them to a non-uniform encoding via the MU-law.
!* The elements of the array are expected to be in the range [-8159,8159).
!* Any element outside this range will be treated as the closest boundary value.
!* LENGTH is the number of elements in the array which are to be converted
!* This routine will produce an 8-bit code.
!* Boundary values will be coded as the lower value
!* Copyright Hewlett-Packard 1987. All rights reserved.

! parameter check
if (LENGTH < 1) or (LENGTH > 32767) then
    call DSP_type_error("Mu_law: Length parameter out of range")
  else
                ! for each element in the array
     for IND = 0 to LENGTH - 1
                ! limit check
       if X(IND) > 8158 then
           MLAW = 128
         else | if X(IND) < -8158 then
           MLAW = 0
         else
            TEMP = int(abs(X(IND)))
                ! segment 0 check
            if TEMP < 1 then
               INTVSZ = 1
               MLAW = 0
                ! segment 1 check
              else | if TEMP <= 31 then
                INTVSZ = 2
                TEMP = TEMP - 1
                MLAW = int ( TEMP / 2 ) + 1
              else
                ! initialize to segment 2
                INTVSZ = 4
                END = 95
                LEND = 31
                SEGSZ = 128
                SEG = 2
                ! locate proper segment
                loop
                    exit if SEG = 9    ! failsafe exit since 2**8 * 32 = 8192
                    exit if TEMP <= END
                    LEND = END
                    END = END + SEGSZ
```

```
                    SEGSZ = SEGSZ * 2
                    INTVSZ = INTVSZ * 2
                    SEG = SEG + 1
                  end loop
                  ! compute displacement into segment
                  TEMP = TEMP - LEND
                  ! compute code - 3 bit segment 4 bit displacement
                  MLAW = 16 * (SEG - 1) + int(TEMP / INTVSZ)
                end if
              end if
              ! set msb according to sign
          if X(IND) >= 0 then
              MLAW = 255 - MLAW
            else
              MLAW = 127 - MLAW
          end if
        end if
    X(IND) = MLAW
    next IND
  end if
subend   !  Mu_law !**************************************************************************
sub G_noise( VRMS, SEED, LENGTH, X(*) )
!* file pathname: /telecom/gen/g_noise.                                Rev 3.(
!* This routine will generate LENGTH values in the array X.
!* The values are Gaussian distributed pseudo-random numbers.
!* Copyright Hewlett-Packard 1987. All rights reserved.

if (LENGTH < 1) or (LENGTH > 32767) then
    call DSP_type_error("G_noise: Length parameter out of range")
  else
    Twopi = 2 * pi ! set up random number generator
    randomize SEED
    SEED2 = 10000000 * rnd ! randomly generate values between -1 & 1
    for IND = 0 to LENGTH - 1
      X(IND) = cos( Twopi * rnd )
    next IND ! reinitialize the random number generator
    randomize SEED2

! apply 2nd degree of randomness
    for IND = 0 to LENGTH - 1
      X(IND) = X(IND) * VRMS * sqr( -2 * log ( 1 - rnd ) )
    next IND end if subend   !  G_noise !**************************************************************************
sub Idle_Code ( C$, LENGTH, X(*) )
!* file pathname: /telecom/gen/idle_code                               Rev 3.0
!* This routine will generate LENGTH values in the array X.
!* The values are generated as alterating sign values starting with the positive
!* value first.  C$ is used to indicate the code type desired.  If C$ starts
!* with  the letter 'A', A-law will be used and 1's will be
!* generated.  If C$ starts with the letter 'M', Mu-law code will be used and
!* 0's will be generated.
!* Copyright Hewlett-Packard 1987. All rights reserved.

if lwc$(C$[1;1]) = "a" then
    V = 213
  else | if lwc$(C$[1;1]) = "m" then
      V = 255
```

```
      else | call DSP_type_error("Idle_code: Law parameter out of range")
      end if
   end if
if (LENGTH < 1) or (LENGTH > 32767) then
      call DSP_type_error("Idle_code : Length parameter out of range")
   else | for IND = 0 to LENGTH - 1
       X(IND) = V
       next IND end if
subend  !  idle_code
```
`!***********************************************************************`

```
!sub PRBS ( SCALE, COMPLEMENT, LENGTH, A(*) )
!* file pathname: /telecom/gen/prbs                                    Rev 3.0
!* This routine will generate LENGTH values in the array A.
!* The values are generated from a shift register which has elements
!* exclusively or'ed to feed the lowest bit.
!* The description of the circuit is obtained from the array PAT which
!* inicates the bits of the register, REG$, which are to be Xor'ed together
!* to form the next LSB. The SCALE parameter indicates the bit width of the
!* shift register to be used.
!* The register is initialized to all 1 bits.
!* The COMPLEMENT parameter indicates whether the output stream should be
!* complemented.
!* The bit stream is packed 16 bits in each array element with earliest bit
!* in the sequence as the high order bit.
!* Copyright Hewlett-Packard 1987. All rights reserved.
Scale = 16
Complement = 0
Length = 32000
dim A(32700)

dim PAT(3)
     ! Scale is associated with bandwidth limits set for 3065AT
if (SCALE < 6) or (SCALE >16) then
    call DSP_type_error("PRBS: Scale parameter out of range")
  else | if (LENGTH < 1) or (LENGTH > 32767) then
    call DSP_type_error("PRBS: Length parameter out of range")
     else | if (COMPLMENT < 0) or (COMPLEMENT > 1) then
       call DSP_type_error("PRBS: Complement parameter out of range")
       else
         on SCALE - 5 goto VI,VII,VIII,IX,X,XI,XII,XIII,XIV,XV,XVI ! the values in this array indicate the bit positions that are Xor'ed to
     ! get the lsb.  The value 1 indicates the msb of the register.
VI:     PAT(0) = 1| PAT(1) = 2 | PAT(2) = 0 | PAT(3) = 0    ! "110000"
        goto INIT
VII:    PAT(0) = 1| PAT(1) = 4 | PAT(2) = 0 | PAT(3) = 0    ! "1001000"
        goto INIT
VIII:   PAT(0) = 1| PAT(1) = 3 | PAT(2) = 4 | PAT(3) = 5    ! "10111000"
        goto INIT
IX:     PAT(0) = 1| PAT(1) = 5 | PAT(2) = 0 | PAT(3) = 0    ! "100010000"
        goto INIT
X:      PAT(0) = 1| PAT(1) = 4 | PAT(2) = 0 | PAT(3) = 0    ! "1001000000"
        goto INIT
XI:     PAT(0) = 1| PAT(1) = 3 | PAT(2) = 0 | PAT(3) = 0    ! "10100000000"
        goto INIT
XII:    PAT(0) = 1| PAT(1) = 2 | PAT(2) = 5 | PAT(3) = 7    ! "110010100000"
        goto INIT
XIII:   PAT(0) = 1| PAT(1) = 2 | PAT(2) = 4 | PAT(3) = 5    ! "1101100000000"
        goto INIT
XIV:    PAT(0) = 1| PAT(1) = 2 | PAT(2) = 7 | PAT(3) = 11   ! "11000010001000"
        goto INIT
XV:     PAT(0) = 1| PAT(1) = 2 | PAT(2) = 0 | PAT(3) = 0    ! "110000000000000"
        goto INIT
XVI:    PAT(0) = 1| PAT(1) = 2 | PAT(2) = 4 | PAT(3) = 13   ! "1101000000001000"

INIT:

INITREG$ = "1111111111111111"
                 ! initialize register to all ones actual size
         REG$ = INITREG$[1;SCALE]
```

```
BITC = 0
IND = 0
            ! for all elements in the array
loop
            ! initialize array element when new item
    if BITC = 0 then  A(IND) = 0
            ! set up for all tap points
    COMB = 0
    CIND = 0
            ! add in all tap points
    loop
      COMB = COMB exor bti(REG$[PAT(CIND);1])
      CIND = CIND + 1
      exit if CIND>3
      exit if PAT(CIND) = 0
    end loop ! shift register
    OUT = bti(REG$[1;1])
    REG$ = REG$[2] & itb$(COMB)

! add the bit (complement if desired)
    A(IND) = shift(A(IND),-1) + (OUT exor COMPLEMENT)

! pack bits in word
    BITC = (BITC + 1) mod 16
            ! move to next word when full
    if BITC = 0 then  IND = IND + 1
    exit if IND >= int(LENGTH)
    end loop
      end if
    end if
  end if
!subend  !  PRBS !***************************************************************************
sub U_noise ( VPEAK, SEED, LENGTH, X(*) )
!* file pathname: /telecom/gen/u_noise                              Rev 3.0
!* This routine will generate Length values in the array X.
!* The values are uniformly distributed pseudo-random numbers over the interval
!* (-VPEAK,VPEAK)
!* the  routine also requires a seed value for the random sequence
!* Copyright Hewlett-Packard 1987. All rights reserved.

randomize SEED if (LENGTH<1) or (LENGTH>32767) then
    call DSP_type_error("U_noise: Length parameter out of range")
  else
    for IND = 0 to LENGTH - 1
       X(IND) =  VPEAK * (2 * rnd - 1)
       next IND
  end if subend  !  U_noise !***************************************************************************
sub A_to_D ( LIM, SCALE, COMPLEMENT, LENGTH, X(*) )
!* file pathname: /telecom/gen/a_to_d                               Rev 3.0
!* This routine will take the real values passed in by the array X and convert
!* them to a quantized value that is between -2^SCALE+1 and 2^SCALE-1 exclusive.
!* (-2^SCALE) is included for twos complement.
!* The elements of the array will be expected to be in the range -LIM to LIM,
!* any values outside this range are treated as one of the boundary values.
!* Two's complement numbers are biased so that zero input occurs in the middle
!* of the zero output quanta.
!* LENGTH is the number of elements in the array which are to be converted.
!* COMPLEMENT indicates whether one's or two's complement notation is used.
!* Copyright Hewlett-Packard 1987. All rights reserved.

! parameter check
```

```
if (LENGTH<1) or (LENGTH>32767) then
    call DSP_type_error("D_to_A: Length parameter out of range")
  else | if (SCALE<1) or (SCALE>16) then
      call DSP_type_error("D_to_A: Scale parameter exceeds associated bandwidth")
    else | if LIM<=0 then
        call DSP_type_error("D_to_A: Limit parameter out of range")
      else | if (COMPLEMENT<1) or (COMPLEMENT>2) then
          call DSP_type_error("D_to_A: Complement parameter out of range")
        else
                    ! compute upper limit of output
          QMAX = 2^(SCALE - 1)
          if COMPLEMENT = 2 then
                    ! compute the interval size
            DELT = 2 * LIM / (2 ^ SCALE - 1)
            for IND = 0 to LENGTH - 1
                    ! if input beyond limit set to max code
              if X(IND) >= LIM  then
                X(IND) = QMAX - 1
              else | if X(IND) < -LIM - DELT/2 then
                  X(IND) = -QMAX
                else
                    ! code with .5 delta shift to center zero
                  X(IND) = int( X(IND) / DELT + 0.5)
                end if
              end if
            next IND
          else                         ! ones complement mode
                    ! compute the interval size
            DELT = 2 * LIM / int(2 ^ SCALE + 0.5)
            for IND = 0 to LENGTH - 1
                    ! if input beyond limit set to max code
              if X(IND) <= -LIM then
                X(IND) = -QMAX
              else | if X(IND) >= LIM then
                  X(IND) = QMAX - 1
                else
                  X(IND) = int( X(IND) / DELT)
                end if
              end if
            next IND
          end if
        end if
      end if
    end if
  end if
subend  !  A_to_D !****************************************************************************
sub Digital_mW(Law$,Length,Samples(*))                              !--- Digital_mW
!* file pathname: /telecom/gen/digital_mw                           Revision: 3.0
!* Description: Generates the "digital milliwatt" sample sequence defined by
!* the CCITT Red Book Fascicle III.3 rec. G.711 encoded in either mu or A law.
!* Copyright Hewlett-Packard 1987. All rights reserved.

dim Digital_mW_table(0:7)
if not (Length<1 or Length>32767) then
  if upc$(Law$[1;1])="M" then ! u-law table
    Digital_mW_table(0) = bti("00011110") ! 30
    Digital_mW_table(1) = bti("00001011") ! 11
    Digital_mW_table(2) = bti("00001011") ! 11
    Digital_mW_table(3) = bti("00011110") ! 30
    Digital_mW_table(4) = bti("10011110") ! 158
    Digital_mW_table(5) = bti("10001011") ! 139
    Digital_mW_table(6) = bti("10001011") ! 139
    Digital_mW_table(7) = bti("10011110") ! 158
  else | if upc$(Law$[1;1])="A" then ! A-law table
    Digital_mW_table(0) = bti("00110100") ! 52
    Digital_mW_table(1) = bti("00100001") ! 33
    Digital_mW_table(2) = bti("00100001") ! 33
    Digital_mW_table(3) = bti("00110100") ! 52
    Digital_mW_table(4) = bti("10110100") ! 180
```

```
      Digital_mW_table(5) = bti("10100001") ! 161
      Digital_mW_table(6) = bti("10100001") ! 161
      Digital_mW_table(7) = bti("10110100") ! 180
   else
      call DSP_type_error("Digital_mW error: Law <> ""M"" or ""A""")
   end if | end if for Index = 0 to Length - 1
       Samples(Index) = Digital_mW_table(Index mod 8)
   next Index
else
   call DSP_type_error("Digital_mW error: Length<1 or Length>32767")
end if
subend
```

APPENDIX D

```
!                                                                      Rev 3.0
! /TELECOM/GEN/PCFGEN
!
! Pattern Capture Format Generator
!
!
!
!
!
!
!
!
!
!
!
!
!
!
! Copyright Hewlett-Packard 1987.  All Rights Reserved.
!
!******************************************************************************
!============================================================================!
!                                                                            !
!                                                                            !
! OPERATION:                                                                 !
!                                                                            !
!              This program may be run by typing 'get "/util/pcfgen"|run'    !
!              on the command line.                                          !
!                                                                            !
!              The Pattern Capture Format Source Generator (PCFGEN) is a     !
!              general purpose, flexible program designed to produce         !
!              Vector Control Language (VCL) compatible PCF source code.     !
!              PCFGEN takes a user written "skeleton" file, called the       !
!              Format File, and user written or machine generated Data       !
!              Files and combines them into a VCL compatible Output File.    !
!              PCFGEN does not check for correct VCL syntax however, so it   !
!              is important that the original Format file be Syntactically   !
!              correct (with the exception of the special constructs and     !
!              commands allowed by PCFGEN). The manuals contain complete     !
!              information on correct Format and Data file syntax, use of    !
!              PCFGEN, and examples. Please consult the manuals for          !
!              information on proper use of PCFGEN. Subsequent comments      !
!              contained here will address detailed operation and organi-    !
!              zation of the PCFGEN software rather than its use.            !
!                                                                            !
!                                                                            !
!              The PCFGEN software consists of two major modules: the        !
!              Format File Parser and the Code Generator. Each module        !
!              contains several lower level sub-modules. In addition there   !
!              are general purpose subroutines for error handling and        !
!              program termination. The software is organized as follows     !
!                                                                            !
```

```
!           LEVEL 1                LEVEL 2                    LEVEL 3
!           -------                -------                    -------
!
!     FORMAT FILE PARSER
!                              Format File Line Scanner
!                                                         PCFGEN Command
!                                                         Scanner
!
!                                                         PCF Scanner
!
!
!                              PCFGEN Command Processor
!                                                         Data File Assigner
!
!
!
!     CODE GENERATOR
!                              PCF Replacement Frame
!                              Processor
!                                                         Data File Scanner
!                                                              Data File
!                                                              Line Reader
!                                                              (LEVEL 4)
!
!
!
!
!     ERROR HANDLER
!                              File Clean-up
!
!
!     WARNING HANDLER
!
!
!                              --------------------
!
!
!
!   INPUTS:    none
!
!   OUTPUTS:   none
!
!   GLOBAL VARIABLES USED:
!
!             @Ffile                     The at-name of the Format File.
!
!             @Outfile                   The at-name of the Output File.
!
!             Glb_ffile_name$            The name of the user supplied
!                                        Format File.
!
!             Glb_outfile_name$          The name of the file where the
!                                        PCFGEN output is to go.
!
!         note: The Data File names are supplied by the Format file
!               header block. See Manuals for Syntax.
!
!==================================================================!

!=============================!
! DIMENSION GLOBAL VARIABLES  !
!=============================!

! The following variables are used for the replacement character
! linked-list data structure. Each PCF replacement line found
! in the Format File is assigned an index number. This index number
! is used to point into the arrays defined below.
```

```
dim Glb_repl_lines(0:100)          ! The Format File line number of each
                                   ! PCF replacement line is stored in this
                                   ! array. The "100" dimension allows 100
                                   ! replacement lines per Format File.

! The following variables keep track of the current valid replacement
! characters (those characters defined in the Format File header) and
! the PCF column each of the characters is assigned to.  The max
! dimension of these arrays must match the Max_repl_chars constant.

dim Glb_valid_repl_chars$[16]      ! A string containing all of the current
                                   ! valid replacement characters.

dim Glb_repl_chars$(1:16)[1]       ! The array which maps a replacement
                                   ! character index to the actual replacement
                                   ! character.

dim Glb_PCF_cols(1:16)             ! The array which maps a replacement
                                   ! character index to the PCF replacement
                                   ! column assigned to that character dim Glb_repl_cols(0:100,1:16)      ! This array does the mapping between
                                   ! the PCF column number of a replacement
                                   ! character and the actual column number
                                   ! of that character. The first dimension
                                   ! must be the same as the Max_repl_lines
                                   ! constant and the second dimension must
                                   ! be the same as the Max_repl_chars constant.

dim  Glb_line_type$[80]            ! The type of line found by the Format
                                   ! File scanner.

! These variables store the PCFGEN command and parameters found by the
! PCFGEN command scanner.

dim Glb_PCFGEN_comm$[1], Glb_PCFGEN_param1$[80], Glb_PCFGEN_param2$[80]

dim Glb_master_repl_char$[1]       ! The character to be used as the Master
    Glb_master_repl_char$ = ""     ! replacement character.

! The following arrays are the buffers and buffer pointers for the Data
! Files. THE UPPER ARRAY DIMENSION (16) MUST NOT BE CHANGED UNLESS THE
! ROUTINES ASSIGN_DFILE AND READ_LINE ARE CHANGED ALSO.

dim Glb_dfile_buffer$(1:16)[80]    ! The line buffers for the data files.
dim Glb_dfile_buffptr(1:16)        ! The pointers into the line buffers.

!=========================!
! OTHER GLOBAL VARIABLES  !
!=========================!

Glb_repl_count = 0                 ! The total number of currently
                                   ! valid replacement characters Glb_max_repl = 0                   ! The global variable defining the   !
                                   ! maximum number of replacement lines!
                                   ! that were found in the Format File.!
```

```
!==================!
! GLOBAL CONSTANTS !
!==================!

Glb_valid_PCF_chars$ = "10HLXZPN.hlxzpn"   ! The list of valid PCF characters.

Glb_PCFGEN_chars$ = "##"                   ! The PCFGEN command indicator.

Glb_valid_PCFGEN_comm$ = "MR"              ! The list of defined PCFGEN
                                           ! commands (single character
                                           ! commands).

Max_repl_lines = 100      ! this should match the array size of
                          ! Glb_repl_lines and Glb_repl_cols.

Max_repl_chars = 16       ! this should match the array size of
                          ! Glb_valid_repl_chars$, Glb_repl_chars$
                          ! and Glb_PCF_cols True = 1
False = 0

! Error codes

End_of_file = 101007
File_not_found = 100009
Wrong_file_type = 101015
File_not_assigned = 136
File_exists = 275

!========================================================================!
! BEGIN MAIN PROGRAM -- PCFGEN                                           !
!========================================================================!

print chr$(27);"H";chr$(27);"J"
print "##################################"
print "##                              ##"
print "## HP3065 Pattern Capture Format ##"
print "##         Source Generator     ##"
print "##                              ##"
print "##                              ##"
print "## Copyright 1987               ##"
print "## Hewlett-Packard Company      ##"
print "##                              ##"
print "##################################"
print
input "Enter name of Format File ",Glb_ffile_name$
assign @Ffile,Error to Glb_ffile_name$
if Error <> 0 then
   call Abort("Error accessing format file",Error)
end if loop
   input "Enter name of Output File ",Glb_outfile_name$
   assign @Outfile, Error to Glb_outfile_name$; write, new exit if not Error if Error <> File_exists then
      call Abort("Problem assigning Output File",Error)
   else
```

```
            print "The file ";Glb_outfile_name$;" already exists."
            print "Do you want to write over the file (yes or no)?"
            input Temp$
            if lwc$(Temp$[1;1]) = "y" then
                assign @Outfile, Error to Glb_outfile_name$; write
                if Error then
                    call Abort("Could not assign output file",Error)
                end if
            else
                input "Do you want to select a different file? (Y or N)",Temp$
                if lwc$(Temp$[1;1])<> "y" then stop
            end if
        end if exit if not Error
    end loop print
print "Parsing '";Glb_ffile_name$;"'......"
call Parse_ffile
print "Generating PCF......"
call Code_gen
call Close_files end !==========================================================================!
! SUBROUTINE PARSE_FFILE                                                   !
!==========================================================================!
!                                                                          !
! OPERATION:                                                               !
!                                                                          !
!           the parser performs three major functions:                     !
!                                                                          !
!           1) The parser will look for command lines in the header of the !
!              format file and will pass any commands it finds to the      !
!              command processor.                                          !
!                                                                          !
!           2) the parser will find the start of the program block.        !
!                                                                          !
!           3) the parser will create the linked list containing the       !
!              line numbers of valid replacement lines in the format file. !
!                                                                          !
!                                                                          !
!                                                                          !
! INPUTS:   none                                                           !
!                                                                          !
! OUTPUTS:  none                                                           !
!                                                                          !
! GLOBAL VARIABLES USED:                                                   !
!                                                                          !
!           Glb_line_type$           The type of line found by the         !
!                                    Format File Scanner (see              !
!                                    routine Scan_ffile_line).             !
!                                                                          !
!           Glb_PCFGEN_comm$,                                              !
!           Glb_PCFGEN_param1$,                                            !
!           Glb_PCFGEN_param2$       The PCFGEN command found by the       !
!                                    PCFGEN Command Scanner (see routine!
!                                    PCFcom_scan).                         !
!                                                                          !
!           Glb_repl_lines           The array containing the actual       !
!                                    Format File line number of each       !
!                                    replacement line.                     !
```

```
!                Glb_start_line         The Format File line number corres-!
!                                       sponding to the first line of the  !
!                                       program block (see Code_gen).      !
!                                                                          !
!                Max_repl_lines         The global constant defining the   !
!                                       maximum number of replacement lines!
!                                       that may exist in a Format File.   !
!                                                                          !
!                Glb_max_repl           The global variable defining the   !
!                                       maximum number of replacement lines!
!                                       that were found in the Format File.!
!                                                                          !
!                Glb_master_repl_char$  The replacement character assigned !
!                                       to the Master replacement file.    !
!                                                                          !
!                Glb_valid_repl_chars$  The list of current valid replace- !
!                                       ment characters.                   !
!                                                                          !
!                End_of_file            The global end of file error code  !
!                                                                          !
!==========================================================================!

sub Parse_ffile
global @Ffile
global Glb_line_type$, Glb_PCFGEN_comm$, Glb_PCFGEN_param1$
global Glb_PCFGEN_param2$, Glb_repl_lines(*), Comm_found
global Glb_start_line, Max_repl_lines, Glb_master_repl_char$
global End_of_file, Glb_valid_repl_chars$, True, False, Glb_max_repl
dim Ffile_line$[80]

Comm_found = False     !"Command found" flag
Line_count = 1

Repl_flag= True   !
                  ! will write the PCF column numbers of the replacements
                  ! to the Glb_PCF_cols array. The flag will be set to false
                  ! after the first replacement, so that subsequent
                  ! replacements will check for a match with the Glb_PCF_cols ! This loop will process the header of the format file.
! The loop will exit if a file read error occurs (including end of file),
! or if a VCL statement is found or if a PCF statement is found.
! If the loop exits before finding a PCFGEN command, an error will be
! reported.

loop

! The line input variable must be set to null before doing the enter
   ! statement so that blank lines will be handled as desired. If the
   ! the line is not nulled, a copy of the previous line will be returned
   ! by the enter statement.

Ffile_line$ = ""
   enter @Ffile,,Error; Ffile_line$
   exit if Error <> 0

Glb_line_type$ = ""
   Repl_ptr = 0        ! Prepare to find the first replacement line.

if len(trim$(Ffile_line$)) <> 0 then
      ! The line is not blank so send it to the line scanner.
      call Scan_ffile_line(Repl_ptr,Ffile_line$,Repl_flag)
   end if
```

```
! Exit on the first occurrence of a "non-header" line -- all header
! lines, namely comments and PCFGEN commands must come before any
! real VCL or PCF lines.
exit if Glb_line_type$ = "VCL_statement"
exit if Glb_line_type$ = "PCF_norm"
exit if Glb_line_type$ = "PCF_repl"

! a PCFGEN command has been found -- call the command processor
   if Glb_line_type$ = "PCFGEN_command" then call Comm_proc Line_count = Line_count + 1 end loop

! process errors
if Error then
   if Error <> End_of_file then
      ! an error occurred while reading the file
      call Abort("Error occurred while reading Format File",Error)
   else
      ! We are at end of file.
      ! No real VCL or PCF lines in file
      call Abort("Unexpected end of Format File -- no VCL statements found",Error)
   end if
end if ! If we get here then everything is OK -- there were no errors and valid
! PCFGEN command(s) were found in the header. Line_count is pointing to
! the first line of the program block. Check one last thing -- if no master
! replace command was found then issue a warning. Ffile_line$ contains
! the first line of the Format File program block.

if Glb_master_repl_char$ = "" then

! Issue the warning
   call Warning("No master replacement command found, default is first file")
   ! Assign the first Data File to be the master
   Glb_master_repl_char$ = Glb_valid_repl_chars$[1;1]
end if ! Save the line number of the start of the program block.
Glb_start_line = Line_count if Glb_line_type$ = "PCF_repl" then   Repl_flag = False
      ! We have found a replacement line.
      ! Reset the first replacement flag.

loop

! This loop processes the program block of the format file. The loop will
! exit if an error occurs (including end of file), and will abort if
! a PCFGEN command is found if len(trim$(Ffile_line$)) <> 0 then
      ! Line is not blank so we may pass it to the scanner
      call Scan_ffile_line(Repl_ptr,Ffile_line$,Repl_flag)

! Process the results from the Scanner.

if Glb_line_type$ = "PCFGEN_command" then
         ! This line is illegal in the program block, so abort
         call Abort("PCFGEN command found in program block of Format File",0)
      end if if Glb_line_type$ = "PCF_repl" then
         ! We have found a replacement line.
         ! Reset the first replacement flag.
         Repl_flag = False
```

```
      ! Insert the line number of the new replacement line into the list
      Glb_repl_lines(Repl_ptr) = Line_count Repl_ptr = Repl_ptr + 1
      if Repl_ptr >= Max_repl_lines then
         ! there are too many replacement lines in the file
         call Abort("Too many replacement lines in Format File",0)
      end if end if end if ! Get a new line from the Format File
  Ffile_line$ = ""
  enter @Ffile,,Error; Ffile_line$
  exit if Error <> 0

Line_count = Line_count + 1 end loop

! Process errors
if Error <> End_of_file and Error <> 0 then
   ! there was an error while reading the Format File
   call Abort("Error occurred while reading the Format File",Error)
end if if Repl_ptr = 0 then
   ! There were no replacement lines in the Format File
   call Abort("No Replacement lines found in Format File",0)
   else
      Glb_max_repl = Repl_ptr
end if ! End of file is the normal termination for this routine subend !=============================================================================!
! SUBROUTINE SCAN_FFILE_LINE                                                  !
!=============================================================================!
!                                                                             !
! OPERATION:                                                                  !
!                                                                             !
! This routine will scan  a format file line (80 character string)            !
! and return information about the line. Each type of line that may be found  !
! in a format file is described below. The operation of the scanner for each  !
! type of line is also given.                                                 !
!                                                                             !
! 1) Blank line    -- the calling program should check for zero length lines  !
!                     and should NOT pass those lines to the scanner          !
!                                                                             !
! 2) Comment line  -- a comment line will be defined as a line whose first    !
!                     non-blank character is a ! followed by anything except  !
!                     the special PCFGEN command sequence defined by the      !
!                     global string Glb_PCFGEN_chars$. If a line is found     !
!                     to be a comment by the scanner, the value "comment"     !
!                     will be assigned to the global string Glb_line_type$.   !
!                                                                             !
! 3) PCFGEN command line -- a PCFGEN command line is defined as a line with   !
!                     a comment character (!) in column 1 which is            !
``` immediately followed by the PCFGEN command
sequence defined by Glb_PCFGEN_chars$. The syntax
for a PCFGEN command is:

!<chars> <command> "param 1" "param 2"

where <chars> = the PCFGEN command sequence
      <command>= the single character PCFGEN
                 command
      "param 1"= the first PCFGEN command parameter
      "param 2"= the second PCFGEN command param.

the PCFGEN command may be followed by comments.
When a PCFGEN command line is found by the scanner
the value "PCFGEN_command" will be assigned to
Glb_line_type$, the <command> field
will be assigned to
Glb_PCFGEN_comm$, the first param will be
assigned to Glb_PCFGEN_param1$, and the second
parameter will be assigned to Glb_PCFGEN_param2$.
if a parameter does not exist it will be assigned
the null string.

4) A PCF line    -- this type of line is defined as a line with a double
                    quote (") as the first non-blank character.
                    When the scanner finds this type of line, it will
                    check all characters between quotes to make sure they
                    are either valid PCF characters or valid replacement
                    characters. The set of valid replacement characters
                    is stored according to their replacement order in the
                    array called Glb_repl_chars$. The PCF column associated
                    with each replacement character is stored in the array
                    Glb_PCF_cols. If the Repl_flag is set (=1), values
                    will be stored into the arrays, otherwise, the values
                    will be compared to the existing array entries.
                    If valid replacements are found, the value "PCF_repl"
                    will be assigned to Glb_line_type$, otherwise the value
                    "PCF_norm" will be assigned.

5) A VCL statement  -- this type of line is defined as a line with
                       any non-blank and non-" character preceeding the
                       first comment character (!) or a line that does not
                       contain a comment character. The scanner DOES
                       NOT check for correct VCL syntax.
                       When a line of this type is found, the scanner
                       will assign the value "VCL_statement" to the
                       variable Glb_line_type$. Note that any line which
                       begins with one or more statement separators will
                       be interpreted as this type of line.

INPUTS:

Repl_line_num    The Format File line number of the current
                         line being processed. This parameter is used
                         by the PCF_scan routine.

Ffile_line$      The Format File line to be scanned. This must
                         be a non-blank line.

Repl_flag        The replace flag. If this parameter is 1 and
                         the line being scanned is a replacement line,
                         the replacement characters and their PCF column
                         addresses will be stored
                         into the Glb_repl_chars$
                         and Glb_PCF_cols arrays. If the parameter is
                         0, the replacement characters will be compared
                         to the present values in the arrays.

```
! OUTPUTS:   none
!
!
! GLOBAL VARIABLES USED:
!
!          Glb_PCFGEN_chars$     The sequence of characters that are
!                                reserved to indicate a PCFGEN command.
!                                The sequence must immediately follow a
!                                comment character (!) in column 1 to be
!                                recognized as the command sequence.
!
!          Glb_repl_chars$       The current set of valid replacement
!                                characters.
!
!          Glb_PCF_cols          The PCF column associated with each
!                                replacement character.
!
!          Glb_line_type$        The type of line the scanner has found.
!
!          Glb_PCFGEN_comm$      The PCFGEN single character command
!                                found by the scanner.
!
!          Glb_PCFGEN_param1$    The first PCFGEN parameter found by
!                                the scanner.
!
!          Glb_PCFGEN_param2$    The second PCFGEN parameter found by
!                                the scanner.
!
!==========================================================================!

sub Scan_ffile_line(Repl_line_num,Ffile_line$,Repl_flag)
global Glb_PCFGEN_chars$, Glb_repl_chars$(*), Comm_found
global Glb_PCF_cols(*), Glb_line_type$, Glb_PCFGEN_comm$
global Glb_PCFGEN_param1$, Glb_PCFGEN_param2$, True, False ! first null out all global outputs Glb_line_type$ = ""
Glb_PCFGEN_comm$ = ""
Glb_PCFGEN_param1$ = ""
Glb_PCFGEN_param2$ = ""

Line_len = len(Ffile_line$)               ! Length of the line to be scanned if Line_len = 0 then
   call Abort("Blank line found by scanner!!",0)
end if Comm_len = len(Glb_PCFGEN_chars$)         ! Length of the PCFGEN comm sequence ! Start scanning if Ffile_line$[1;1] = "!" and Ffile_line$[2;Comm_len] = Glb_PCFGEN_chars$ then
          ! The line must be a PCFGEN command
    call PCFcom_scan(Ffile_line$)
    Comm_found = True else
            ! Make decision based on the first non-blank character Trimmed_line$ = trim$(Ffile_line$)

if Trimmed_line$[1;1] = "!" then
              ! Line is a comment
```

```
            Glb_line_type$ = "comment"
        else | if not Comm_found then
                  ! No PCFGEN command was found in the source
             call Abort("No PCFGEN command found in header block of format file",0)

else | if Trimmed_line$[1;1] = """" then
                   ! Line is PCF
                call PCF_scan(Repl_line_num,Ffile_line$, Repl_flag)

else | if Glb_line_type$ = "" then
                 ! A valid line type has not yet been found, so the line must be VCL
                 Glb_line_type$ = "VCL_statement"
                 end if
             end if
          end if end if
     end if subend !=============================================================================!
!SUBROUTINE PCFCOM_SCAN                                                       !
!=============================================================================!
!                                                                             !
! OPERATION:                                                                  !
!                                                                             !
!          The PCFGEN command scanner accepts a PCFGEN command line           !
!          as input and attempts to find valid command and parameter          !
!          syntax. If the syntax is correct (see routine                      !
!          Scan_ffile_line or manuals), PCFcom_scan will place the            !
!          command and parameters into the global variables                   !
!          Glb_PCFGEN_comm$, Glb_PCFGEN_param1$, and Glb_PCFGEN_param2$!
!                                                                             !
!                                                                             !
!                         --------------------                                !
!                                                                             !
!                                                                             !
! INPUTS:                                                                     !
!                                                                             !
!          PCFcom_line$            The PCFGEN command line to be              !
!                                  scanned.                                   !
!                                                                             !
! OUTPUTS:   none                                                             !
!                                                                             !
! GLOBAL VARIABLES USED:                                                      !
!                                                                             !
!          Glb_PCFGEN_comm$,                                                  !
!          Glb_PCFGEN_param1$,                                                !
!          Glb_PCFGEN_param2$      The PCFGEN command and parameters          !
!                                  found by PCFcom_scan.                      !
!                                                                             !
!          Glb_PCFGEN_chars$       The PCFGEN command characters.             !
!                                                                             !
!          Glb_line_type$          The global variable that tells the         !
!                                  parser what type of line has been          !
!                                  found.                                     !
!                                                                             !
!=============================================================================!

sub PCFcom_scan(PCFcom_line$)
```

```
global Glb_PCFGEN_chars$, Glb_line_type$, True, False

Line_len = len(PCFcom_line$)              ! Find the length of the input line
Comm_len = len(Glb_PCFGEN_chars$)         ! Find the length of the PCFGEN
                                          ! command sequence ! search for the single character PCFGEN command
   Column = 1 + Comm_len                  ! Start looking right after comm sequence
   loop
      ! Loop until end of line or first non-blank character Column = Column + 1
      if Column > Line_len then
         ! We have scanned the entire line
         call Abort("PCFGEN command not found on command line",0)
      end if
      exit if PCFcom_line$[Column;1] <> " "
   end loop ! We are now pointing to the command character
   Glb_PCFGEN_comm$ = PCFcom_line$[Column;1]

! Now find the first parameter
   ! Only spaces may occur between the
   ! command character and the first parameter field.
   loop
      Column = Column + 1
      exit if Column > Line_len
      exit if PCFcom_line$[Column;1] <> " "
   end loop if Column > Line_len then
      ! First parameter not found
      Glb_PCFGEN_param1$ = ""
   else | if PCFcom_line$[Column;1] <> """" then
      ! A non-blank character has been found between fields
      call Abort(""" expected on command line in Format File",0)
   else
      ! get the first parameter
      Temp_col = Column + 1
      loop
         ! Loop until end of line or next double quote
         Column = Column + 1
         if Column > Line_len then
            call Abort("Incomplete first parameter on PCFGEN command line",0)
         end if
         exit if PCFcom_line$[Column;1] = """"
      end loop
      ! Save the parameter
      Glb_PCFGEN_param1$ = PCFcom_line$[Temp_col;Column - Temp_col]

end if | end if

! Now find the second parameter
   ! Only spaces are allowed between fields
   loop
      Column = Column + 1
      exit if Column > Line_len
      exit if PCFcom_line$[Column;1] <> " "
   end loop if Column > Line_len then
      ! Second parameter not found
      Glb_PCFGEN_param2$ = ""
   else | if PCFcom_line$[Column;1] <> """" then
      ! A non-blank character has been found between fields
      call Abort(""" expected on command line of Format File",0)
   else
```

```
      ! get the second parameter
      Temp_col = Column + 1
      loop
        ! Loop until end of line or next double quote
        Column = Column + 1
        if Column > Line_len then
          call Abort("Incomplete second parameter on PCFGEN command line",0)
        end if
        exit if PCFcom_line$[Column;1] = """"
      end loop
      ! Save second parameter
      Glb_PCFGEN_param2$ = PCFcom_line$[Temp_col;Column - Temp_col]
    end if | end if Glb_line_type$ = "PCFGEN_command"

subend

!=======================================================================!
! SUBROUTINE PCF_SCAN                                                   !
!=======================================================================!
!                                                                       !
!                                                                       !
! OPERATION:                                                            !
!           This subroutine will accept a line of PCF and will do one of !
!           two things depending on the state of Repl_flag. If Repl_flag !
!           is true (<> 0), the PCF line will be scanned for replacement !
!           characters. Each time a replacement character is found, the  !
!           PCF column for that character will be entered in the         !
!           Glb_PCF_cols array and the character itself will be put into !
!           the Glb_repl_chars$ array. Checking is performed to make sure !
!           a given character is only used once.                         !
!                                                                       !
!           If Repl_flag is false (= 0), the line will be scanned for    !
!           replacement characters and each character will be checked to !
!           make sure it is in the correct column.                       !
!                                                                       !
!           In both cases, the actual Format File column of the          !
!           replacement character will be saved in the Glb_repl_cols     !
!           array. The Glb_repl_cols array has an actual column entry    !
!           for each replacement character in each replacement line.     !
!                                                                       !
!                                                                       !
!                     --------------------                              !
!                                                                       !
!                                                                       !
! INPUTS:                                                               !
!                                                                       !
!           Repl_line_num      The line number of the current Format    !
!                              File line being scanned.                 !
!                                                                       !
!           PCF_line$          The line to be scanned by PCF_scan       !
!                                                                       !
!           Repl_flag          See subroutine Scan_ffile_line           !
!                                                                       !
! OUTPUTS:  none                                                        !
!                                                                       !
!                                                                       !
! GLOBAL VARIABLES USED:                                                !
!                                                                       !
!           Glb_repl_chars$    The array of replacement characters.     !
!                                                                       !
!           Glb_PCF_cols       The array indicating the PCF column      !
!                              associated with each replacement character !
!                                                                       !
!           Glb_valid_PCF_chars$  The string of valid PCF characters. These!
!                                 characters CAN NOT be used as replacement!
!                                 characters.                           !
!                                                                       !
```

```
!                Glb_valid_repl_chars$    The set of current valid replacement       !
!                                         characters.                                !
!                                                                                    !
!                Glb_repl_cols            the array containing the actual column number!
!                                         of each replacement character on each replace-!
!                                         ment line                                  !
!                                                                                    !
!                Glb_line_type$           See subroutine Scan_ffile_line             !
!                                                                                    !
!====================================================================================!

sub PCF_scan(Repl_line_num, PCF_line$, Repl_flag)
global Glb_repl_chars$(*), Glb_PCF_cols(*)
global Glb_valid_PCF_chars$, Glb_line_type$, Glb_valid_repl_chars$
global Glb_repl_cols(*), True, False PCF_col = 1                   ! The current PCF column
   Repl_char_num = 1             ! The current replacement character index PCF_flag = False              ! The flag to indicate whether we are inside
                                 ! or outside of a pcf block.

Line_len = len(PCF_line$)
   Comment = False                                ! The "comment found" flag
   Repl_len = len(Glb_valid_repl_chars$)          ! The number of valid repl chars ! Find the non-PCF (replacement) characters Column = 1
   loop
      exit if Column >= Line_len
      exit if Comment
      ! If we haven't reached a comment character then go ahead Current_char$ = PCF_line$[Column;1]

! Check for a valid PCF character
      Valid_PCF_CHAR = (pos(Glb_valid_PCF_chars$, Current_char$) <> 0 )

! Check for a valid replacement character
      Valid_repl_char = (pos(Glb_valid_repl_chars$, Current_char$) <> 0 )

if Current_char$ = """" then
      ! " means we have either entered or exited a PCF area
      ! Toggle state of PCF flag
      PCF_flag = not PCF_flag else ! Otherwise look at the character if Valid_PCF_char and PCF_flag then
         ! The current character is a valid PCF character inside of a
         ! valid PCF field PCF_col = PCF_col + 1
      end if if Valid_repl_char and PCF_flag then
         ! The current character is a replacement character.

if Repl_flag then
            ! The replacement character must be stored in the arrays ! We first check to see if the particular replacement
            ! character has been used before
```

```
            for Count = 1 to len(Glb_valid_repl_chars$)
               if Glb_repl_chars$(Count) = Current_char$ then
                  call Abort("Second use of the a replacement character",0)
               end if
            next Count
            if Repl_char_num > len(Glb_valid_repl_chars$) then
               call Abort("Too many replacement characters on PCF line",0)
            end if ! If we get here then we know that the character has not been used
         ! before and that we should assign the character to the arrays Glb_repl_chars$(Repl_char_num) = Current_char$
            Glb_PCF_cols(Repl_char_num) = PCF_col
            Glb_repl_cols(Repl_line_num,Repl_char_num) = Column
            Repl_char_num = Repl_char_num + 1
            PCF_col = PCF_col + 1 else   ! Repl_flag was false

! Don't put the character into the arrays, but check for
            ! correctness
            if Current_char$ <> Glb_repl_chars$(Repl_char_num) then
               call Abort("Invalid or out of order replacement character",0)
            end if
            if PCF_col <> Glb_PCF_cols(Repl_char_num) then
               call Abort("Replacement character in wrong column",0)
            end if
            Glb_repl_cols(Repl_line_num,Repl_char_num) = Column
            Repl_char_num = Repl_char_num + 1
            PCF_col = PCF_col + 1 end if end if
         if not Valid_PCF_char and not Valid_repl_char and PCF_flag then
            ! We have found an invalid character inside of the PCF call Abort("Invalid replacement character on PCF line",0)
         end if if Current_char$ = "!" and not PCF_flag then
            ! The current character is a comment and not inside a PCF field
            ! Set the comment flag
            Comment = 1
         end if end if !not "

Column = Column + 1 end loop

! If we get here and have not incremented Repl_char_num, then there
   ! were no replacement characters. Set the Glb_line_type$ variable
   ! accordingly.

if Repl_char_num = 1 then
      ! no replacement characters
      Glb_line_type$ = "PCF_norm"
   else
      ! there were replacement characters
      Glb_line_type$ = "PCF_repl"

! There were replacements, so check to make sure there were exactly
      ! the right number
      if Repl_char_num - 1 <> Repl_len then
         call Abort("Incorrect number of replacement characters on line",0)
      end if end if subend
```

```
!=========================================================================!
! SUBROUTINE COMM_PROC                                                    !
!=========================================================================!
!                                                                         !
!                                                                         !
! OPERATION:                                                              !
!                                                                         !
!           When a PCFGEN command is found in the Format File header, this!
!           routine is called to take action on that command.             !
!           The only two commands currently defined are the Replace (R)   !
!           and Master replace (M) commands. The two commands are the same!
!           except that the Master replace assigns a value to             !
!           Glb_master_repl_char$. Both commands associate a file name with!
!           a replacement character. Data file assignments are also made  !
!           in numerical order, i.e. the first replacement file is assigned!
!           to @Dfile1, the next to @Dfile2, etc. The replacement character!
!           symbols are put in order into the string Glb_valid_repl_chars$.!
!           Glb_repl_count is used to keep track of how many files/characters
!           have been used. The command syntaxes are:                     !
!                                                                         !
!                 command       param1       param2                       !
!                 -------       ------       ------                       !
!                    M          repl char    repl file name               !
!                    R          repl char    repl file name               !
!                                                                         !
!                                                                         !
!                       ------------------------                          !
!                                                                         !
!                                                                         !
! INPUTS:   none                                                          !
!                                                                         !
! OUTPUTS:  none                                                          !
!                                                                         !
! GLOBAL VARIABLES USED:                                                  !
!                                                                         !
!           Glb_PCFGEN_comm$,                                             !
!           Glb_PCFGEN_param1$,                                           !
!           Glb_PCFGEN_param2$      The PCFGEN command and parameters to  !
!                                   be processed.                         !
!                                                                         !
!           Glb_repl_count          The current number of active          !
!                                   replacement characters. This variable !
!                                   must be initialized to zero once      !
!                                   at the beginning of PCFGEN.           !
!                                                                         !
!           Glb_valid_PCFGEN_comm$  The string containing all of the valid!
!                                   single character PCFGEN commands.     !
!                                                                         !
!           Glb_valid_repl_chars$   The string containing all of the valid!
!                                   replacement characters found in the   !
!                                   Format File header.                   !
!                                                                         !
!           Glb_master_repl_char$   The master replacement character.     !
!                                   this variable should be set to the    !
!                                   null string at the start of PCFGEN.   !
!                                                                         !
!=========================================================================!

sub Comm_proc
global Glb_PCFGEN_comm$, Glb_PCFGEN_param1$, Glb_PCFGEN_param2$
global Glb_valid_PCFGEN_comm$, Glb_master_repl_char$, Max_repl_chars
global Glb_repl_count, Glb_valid_repl_chars$, True, False
global Glb_valid_PCF_chars$ ! first convert the command to an index number for the jump table
```

```
Comm_index = pos(Glb_valid_PCFGEN_comm$, Glb_PCFGEN_comm$)
if Comm_index = 0 then
   ! This condition can never really exist, but the check is here just in
   ! case the calling routine is modified such that a non-valid command
   ! may be passed to this routine.
   call Abort("Unknown command found by command processor",0)
end if ! Here is the command branch statement (jump table)

on Comm_index goto M, R

M: ! master replace command.
if len(Glb_PCFGEN_param1$) <> 1 then
   ! The parameter for this command is not exactly one character long.
   ! Report error
   call Abort("Invalid first parameter for 'M' command",0)
end if if pos(Glb_valid_PCF_chars$, Glb_PCFGEN_param1$) <> 0 then
   ! The parameter is a valid PCF character so it can not be used as a
   ! replacement character
   EPCFGEN$ = "Valid PCF characters (" & Glb_PCFGEN_param1$
   EPCFGEN$ = EPCFGEN$ & ") can not be used as replacements"
   call Abort(EPCFGEN$,0)
end if if pos(Glb_valid_repl_chars$, Glb_PCFGEN_param1$) <> 0 then
   ! This replacement character has already been used
   EPCFGEN$ = "Duplicate replacement character (" & Glb_PCFGEN_param1$
   EPCFGEN$ = EPCFGEN$ & ") found in command line"
   call Abort(EPCFGEN$,0)
end if if Glb_master_repl_char$ <> "" then
   ! This is not the first 'M' command
   call Abort("Multiple master replacement commands found",0)
end if if len(Glb_valid_repl_chars$) >= Max_repl_chars then
   ! The data files are all used up
   call Abort("Too many replacement commands in header",0)
end if
Glb_master_repl_char$ = Glb_PCFGEN_param1$
Glb_valid_repl_chars$ = Glb_valid_repl_chars$ & Glb_PCFGEN_param1$
Glb_repl_count = Glb_repl_count + 1

! Assign the replacement character to a data file
call Assign_dfile goto Exit

R: ! Replace command
if len(Glb_PCFGEN_param1$) <> 1 then
   ! The parameter for this command is not exactly one character long.
   ! Report error
   call Abort("Invalid first parameter for 'R' command",0)
end if if pos(Glb_valid_PCF_chars$, Glb_PCFGEN_param1$) <> 0 then
   ! The parameter is a valid PCF character so it can not be used as a
   ! replacement character
   EPCFGEN$ = "Valid PCF characters (" & Glb_PCFGEN_param1$
   EPCFGEN$ = EPCFGEN$ & ") can not be used as replacements"
   call Abort(EPCFGEN$,0)
end if
```

```
if pos(Glb_valid_repl_chars$, Glb_PCFGEN_param1$) <> 0 then
   ! This replacement character has already been used
   EPCFGEN$ = "Duplicate replacement character (" & Glb_PCFGEN_param1$ +
   EPCFGEN$ = EPCFGEN$ & ") found in command line"
   call Abort(EPCFGEN$,0)
end if if len(Glb_valid_repl_chars$) >= Max_repl_chars then
   ! The data files are all used up
   call Abort("Too many replacement commands in header",0)
end if
Glb_valid_repl_chars$ = Glb_valid_repl_chars$ & Glb_PCFGEN_param1$
Glb_repl_count = Glb_repl_count + 1

! Assign the replacement character to a data file
call Assign_dfile goto Exit

! Any additional commands should be implemented here and accessed with
! the command jump table.

Exit:

subend
```

```
!=============================================================================!
! SUBROUTINE ASSIGN_DFILE                                                      !
!=============================================================================!
!                                                                              !
!                                                                              !
! OPERATION:                                                                   !
!                                                                              !
!         This routine will assign an @Dfile to the file name specified        !
!         by Glb_PCFGEN_param2$. The @DfileX file that will be used is         !
!         determined from X = Glb_repl_count                                   !
!                                                                              !
!                   --------------------                                       !
!                                                                              !
!                                                                              !
! INPUTS:  none                                                                !
!                                                                              !
! OUTPUTS: none                                                                !
!                                                                              !
! GLOBAL VARIABLES USED:                                                       !
!                                                                              !
!         Glb_repl_count        The replacement count tells the routine        !
!                               which data file is to be used next             !
!                                                                              !
!         Glb_PCFGEN_param2$    This will be the file name to use for          !
!                               the assignment                                 !
!                                                                              !
!                                                                              !
!=============================================================================!
```

```
sub Assign_dfile
global Glb_repl_count, Glb_PCFGEN_param2$, Max_repl_chars
global File_not_found, Wrong_file_type global @Dfile1, @Dfile2, @Dfile3, @Dfile4
global @Dfile5, @Dfile6, @Dfile7, @Dfile8
global @Dfile9, @Dfile10, @Dfile11, @Dfile12
global @Dfile13, @Dfile14, @Dfile15, @Dfile16

Jmp = Glb_repl_count

! This is the jump table for the assignments
on Jmp goto D1,D2,D3,D4,D5,D6,D7,D8,D9,D10,D11,D12,D13,D14,D15,D16
```

```
D1:
assign @Dfile1, Error to Glb_PCFGEN_param2$;read,shared
goto Exit

D2:
assign @Dfile2, Error to Glb_PCFGEN_param2$;read,shared
goto Exit

D3:
assign @Dfile3, Error to Glb_PCFGEN_param2$;read,shared
goto Exit

D4:
assign @Dfile4, Error to Glb_PCFGEN_param2$;read,shared
goto Exit

D5:
assign @Dfile5, Error to Glb_PCFGEN_param2$;read,shared
goto Exit

D6:
assign @Dfile6, Error to Glb_PCFGEN_param2$;read,shared
goto Exit

D7:
assign @Dfile7, Error to Glb_PCFGEN_param2$;read,shared
goto Exit

D8:
assign @Dfile8, Error to Glb_PCFGEN_param2$;read,shared
goto Exit

D9:
assign @Dfile9, Error to Glb_PCFGEN_param2$;read,shared
goto Exit

D10:
assign @Dfile10, Error to Glb_PCFGEN_param2$;read,shared
goto Exit

D11:
assign @Dfile11, Error to Glb_PCFGEN_param2$;read,shared
goto Exit

D12:
assign @Dfile12, Error to Glb_PCFGEN_param2$;read,shared
goto Exit

D13:
assign @Dfile13, Error to Glb_PCFGEN_param2$;read,shared
goto Exit

D14:
assign @Dfile14, Error to Glb_PCFGEN_param2$;read,shared
goto Exit

D15:
assign @Dfile15, Error to Glb_PCFGEN_param2$;read,shared
goto Exit

D16:
assign @Dfile16, Error to Glb_PCFGEN_param2$;read,shared
goto Exit

Exit:
if Error = File_not_found then
   call Abort("Data replacement file (#"&val$(Jmp)&") does not exist",Error)
end if
if Error = Wrong_file_type then
   call Abort("Data replacement file (#"&val$(Jmp)&") is of wrong type",Error)
```

```
end if
if Error then
   call Abort("Error assigning data replacement file (#"&val$(Jmp)&")",Error)
end if subend
```

```
!===========================================================================!
! subroutine Code_gen                                                       !
!===========================================================================!
!                                                                           !
!                                                                           !
! OPERATION:                                                                !
!                                                                           !
!         The code generator uses the information generated by the parser   !
!         to generates the output PCF file. Each time a PCF replace line    !
!         is encountered, the routine PCF_repl_frame is called. The         !
!         PCF_repl_frame routine will attempt to build a replacement frame  !
!         and write it to the output file. A code will be returned to the   !
!         code generater to indicate the result of the attempt. The code    !
!         is placed in the global variable Glb_repl_error_code and is       !
!         defined as:                                                       !
!                                                                           !
!         0    No errors, there is still data in the master data file.      !
!                                                                           !
!         1    No errors, but the last piece of data from the master        !
!              file has been used.                                          !
!                                                                           !
!         2    Error, out of data -- one of the data files did not have!
!              enough data to fill the frame.                               !
!                                                                           !
!         3    Error, the master file is out of data, but other data        !
!              files still contain data. This condition is flagged as      !
!              a warning.                                                   !
!                                                                           !
!                         ------------------                                !
!                                                                           !
! INPUTS: none                                                              !
! OUTPUTS: none                                                             !
!                                                                           !
! GLOBAL VARIABLES USED:                                                    !
!                                                                           !
!         @Ffile                  The Format File at-name.                  !
!                                                                           !
!         @Outfile                The Output File at-name.                  !
!                                                                           !
!         Glb_ffile_name$         The name of the Format File. This         !
!                                 parameter is used in addition to          !
!                                 the at-name because the routine           !
!                                 must be able to close and re-open         !
!                                 the Format File.                          !
!                                                                           !
!         Glb_outfile_name$       The name of the output file. The          !
!                                 Code_gen routine does the output          !
!                                 file assignment, so must have             !
!                                 access to this variable.                  !
!                                                                           !
!         Glb_max_repl            The global variable defining the          !
!                                 maximum number of replacement lines       !
!                                 that were found in the Format File.       !
!                                                                           !
!         Glb_repl_lines          The array of Format File                  !
!                                 replacement line pointers.                !
!                                                                           !
!         Glb_start_line          The line number of the first              !
!                                 line of the Format File program           !
!                                 block.                                    !
```

```
!              Glb_repl_error_code      The error status returned by the    !
!                                       PCF_repl_frame routine.             !
!                                                                           !
!              End_of_file              The end of file error code.         !
!                                                                           !
!===========================================================================!

sub Code_gen
global Glb_ffile_name$, Glb_outfile_name$
global @Ffile, @Outfile
global Glb_repl_lines(*), True, False
global Glb_start_line, Glb_repl_error_code, End_of_file, Glb_max_repl dim Dummy$[80]

! Close the input file so that it may be re-opended. Opening the file will
! set the line pointer to the beginning
assign @Ffile,Error to *
if Error then
   call Abort("Error closing Format file",Error)
end if assign @Ffile,Error to Glb_ffile_name$
if Error then
   call Abort("Error opening Format File",Error)
end if
! Copy the header block to the output file
for Line_ptr = 1 to Glb_start_line - 1
   Templine$ = ""
   enter @Ffile,,Error;Templine$
   if Error <> 0 then
      call Abort("Error reading format file",Error)
   end if
   output @Outfile,,Error;Templine$
   if Error <> 0 then
      call Abort("Error writing to output file",Error)
   end if
next Line_ptr ! Now process the program block
loop ! This outer loop continues until all data from the master data file has
   ! been used (PCF_repl_frame returns a code = 1), or until one of the data
   ! files runs out of data (code of 2 or 3).

! close the format file
   assign @Ffile,Error to *
   if Error <> 0 then
      call Abort("Could not un-assign format file",Error)
   end if ! Now reopen it (file pointer will point to the first line)
   assign @Ffile,Error to Glb_ffile_name$
   if Error <> 0 then
      call Abort("Could not assign format file",Error)
   end if Line_ptr = 1
   Repl_ptr = 0

! Advance the file pointer to the start of the program block
   loop
```

```
   exit if Line_ptr = Glb_start_line
   Dummy$ = ""
   enter @Ffile,,Error; Dummy$
   if Error <> 0 then call Abort("Error reading format file",Error)
   Line_ptr = Line_ptr + 1
end loop ! The line pointer is now be pointing to the first line of the program
! block of the format file loop ! This inner loop reads lines from the format file program block. if
   ! the line read is a replacement line (determined by the linked list
   ! of replacement lines), the replace frame routine is called. Otherwise
   ! the line is simply copied to the output file. This loop will exit if
   ! any of the data files run out of data (the replace frame routine
   ! returns a code of 2 or 3) or when end of file is encountered.

Ffile_line$ = ""
      enter @Ffile,,Error; Ffile_line$
      if Error <> 0 and Error <> End_of_file then
         call Abort("Error reading format file",Error)
      end if exit if Error = End_of_file if Line_ptr = Glb_repl_lines(Repl_ptr) then
         ! this is a replacement line, so call the frame replace routine
         call PCF_repl_frame(Repl_ptr,Ffile_line$)
         Repl_ptr = (Repl_ptr + 1) mod Glb_max_repl
      else
         ! not a replacement line so write it to the output file
         output @Outfile,,Error;Ffile_line$
         if Error then call Abort("Error writing to output file",Error)
      end if Line_ptr = Line_ptr + 1
      exit if Glb_repl_error_code = 2 or Glb_repl_error_code = 3 end loop

! If all data from the data files has been used then exit
   exit if Glb_repl_error_code <> 0

! Otherwise there is data left and we are at format file EOF
   ! so repeat loop end loop ! When we get here we are out of data file data -- either the master data
! file has run out right at the end of a pass through the format file,
! or the master data file has run out of data before the end of the format file
! or one of the other data files has run out of data.

if Glb_repl_error_code = 2 then
   ! A data file has run out of data
   call Abort("Data file does not contain enough bits",0)
end if if Glb_repl_error_code = 3 then
   ! A data file has too much data (with respect to the master file)
   ! This is a warning rather than an error
   call Warning("All data files do not contain the same number of bits")
end if subend
```

```
!=====================================================================!
! SUBROUTINE PCF_REPL_FRAME                                           !
!=====================================================================!
!                                                                     !
! OPERATION:                                                          !
!                                                                     !
!         This routine will access each of the data replacement       !
!         files and attempt to build a line of PCF to write to        !
!         the output file. File access is done through the Get_char   !
!         routine. PCF_repl_frame receives a data character and       !
!         a result code from the Get_char routine and uses this       !
!         information to build the PCF line and to set the value      !
!         of Glb_repl_error_code for the Code_gen routine.            !
!                                                                     !
!         The result codes returned by Get_char are:                  !
!                                                                     !
!              0   Normal data character has been found.              !
!                                                                     !
!              1   The last data character in a frame has been found. !
!                                                                     !
!              2   The last data character in the file has been found.!
!                                                                     !
!         Note that code 2 takes precedence over code 1, that is the  !
!         last data character in a file is indicated by code 2, even  !
!         though it is also the last character in a frame.            !
!                                                                     !
!                           ---------------------                     !
!                                                                     !
! INPUTS:                                                             !
!                                                                     !
!         Repl_line_ptr       The index of the current replacement line !
!                                                                     !
!         Repl_line$          The current line to be replaced         !
!                                                                     !
! OUTPUTS:  none                                                      !
!                                                                     !
! GLOBAL VARIABLES USED:                                              !
!                                                                     !
!         Glb_repl_cols       The array that specifies the columns where!
!                             replacements are to occur               !
!                                                                     !
!         Glb_valid_repl_chars$  The list of valid replacement chars  !
!                                                                     !
!         Glb_repl_chars$     The ordered list of replacement chars   !
!                                                                     !
!         Glb_master_repl_char$  The master replacement char          !
!                                                                     !
!         Glb_repl_error_code    The error code used by the Code_gen  !
!                                routine                              !
!                                                                     !
!         @Outfile            The at-name of the output file          !
!                                                                     !
!         End_of_file         The end of file error code              !
!                                                                     !
!=====================================================================!

sub PCF_repl_frame(Repl_line_ptr, Repl_line$)
global Glb_repl_error_code, Glb_repl_cols(*), Glb_valid_repl_chars$
global Glb_repl_chars$(*), Glb_master_repl_char$
global @Outfile, End_of_file, True, False dim Templine$[80]
dim Master_char$[1], Data_char$[1]

! Find the index that matches the master replacement character
Master_index = pos(Glb_valid_repl_chars$, Glb_master_repl_char$)
```

```
if Master_index = 0 then
   call Abort("Code generator could not find a Master Replace Character",0)
   end if Last_repl_index = len(Glb_valid_repl_chars$)
Templine$ = Repl_line$ ! This loop repeats until an end of frame is encountered in the master data
! file or until one of the other data files runs out of data.

loop

! Now replace a character for each data file

Datafile_code1 = False
   Datafile_code2 = False
   Chars_left_flag = False
   for File_num = 1 to Last_repl_index call Get_char(File_num, Data_char$, Code )
      Column = Glb_repl_cols(Repl_line_ptr, File_num)
      Templine$[Column;1] = Data_char$ if File_num = Master_index then
         ! save master code
            Master_code = Code else
         ! Set flags based on results from Get_char if Code = 0 then
               ! Set the characters left in file flag
               Chars_left_flag = True
               end if if Code = 1 then
               ! Set the code 1 flag
               Datafile_code1 = True
               end if if Code = 2 then
               ! Set the code 2 flag
               Datafile_code2 = True
               end if end if next File_num ! Write the PCF line to the output file
   output @Outfile,,Error;Templine$
   if Error <> 0 then
      call Abort("Error writing to output file",Error)
      end if ! Exit the loop if the master data file is at the end of a frame or
   ! the end of the file.
   exit if Master_code = 1 or Master_code = 2

! Exit the loop if any data file has run out of data
   exit if Datafile_code2 end loop if Master_code = 2 then
      if Chars_left_flag then
            ! The last master character has been used but there is still data
            ! in a data file
         Glb_repl_error_code = 3
      else
```

```
                    ! The master file and all data files have run out of data at the
                    ! same time.
            Glb_repl_error_code = 1
        end if
    else     ! Master_code must equal 1
        if Datafile_code2 then
                ! One of the data files has run out of data before the master file
            Glb_repl_error_code = 2
        else
                ! There is still data in the master file and all data files
            Glb_repl_error_code = 0
        end if
    end if subend
```

```
!=====================================================================!
! SUBROUTINE GET_CHAR                                                  !
!=====================================================================!
!                                                                      !
! OPERATION:                                                           !
!                                                                      !
!           The routine Get_char is a data file scanning routine. It   !
!           will scan the a specified data file and always find the    !
!           next valid data character, skipping over comments, blank   !
!           lines and all characters on a line trailing an end of frame!
!           character (;). A data file may contain three types of lines:!
!           blank lines,                                               !
!           commented lines and un-commented lines. Commented lines are!
!           those which have a ! as the first non-blank character.     !
!           Blank lines are written to the output file but are otherwise!
!           ignored.                                                   !
!           Commented lines are written to the output file as they     !
!           are encountered. Non-commented lines are loaded into a line!
!           buffer and are then accessed character by character as each!
!           subsequent call to the routine is made. If a non-PCF character!
!           is found, the following actions will take place:           !
!                                                                      !
!             - if the character is a space or a semicolon,            !
!               new lines will be read from                            !
!               the data file until end of file or another non-commented!
!               line is found. Otherwise, an error message will be     !
!               generated.                                             !
!                                                                      !
!             - Once a valid data character has been found, a look-ahead!
!               scheme is used to determine if the character is the last!
!               character in a frame (the character is followed by a   !
!               single semi-colon) or the last character in the file   !
!               (the character is followed by a double semi-colon).    !
!               The code returned to the calling routine is set        !
!               accordingly.                                           !
!                                                                      !
!                              --------------------                    !
!                                                                      !
! INPUTS:                                                              !
!                                                                      !
!           Dfile_num              The index of the data file to       !
!                                  be used by Get_char                 !
!                                                                      !
! OUTPUTS:                                                             !
!                                                                      !
!           Dfile_char$            The valid data replacement          !
!                                  character found by Get_char         !
!                                                                      !
!           Code                   The end of frame or end of          !
!                                  data code discussed in the          !
!                                  operation section above             !
!                                                                      !
! GLOBAL VARIABLES USED:                                               !
!                                                                      !
```

| | | |
|---|---|---|
| Glb_dfile_buffer$ | The line buffer used to hold the current non-commented line |
| Glb_dfile_buffptr | The pointer into the line buffer |
| Glb_valid_PCF_chars$ | The set of valid PCF characters |
| @Outfile | The at-name of the output file |

```
sub Get_char(Dfile_num,Dfile_char$,Code)

global Glb_dfile_buffer$(*), Glb_dfile_buffptr(*)
global @Outfile
global Glb_valid_PCF_chars$, True, False Line_type$ = ""
End_of_frame = 0
End_of_data = 0
End_of_line = 0
dim Curr_chars$[2]

! The data files may contain comment lines, blank lines, and data lines
! (non-commented lines).
! The data file buffers will always contain a data line upon entry to this
! routine (except for the first entry, when the buffer will be empty, or
! when the data pointer > 80)

! First handle the first entry and data pointer > 80 cases

Temp_ptr = Glb_dfile_buffptr(Dfile_num)
if len(trim$(Glb_dfile_buffer$(Dfile_num))) = 0 or Temp_ptr > 80 then
   ! Read a line from the data file into the buffer and reset the buffer
   ! pointer.
   call Read_line(Dfile_num, Glb_dfile_buffer$(Dfile_num))
   Glb_dfile_buffptr(Dfile_num) = 1
   end if ! The following loop will repeat until the buffer pointer is pointing to
! a real data character, which will be right away unless it is pointing to
! the end of a line, end of a frame or end of the data.

loop

Repeat = False

Trimmed_line$ = trim$(Glb_dfile_buffer$(Dfile_num))

POSN = Glb_dfile_buffptr(Dfile_num)

if len(Trimmed_line$) = 0 then
      ! Found a blank line -- write it to the output
      output @Outfile,,Error;Glb_dfile_buffer$(Dfile_num)

if Error <> 0 then
       call Abort("Error occurred while writing to output file",Error)
       end if
     Repeat = True
   else
     if Trimmed_line$[1;1] = "!" then
        ! Found a comment line -- write it to the output
        output @Outfile,,Error;Glb_dfile_buffer$(Dfile_num)

if Error <> 0 then
          call Abort("Error occurred while writing to output file",Error)
          end if
        Repeat = True
      else
        if len(Glb_dfile_buffer$(Dfile_num)) < POSN then
```

```
                    ! The buffer pointer is pointing to end of line.
                      Repeat = True
                    else
                      Curr_chars$ = Glb_dfile_buffer$(Dfile_num)[POSN;1]
                      if Curr_chars$[1;1] = " " then
                          ! The buffer pointer is pointing to a space. In this case
                          ! all following characters are ignored.
                          Repeat = True
                      else
                          if Curr_chars$[1;1] = ";" then
                              ! The buffer pointer is pointing to either an end of frame
                              ! or end of data marker
                              Repeat = True
                          end if
                      end if
                    end if
                end if
            end if ! If any of the above conditions are true, we must read in a new line and
            ! try again.

exit if not Repeat call Read_line(Dfile_num, Glb_dfile_buffer$(Dfile_num))
            Glb_dfile_buffptr(Dfile_num) = 1 end loop

! When we get here we know that the buffer pointer is pointing to a data
    ! character. We need to check for a valid PCF character and also check to
    ! see if the character is the last character on a line, last character in
    ! a frame, or the last character of the data.

if pos(Glb_valid_PCF_chars$, Curr_chars$[1;1]) = 0 then
        ! The character is not valid PCF
        call Abort("Invalid PCF character found in data file",0)
    end if ! Assign the character and return code Dfile_char$ = Curr_chars$[1;1]

Code = 0

Nextchar = Glb_dfile_buffptr(Dfile_num) + 1 if Nextchar > len(Glb_dfile_buffer$(Dfile_num)) then
        call Read_line(Dfile_num, Glb_dfile_buffer$(Dfile_num))
        Nextchar = 1
    end if loop Repeat = False Trimmed_line$ = trim$(Glb_dfile_buffer$(Dfile_num))

if len(Trimmed_line$) = 0 then
        ! Found a blank line -- write it to the output
        output @Outfile,,Error;Glb_dfile_buffer$(Dfile_num)
        if Error <> 0 then
            call Abort("Error occurred while writing to output file",Error)
        end if
        Repeat = True else | if Trimmed_line$[1;1] = "!" then
        ! Found a comment line -- write it to the output
        output @Outfile,,Error;Glb_dfile_buffer$(Dfile_num)
```

```
           if Error <> 0 then
              call Abort("Error occurred while writing to output file",Error)
           end if
           Repeat = True else | if Glb_dfile_buffer$(Dfile_num)[Nextchar;1] = " " then
              ! The buffer pointer is pointing to a space. In this case
              ! all following characters are ignored.
              Repeat = True
           end if end if end if ! If any of the above conditions are true, we must read in a new line and
  ! try again.

exit if not Repeat call Read_line(Dfile_num, Glb_dfile_buffer$(Dfile_num))
  Nextchar = 1
  end loop ! We are not at the end of the buffer, so we may look at the next char
if Glb_dfile_buffer$(Dfile_num)[Nextchar;1] = " " then
  if Nextchar<len(Glb_dfile_buffer$(Dfile_num)) then
     if Glb_dfile_buffer$(Dfile_num)[Nextchar+1;1] = ";" then
           ! Set the end of data code
        Code = 2

! Set the end of frame code
     else | Code = 1
     end if

! Set the end of frame code
  else | Code = 1
  end if
end if

! Now increment the pointer for next time
Glb_dfile_buffptr(Dfile_num) = Nextchar subend
```

```
!=============================================================================!
! SUBROUTINE READ_LINE                                                        !
!=============================================================================!
!                                                                             !
! OPERATION:                                                                  !
!                                                                             !
!           This routine simplifies the access to the data files.             !
!           The index number of the file to be read is passed to              !
!           the routine and the next line in that particular file             !
!           is read and passed back to the calling routine.                   !
!                                                                             !
!                                                                             !
!                          -------------------                                !
!                                                                             !
!                                                                             !
! INPUTS:                                                                     !
!                                                                             !
!           Dfile_num              The index number of the data file          !
!                                  to be read.                                !
!                                                                             !
```

```
! OUTPUTS:
!
!               Dfile_line$              The line read from the specified
!                                        file.
!
! GLOBAL VARIABLES USED:
!
!               @Dfile1 - @Dfile16       The at-names of the 16 possible
!                                        data files.
!
!               End_of_file              The end of file error code.
!
!========================================================================!

sub Read_line(Dfile_num,Dfile_line$)
  global @Dfile1, @Dfile2, @Dfile3, @Dfile4
  global @Dfile5, @Dfile6, @Dfile7, @Dfile8
  global @Dfile9, @Dfile10, @Dfile11, @Dfile12
  global @Dfile13, @Dfile14, @Dfile15, @Dfile16
  global End_of_file Dfile_line$ = ""

on Dfile_num goto D1,D2,D3,D4,D5,D6,D7,D8,D9,D10,D11,D12,D13,D14,D15,D16

D1:
   enter @Dfile1,,Error; Dfile_line$
   goto Exit

D2:
   enter @Dfile2,,Error; Dfile_line$
   goto Exit

D3:
   enter @Dfile3,,Error; Dfile_line$
   goto Exit

D4:
   enter @Dfile4,,Error; Dfile_line$
   goto Exit

D5:
   enter @Dfile5,,Error; Dfile_line$
   goto Exit

D6:
   enter @Dfile6,,Error; Dfile_line$
   goto Exit

D7:
   enter @Dfile7,,Error; Dfile_line$
   goto Exit

D8:
   enter @Dfile8,,Error; Dfile_line$
   goto Exit

D9:
   enter @Dfile9,,Error; Dfile_line$
   goto Exit

D10:
   enter @Dfile10,,Error; Dfile_line$
   goto Exit

D11:
   enter @Dfile11,,Error; Dfile_line$
   goto Exit
```

```
D12:
   enter @Dfile12,,Error; Dfile_line$
   goto Exit

D13:
   enter @Dfile13,,Error; Dfile_line$
   goto Exit

D14:
   enter @Dfile14,,Error; Dfile_line$
   goto Exit

D15:
   enter @Dfile15,,Error; Dfile_line$
   goto Exit

D16:
   enter @Dfile16,,Error; Dfile_line$
   goto Exit

Exit:

if Error = End_of_file then
      call Abort("Unexpected end of data file",Error)
   end if if Error <> 0 then
      call Abort("Error reading one of the data files",Error)
   end if subend
```

```
!===============================================================================!
! SUBROUTINE ABORT                                                              !
!===============================================================================!
!                                                                               !
! OPERATION:                                                                    !
!                                                                               !
!              This routine prints an error message, closes all files           !
!              and halts execution of the program.                              !
!                                                                               !
!              ------------------------                                         !
!                                                                               !
! INPUTS:                                                                       !
!                                                                               !
!              Err_msg$            The error message to print                   !
!                                                                               !
!              Err_num             The system error message number              !
!                                                                               !
! OUTPUTS: none                                                                 !
!                                                                               !
! GLOBAL VARIABLES USED:   none                                                 !
!                                                                               !
!===============================================================================!

sub Abort(Err_msg$,Err_num)

call Close_files print
print "### ERROR ###"
print Err_msg$
if Err_num then
   ! if the Err_num is not 0 then print the system error message.
   print errm$(Err_num)
end if
print
print "PCFGEN aborted"
stop subend
```

```
!=====================================================================!
! subroutine Warning                                                  !
!=====================================================================!
!                                                                     !
! OPERATION:                                                          !
!                                                                     !
!            This routine prints a warning message and then returns   !
!            control to the calling routine.                          !
!                                                                     !
!                     ------------------                              !
!                                                                     !
!                                                                     !
!                                                                     !
! INPUTS:                                                             !
!                                                                     !
!       Warn_msg$          The string to be displayed as the warning  !
!                                                                     !
! OUTPUTS:  none                                                      !
!                                                                     !
! GLOBAL VARIABLES USED:  none                                        !
!                                                                     !
!=====================================================================!
```

```
sub Warning(Warn_msg$)

print
print "### WARNING ###"
print Warn_msg$
print subend
```

```
!=====================================================================!
! SUBROUTINE CLOSE_FILES                                              !
!=====================================================================!
!                                                                     !
! OPERATION:  This subroutine will close all files used in the PCFGEN !
!             program and should be called before terminating execution.!
!             If an error occurs here, a message will be printed and  !
!             the program will be stopped.                            !
!                                                                     !
!                     ------------------                              !
!                                                                     !
!                                                                     !
! INPUTS: none                                                        !
!                                                                     !
! OUTPUTS:  none                                                      !
!                                                                     !
! GLOBAL VARIABLES USED:                                              !
!                                                                     !
!          @Dfile1 - @Dfile16     The at-names of the 16 possible     !
!                                 data files                          !
!                                                                     !
!          @Ffile                 The at-name of the Format File      !
!                                                                     !
!          @Outfile               The at-name of the output file      !
!                                                                     !
!          File_not_assigned      The file not assigned error code    !
!                                                                     !
!=====================================================================!
```

```
sub Close_files
global File_not_assigned
global @Ffile,   @Outfile
global @Dfile1,  @Dfile2,  @Dfile3,  @Dfile4
global @Dfile5,  @Dfile6,  @Dfile7,  @Dfile8
global @Dfile9,  @Dfile10, @Dfile11, @Dfile12
global @Dfile13, @Dfile14, @Dfile15, @Dfile16
```

```
assign @Ffile,Error to *
assign @Outfile,Error to *
assign @Dfile1,Error to *
assign @Dfile2,Error to *
assign @Dfile3,Error to *
assign @Dfile4,Error to *
assign @Dfile5,Error to *
assign @Dfile6,Error to *
assign @Dfile7,Error to *
assign @Dfile8,Error to *
assign @Dfile9,Error to *
assign @Dfile10,Error to *
assign @Dfile11,Error to *
assign @Dfile12,Error to *
assign @Dfile13,Error to *
assign @Dfile14,Error to *
assign @Dfile15,Error to *
assign @Dfile16,Error to *

! Since this routine is the last thing done in PCFGEN, it is
! all right to ignore any file close errors that may occur.

subend
```

We claim:

1. In a circuit board tester, a data-frame generator for generating data-frames for use in testing telecommunications circuits and other circuit devices which require data which must conform to a user-selected data-frame protocol, said generator comprising:
   computing means, incorporated in said circuit board tester, for controlling the operation of said generator;
   data generation means for generating user-specified input information;
   data framing means for inserting said user-specified input information into data-frames which conform to a user-selected protocol;
   data-sequence generation means for generating data sequences from said data-frames which data-sequences are executable by said computing means.

2. In a circuit board tester, a data-frame generator for generating data-frames for use in testing telecommunications circuits and other circuit devices which require data which must conform to a user-selected data-frame protocol, said generator comprising:
   computing means, incorporated in said circuit board tester, for controlling the operation of said generator;
   data generation means for generating user-specified input-information;
   data framing means for inserting said user-specified input-information into data-frames which conform to a user-selected protocol;
   data-sequence generation means for generating data-sequences from said data-frames which data-sequences are executable by said computing means;
   merge means for merging said data-sequences with a programming language to create code which is executable by said computing means.

3. In a circuit board tester, a data-code merger for merging circuit test data with a circuit test programming language template to produce a hybrid data-code file which can be executed by a circuit board tester, said merger comprising:
   computing means, incorporated in said circuit board tester, for processing data and programming languages;
   parsing means, controlled by said computing means, for interpreting said programming language template;
   merge means, controlled by said computing means and interfacing said parsing means, for merging said circuit test data with said language template to produce said hybrid data-code file.

* * * * *